(12) United States Patent
Munson et al.

(10) Patent No.: US 11,848,862 B2
(45) Date of Patent: Dec. 19, 2023

(54) DECENTRALIZED CONTENT FABRIC

(71) Applicant: Eluvio, Inc., Berkeley, CA (US)

(72) Inventors: Michelle Munson, Berkeley, CA (US); Serban Simu, Berkeley, CA (US)

(73) Assignee: Eluvio, Inc., Berkeley, CA (US)

( * ) Notice: Subject to any disclaimer, the term of this patent is extended or adjusted under 35 U.S.C. 154(b) by 0 days.

(21) Appl. No.: 17/814,934

(22) Filed: Jul. 26, 2022

(65) Prior Publication Data

US 2023/0064466 A1    Mar. 2, 2023

Related U.S. Application Data

(63) Continuation of application No. 16/948,108, filed on Sep. 3, 2020, now Pat. No. 11,431,627, which is a
(Continued)

(51) Int. Cl.
*H04L 45/64* (2022.01)
*H04L 9/06* (2006.01)
(Continued)

(52) U.S. Cl.
CPC ............ *H04L 45/64* (2013.01); *G06F 9/4552* (2013.01); *G06F 9/45516* (2013.01);
(Continued)

(58) Field of Classification Search
CPC .............................. H04L 45/64; H04L 9/0643
See application file for complete search history.

(56) References Cited

U.S. PATENT DOCUMENTS 8,266,448 B2    9/2012  Shi et al.
9,137,072 B2    9/2015  Richardson et al.
(Continued)

FOREIGN PATENT DOCUMENTS

CN    107666484 A    2/2018
EP      2896189 A2    7/2015

OTHER PUBLICATIONS

Wang Chenmeng et al. "Integration of Networking, Caching, and Computing in Wireless System": A survey, some research issues, and Challenges, IEEE Communications Surveys & Tutorials, vol. 20, No. 1, pp. 7-38, XP011678440, DOI: 10.1109/COMST.2017. 275863 (retrieved Feb. 23, 2018) (Year: 2018).*

(Continued)

*Primary Examiner* — Mohammad S Anwar
(74) *Attorney, Agent, or Firm* — Weaver Austin Villeneuve & Sampson LLP

(57) ABSTRACT

Disclosed are examples of systems, apparatus, devices, computer program products, and methods implementing aspects of a decentralized content fabric. In some implementations, one or more processors are configured to execute a software stack to define a fabric node of a plurality of fabric nodes of an overlay network situated in an application layer differentiated from an internet protocol layer. The defined fabric node is configured to: obtain a request for digital content from a client device; obtain, from one or more of the plurality of fabric nodes, a plurality of content object parts of a content object representing, in the overlay network, at least a portion of the digital content; generate consumable media using: raw data stored in the content object parts, metadata stored in the content object parts, and build instructions stored in the content object parts; and provide the consumable media to the client device. In some instances, the consumable media is further generated using a digital contract stored in a blockchain.

39 Claims, 50 Drawing Sheets

Related U.S. Application Data continuation of application No. 16/840,014, filed on Apr. 3, 2020, now Pat. No. 10,797,994, which is a continuation of application No. 16/655,033, filed on Oct. 16, 2019, now Pat. No. 11,218,409.

(60) Provisional application No. 62/746,475, filed on Oct. 16, 2018.

(51) Int. Cl.

| | | |
|---|---|---|
| *H04L 41/00* | (2022.01) | |
| *H04L 49/25* | (2022.01) | |
| *H04L 65/60* | (2022.01) | |
| *H04L 69/325* | (2022.01) | |
| *G06F 21/60* | (2013.01) | |
| *H04L 9/32* | (2006.01) | |
| *H04L 49/15* | (2022.01) | |
| *H04L 49/60* | (2022.01) | |
| *H04L 67/104* | (2022.01) | |
| *G06Q 10/10* | (2023.01) | |
| *G06Q 20/12* | (2012.01) | |
| *G06Q 20/36* | (2012.01) | |
| *G06Q 20/38* | (2012.01) | |
| *G06Q 20/40* | (2012.01) | |
| *G06Q 50/26* | (2012.01) | |
| *H04L 9/08* | (2006.01) | |
| *H04L 9/40* | (2022.01) | |
| *H04L 45/02* | (2022.01) | |
| *G06F 9/455* | (2018.01) | |
| *G06N 20/00* | (2019.01) | |
| *H04L 45/00* | (2022.01) | |
| *H04L 9/14* | (2006.01) | |
| *H04L 67/1061* | (2022.01) | |
| *H04L 67/1074* | (2022.01) | |
| *H04L 67/1087* | (2022.01) | |
| *H04L 45/7453* | (2022.01) | |
| *H04L 65/612* | (2022.01) | |
| *H04L 67/568* | (2022.01) | |
| *H04L 69/329* | (2022.01) | |
| *H04L 9/00* | (2022.01) | |
| *H04L 67/01* | (2022.01) | |

(52) U.S. Cl.
CPC .......... *G06F 21/602* (2013.01); *G06N 20/00* (2019.01); *G06Q 10/10* (2013.01); *G06Q 20/1235* (2013.01); *G06Q 20/3674* (2013.01); *G06Q 20/3825* (2013.01); *G06Q 20/3829* (2013.01); *G06Q 20/401* (2013.01); *G06Q 50/265* (2013.01); *H04L 9/0637* (2013.01); *H04L 9/0643* (2013.01); *H04L 9/083* (2013.01); *H04L 9/0861* (2013.01); *H04L 9/14* (2013.01); *H04L 9/3213* (2013.01); *H04L 9/3234* (2013.01); *H04L 9/3239* (2013.01); *H04L 9/3247* (2013.01); *H04L 41/20* (2013.01); *H04L 45/04* (2013.01); *H04L 45/08* (2013.01); *H04L 45/14* (2013.01); *H04L 45/70* (2013.01); *H04L 45/7453* (2013.01); *H04L 49/1553* (2013.01); *H04L 49/25* (2013.01); *H04L 49/602* (2013.01); *H04L 63/0428* (2013.01); *H04L 63/0478* (2013.01); *H04L 65/60* (2013.01); *H04L 65/612* (2022.05); *H04L 67/104* (2013.01); *H04L 67/108* (2013.01); *H04L 67/1065* (2013.01); *H04L 67/1076* (2013.01); *H04L 67/1091* (2013.01); *H04L 67/568* (2022.05); *H04L 69/325* (2013.01); *G06Q 2220/10* (2013.01); *H04L 9/50* (2022.05); *H04L 67/01* (2022.05); *H04L 69/329* (2013.01); *H04L 2209/56* (2013.01)

(56) References Cited

U.S. PATENT DOCUMENTS

| | | |
|---|---|---|
| 9,953,168 B1 | 4/2018 | Lango et al. |
| 10,027,640 B2 | 7/2018 | Avanzi et al. |
| 10,127,399 B1 | 11/2018 | Whitmer |
| 10,289,915 B1 | 5/2019 | Bertsch et al. |
| 10,372,926 B1 | 8/2019 | Leshinsky et al. |
| 10,592,642 B2 | 3/2020 | Wilkinson et al. |
| 10,601,665 B2 | 3/2020 | Bathen et al. |
| 10,616,324 B1 | 4/2020 | Kaddoura |
| 10,693,839 B2 | 6/2020 | Cleaver et al. |
| 10,797,994 B1 | 10/2020 | Munson et al. |
| 10,803,537 B2 | 10/2020 | Brown et al. |
| 10,805,084 B1 | 10/2020 | Munson et al. |
| 10,860,724 B2 | 12/2020 | Pearson et al. |
| 10,880,200 B1 | 12/2020 | Munson et al. |
| 10,917,332 B1 | 2/2021 | Munson et al. |
| 10,938,791 B1 | 3/2021 | Munson et al. |
| 11,063,864 B2 | 7/2021 | Munson et al. |
| 11,063,865 B2 | 7/2021 | Munson et al. |
| 11,140,077 B2 | 10/2021 | Munson et al. |
| 11,218,409 B2 | 1/2022 | Munson et al. |
| 11,233,734 B2 | 1/2022 | Masini |
| 11,431,627 B2 | 8/2022 | Munson et al. |
| 2004/0032881 A1 | 2/2004 | Arai |
| 2004/0054807 A1 | 3/2004 | Harvey et al. |
| 2004/0246921 A1 | 12/2004 | Bates et al. |
| 2005/0015511 A1 | 1/2005 | Izmailov et al. |
| 2009/0063662 A1 | 3/2009 | Baker et al. |
| 2009/0144557 A1 | 6/2009 | Sutton |
| 2010/0169910 A1 | 7/2010 | Collins et al. |
| 2010/0268789 A1 | 10/2010 | Yoo et al. |
| 2012/0011360 A1 | 1/2012 | Engels et al. |
| 2012/0320917 A1 | 12/2012 | Song |
| 2014/0019753 A1 | 1/2014 | Lowry et al. |
| 2014/0020017 A1 | 1/2014 | Stern et al. |
| 2016/0098723 A1 | 4/2016 | Feeney |
| 2016/0173604 A1 | 6/2016 | Panigrahi et al. |
| 2016/0197831 A1 | 7/2016 | De Foy et al. |
| 2016/0283941 A1 | 9/2016 | Andrade |
| 2017/0134341 A1 | 5/2017 | Rives et al. |
| 2017/0163727 A1 | 6/2017 | Dolby et al. |
| 2017/0206135 A1 | 7/2017 | Zeng |
| 2017/0221029 A1 | 8/2017 | Lund et al. |
| 2017/0346887 A1 | 11/2017 | Kaguma et al. |
| 2017/0359260 A1 | 12/2017 | Wood |
| 2018/0005186 A1 | 1/2018 | Hunn |
| 2018/0352268 A1 | 12/2018 | O'Hanlon et al. |
| 2018/0365201 A1 | 12/2018 | Hunn et al. |
| 2019/0042135 A1 | 2/2019 | Szwarc et al. |
| 2019/0104196 A1 | 4/2019 | Li et al. |
| 2019/0132350 A1 | 5/2019 | Smith et al. |
| 2019/0303621 A1 | 10/2019 | Baset et al. |
| 2019/0311357 A1 | 10/2019 | Madisetti et al. |
| 2019/0314726 A1 | 10/2019 | Masini |
| 2019/0325044 A1 | 10/2019 | Gray |
| 2019/0334904 A1 | 10/2019 | Lelcuk et al. |
| 2019/0342095 A1 | 11/2019 | Simons |
| 2019/0370500 A1 | 12/2019 | Lee et al. |
| 2019/0370806 A1 | 12/2019 | Wang et al. |
| 2019/0377461 A1 | 12/2019 | Akhanov et al. |
| 2019/0378142 A1 | 12/2019 | Darnell et al. |
| 2019/0386814 A1 | 12/2019 | Ahmed |
| 2019/0386969 A1 | 12/2019 | Verzun et al. |
| 2020/0044857 A1 | 2/2020 | Snow |
| 2020/0059353 A1 | 2/2020 | Liu et al. |
| 2020/0074548 A1 | 3/2020 | Aidoo et al. |
| 2020/0118124 A1 | 4/2020 | Menon |
| 2020/0119925 A1 | 4/2020 | Wang |
| 2020/0120023 A1 | 4/2020 | Munson et al. |
| 2020/0134052 A1 | 4/2020 | Natanzon et al. |
| 2020/0143367 A1 | 5/2020 | LeBeau et al. |
| 2020/0162266 A1 | 5/2020 | Miller et al. |
| 2020/0186568 A1 | 6/2020 | Erb et al. |

(56) References Cited

U.S. PATENT DOCUMENTS

| | | | |
|---|---|---|---|
| 2020/0259885 A1 | 8/2020 | Alam et al. |
| 2020/0327100 A1 | 10/2020 | Androulaki et al. |
| 2020/0344060 A1 | 10/2020 | Munson et al. |
| 2020/0344234 A1 | 10/2020 | Haque et al. |
| 2020/0349261 A1 | 11/2020 | Koorella et al. |
| 2020/0382310 A1 | 12/2020 | Jayachandran |
| 2021/0014150 A1 | 1/2021 | Munson et al. |
| 2021/0044545 A1 | 2/2021 | Munson et al. |
| 2021/0092059 A1 | 3/2021 | Munson et al. |
| 2021/0092060 A1 | 3/2021 | Munson et al. |
| 2021/0112117 A1 | 4/2021 | Munson et al. |
| 2021/0119918 A1 | 4/2021 | Munson et al. |
| 2021/0149696 A1 | 5/2021 | Munson et al. |
| 2021/0182837 A1 | 6/2021 | Sears et al. |

OTHER PUBLICATIONS

Ramezan Gholamreza et al. "A Survey Secure Routing Protocols in Multi-Hop Cellular Networks", IEEE Communications Survey and Tutorials, IEEE, US, vol. 20, No. 4, Oct. 1, 2018, pp. 3510-3541, XP01 1698284, ISSN: 15553-877X, DOI: 10.1109/COMST.2018.2859900 (retrieved Nov. 19, 2018) (Year: 2018).*
Abu-El-Haija, et al., "YouTube-8M: A Large-Scale Video Classification Benchmark" arXiv preprint arXiv:1609.08675, 2016.
Arandjelovic, et al., "NetVLAD: CNN architecture for weakly supervised place recognition" Proceedings of the IEEE Conference on Computer Vision and Pattern Recognition, 2016.
Bestavros, Azer: Comprehensive List of Publications, Department of Computer Science, Boston University, Jul. 18, 2018.
"CBOR" Wikipedia article, https://en.wikipedia.org/wiki/CBOR, 2020.
Chen, et al., "XGBoost: A Scalable Tree Boosting System" Proceedings of the 22nd ACM SIGKDD International Conference on Knowledge Discovery and Data Mining, ACM, pp. 785-794, 2016.
"DPP leads the way at IBC on IMF adoption" Digital Production Partnership, Sep. 2018.
"General Data Protection Regulation (GDPR)" Intersoft Consulting Table of Contents: https://gdpr-info.eu, 2020.
Herbaut, N. et al., "A Model for Collaborative Blockchain-Based Video Delivery Relying on Advanced Network Services Chains", Advances in Network Services Chain, IEEE Communications Magazine, Sep. 2017, pp. 70-76.
International Preliminary Report on Patentability dated Apr. 29, 2021 issued in PCT Application No. PCT/US2019/056596.
International Search Report and Written Opinion dated Feb. 4, 2020 issued in PCT Application No. PCT/US2019/056596.
Jacobson, et al., "Networking Named Content" Commun. ACM 55, 2009.
Jordan, et al. "Hierarchical mixtures of experts and the EM algorithm" Neural Computation, vol. 6, Issue 2, Mar. 1994.
Ke, et al., "LightGBM: A Highly Efficient Gradient Boosting Decision Tree" 31st Conference on Neural Information Processing Systems (NIPS), 2017.
Little, Amy, "Named Data Networking—YouTube." https://www.youtube.com/watch?v=W4dPKFDLCP4, Dec. 10, 2014.
Maymounkov, et al., "Kademlia: A Peer-to-peer Information System Based on the XOR Metric" MIT Computer Science and Artificial Intelligence Laboratory (CSAIL) Parallel & Distributed Operating Systems Group (PDOS), Oct. 2002.
McKinnon, John D., "Big Tech Companies to Appear Before Senate to Discuss Privacy" The Wall Street Journal, Sep. 12, 2018.
"Merkle Tree" Wikipedia article, https://en.wikipedia.org/wiki/Merkle_tree, 2020.
Miech, et al., "Learnable pooling with Context Gating for video classification" arXiv preprint arXiv:1706.06905, 2017.
Notice of Allowance dated Nov. 12, 2021, in U.S. Appl. No. 16/840,027.
"OV 2067-0:2018—SMPTE Overview Document—Interoperable Master Format" IEEE Xplore, Jun. 25, 2018.
Ramezan, G. et al., "A Survey of Secure Routing Protocols in Multi-Hop Cellular Networks", IEEE Communications Surveys & Tutorials, 2018, vol. 20, No. 4, pp. 3510-3541.
Robertson, et al., "New Evidence of Hacked Supermicro Hardware Found in U.S. Telecom" Bloomberg, Oct. 9, 2018.
Robertson, et al., "The Big Hack: How China Used a Tiny Chip to Infiltrate US Companies" Bloomberg Businessweek, Oct. 4, 2018.
Rowstron, et al., "Pastry: Scalable, decentralized object location and routing for large-scale peer-to-peer systems" IFIP/ACM International Conference on Distributed Systems Platforms (Middleware), Heidelberg, Germany, pp. 329-350, Nov. 2001.
SG Office Action dated Jun. 28, 2023, in application No. SG11202103850W.
Singapore Search Report and Written Opinion dated Feb. 7, 2023 issued in SG11202103850W.
Singer, Natasha, "Just Don't Call It Privacy" The New York Times, Sep. 22, 2018.
Stoica, et al., "Chord: A Scalable Peer-to-peer Lookup Protocol for Internet Applications" MIT CSAIL PDOS, Feb. 2003.
Sutskever, et al., "Seq+B50uence to Sequence Learning with Neural Networks" Advances in Neural Information Processing Systems, 2014.
"The LLVM Compiler Infrastructure" LLVM project: http://llvm.org/, 2020.
"The Zettabyte Era: Trends and Analysis—Cisco" Cisco Visual Networking Index, Jun. 2017.
Tufekci, Zeynep, "How social media took us from Tahrir Square to Donald Trump" MIT Technology Review, Aug. 14, 2018.
U.S. Final Office Action dated Nov. 10, 2020 issued in U.S. Appl. No. 16/840,027.
U.S. Final Office Action dated Dec. 16, 2020 issued in U.S. Appl. No. 16/840,071.
U.S. Final Office Action dated Jul. 16, 2021 issued in U.S. Appl. No. 16/655,033.
U.S. Final Office Action dated Sep. 4, 2020 issued in U.S. Appl. No. 16/840,064.
U.S. Final Office Action dated Apr. 20, 2022, in U.S. Appl. No. 16/948,108.
U.S. Notice of Allowance dated Oct. 25, 2021 issued in U.S. Appl. No. 16/655,033.
U.S. Notice of Allowance dated Oct. 5, 2020 issued in U.S. Appl. No. 16/840,039.
U.S. Notice of Allowance dated Nov. 17, 2020 issued in U.S. Appl. No. 16/840,047.
U.S. Notice of Allowance dated Nov. 27, 2020 issued in U.S. Appl. No. 16/840,075.
U.S. Notice of Allowance dated Jan. 29, 2021 issued in U.S. Appl. No. 16/840,064.
U.S. Notice of Allowance dated Apr. 9, 2021 issued in U.S. Appl. No. 16/840,064.
U.S. Notice of Allowance dated Apr. 9, 2021 issued in U.S. Appl. No. 16/839,770.
U.S. Notice of Allowance dated May 28, 2021 issued in U.S. Appl. No. 16/840,064.
U.S. Notice of Allowance dated Jun. 17, 2020 issued in U.S. Appl. No. 16/840,092.
U.S. Notice of Allowance dated Jun. 2, 2021 issued in U.S. Appl. No. 16/839,770.
U.S. Notice of Allowance dated Jul. 2, 2020 issued in U.S. Appl. No. 16/840,014.
U.S. Notice of Allowance dated Jul. 8, 2021 issued in U.S. Appl. No. 16/840,071.
U.S. Notice of Allowance dated Aug. 14, 2020 issued in U.S. Appl. No. 16/840,014.
U.S. Notice of Allowance dated Aug. 19, 2020 issued in U.S. Appl. No. 16/840,092.
U.S. Notice of Allowance dated Aug. 4, 2021 issued in U.S. Appl. No. 16/840,071.
U.S. Notice of Allowance dated Sep. 17, 2021 issued in U.S. Appl. No. 16/840,027.
U.S. Notice of Allowance dated May 18, 2022, in U.S. Appl. No. 16/948,108.

(56) References Cited

OTHER PUBLICATIONS

U.S. Office Action dated Oct. 13, 2021 issued in U.S. Appl. No. 16/948,108.
U.S. Office Action dated Nov. 17, 2020 issued in U.S. Appl. No. 16/839,770.
U.S. Office Action dated Dec. 30, 2020 issued in U.S. Appl. No. 16/840,064.
U.S. Office Action dated Feb. 24, 2021 issued in U.S. Appl. No. 16/655,033.
U.S. Office Action dated May 20, 2020 issued in U.S. Appl. No. 16/840,064.
U.S. Office Action dated Jun. 11, 2020 issued in U.S. Appl. No. 16/840,039.
U.S. Office Action dated Jun. 19, 2020 issued in U.S. Appl. No. 16/840,075.
U.S. Office Action dated Jun. 22, 2020 issued in U.S. Appl. No. 16/840,071.
U.S. Office Action dated Jun. 5, 2020 issued in U.S. Appl. No. 16/840,014.
U.S. Office Action dated Jul. 10, 2020 issued in U.S. Appl. No. 16/840,027.
U.S. Office Action dated Jul. 2, 2020 issued in U.S. Appl. No. 16/839,770.
U.S. Office Action dated Aug. 25, 2020 issued in U.S. Appl. No. 16/840,047.
U.S. Office Action dated Mar. 16, 2022, in U.S. Appl. No. 16/948,194.
Wang, C. et al., "Integration of Networking, Caching, and Computing in Wireless Systems: A Survey, Some Research Issues, and Challenges" IEEE Communications Surveys & Tutorials, 2018, vol. 20, No. 1, pp. 7-38.
Xu, Q. et al., "Blockchain-based Decentralized Content Trust for Docker Images", Multimedia Tools and Applications, Jul. 2018, vol. 77, pp. 18223-18248.

\* cited by examiner

```
-/ELV2/info (master) $ curl
http://localhost:8008/qlibs/ilibKRYmBlvGXzTA2sGdYJm5hi/q/hq__QmdWFbfvLiJyGYi6V
8EzbuAB2xjq4QFfWorNYbudrANW9a/meta | jq
% Total    % Received % Xferd  Average Speed   Time    Time     Time  Current
                                Dload  Upload   Total   Spent    Left  Speed
100  8460      0  8460    0      0    192k      0 --:--:-- --:--:-- --:--:--  196k
{
  "id": "iq__Hvkav9kNRHxmdt6pA9iFTt",
  "hash": "hq__QmdWFbfvLiJyGYi6V8EzbuAB2xjq4QFfWorNYbudrANW9a",
  "type": "hq__QmZeoweblC8JS9XvxdbtziwForbgMUr7gDTUDLyiADPnP9",
  "meta": {
  "assets": {
    "01747a01-2906-4f82-9271-742b3de1968d": "OPL_OPP_IMF_IBC2018_Without_Leader_German.xml",
    "2b10be23-2b5d-425e-a448-044100fe6545": "DPP_IMF_IBC2018_video_2.mxf",
    "43195ef2-d212-4f52-bac3-b7bbb5599493": "DPP_IMF_IBC2018_video_1.mxf",
    "49a325ea-3eca-473c-9ee0-da8fh5cad139": "DPP_IMF_IBC2018_EnglishAudio_1_stereo.mxf",
    "4bad9785-038b-4b9f-a710-aef47aea211c": "DPP_IMF_IBC2018_video_lead_in.mxf",
    "5852225d-f00f-4c76-beb6-97478cfc9acf": "OPL_DPP_IMF_IBC2018_Without_Leader_English.xml",
    "8696c1a5-c92f-41d9-89f4-364029c6054": "DPP_IMF_IBC2018_GermanAudio_audio_stereo.mxf",
    "a5459644-272b-4789-95bf-818bfe9dc40P": "CPL_CIPP_IMF_IBC2018_trailer_without_lead_in.xml",
    "c3753827-7440-4780-aca6-474c71a176df": "PKL_c3753827-7440-4780-aca6-474c71a176df.xml",
    "c8594a14-3001-44ae-957b-9bbfb015706": "CPL_OPP_IMF_IBC2018_with_lead_in.xml",
    "cf919e20-0747-4c03-8b0f-89861b8a89ea": "DPP_IMF_IBC2018_EnglishAudio_silence_stereo.mxf",
    "f1798564-2ead-4801-8e68-3417d5cf961c": "DPP_IMF_IBC2018_6ermanAudio_silence_stereo.mxf",
    "f8d4c364-93e3-4819-b1774115c0040,67": "DPP_IMF_IBC2018_EnglishAudio_2_stereo.mxf"
```

```
},
"description": "Demonstration only",
"eluv.access.charge": "4",
"eluv.access.type": "paid",
"eluv.contract_address": "0x475f4dd200721782818b3b4b8e150ael8b05faa3",
"eluv.image": "hqp_QmVffrzLocDfNDAFX8sBuEaA37gTtQUXbmdASuGtbf3YFc",
"eluv.name": "Corals vi",
"eluv.status": "Approved",
"eluv.type": "avmaster2000.imf",
"image": "hqp_QmVffrzLocDfNDAFX8s8uEaAligTtQUXbmdASuGtbf3YFc",
"languages": [
    "de",
    "en",
    "de",
    "en"
],
"name": "Corals vi",
"offering.de":
"ey3y2X8y2XpIbnRhdGlvb19pbm2vijp7ImF126ivX2NodW5rcyl6MjgyICihdWRpb19y2X8zIjpbeyiunIlljoic3R1cmVvliwiYallOc
mFOZSl6MTl4MDAwfV0slmF126ivX3Nl219kdX3jhdGlvb19kYXNojo2MDE2MDAwLjAslmF1261vX3Nl219kdX3hd6lvbl9z2W
Nzljo2LjAxpiwidmlk2W9f2nihbWVzijoxNTAsInZp26VvX33IcHMiOIt7Indp2HRoljo2NDAsIm5hbni0ilzNj8wliwia6Vp22h0ljozNj
AsIm7pdHihdGUi0jk2MDAwMHOsey33aWROaCl6ODUzlauIllIlljoiNDgwcCsImhlaWdodCIENDewLCJioXRyYXR1ljoxMjgwM
DAwfSx7Indp2HRoljoxMjgwlCiuYW1lljoiNzIwcClsimhlaWdodCl6NzIwLClicaRyYXRljoyNTYwMDAwfSx7Indp2HRoljoxOTl
M.C. MW1lljoiMTA4MHAlLCJoZWInaHQi0jEwODAslm)pdHAdGUi0jUxMjAwMD89XSwidmlk2W9fc2VnX2R1cmF0aW9uX2R
hc2giOjYwMDAwMDAuMCwidmlk2W9fc2VnX2R1cmF0aW9uX2hsslm9m2mVyaW5njp7lmxhbmdIYWdlljoiZ"
```

```
"CPL_OPP_IMF_IBC2018_trailer_without_lead_in.xml": "hqpilmT2pC3798LQzfnCUMRkFNLEkXqhCqYhZoKT44DhkUZEp",
"CPL_OPP_IMF_IFIC2018_with_lead_in.json": "hqp_Ombrl.MkoakfiEi4Y884efg5GC8KHLAESMQ68XQCfbk5L9w",
"CPL_DPP_IMF_IBC2018_with_lead_in.xml": "hqp_llmR5zUxu6p68Ms7H8cyckT1388vXNTcVKWDg5qFXKxjejC",
"DPP_IMF_IBC2018_EnglishAudio_1_stereo.mxf": "hqp_QmT2RsSvMsq4xnidtONR6KKunHSSxcTd5dmX9KCmcgegqq",
"DPP_IMF_IBC2018_EnglishAudio_2_stereo.mxf": "hqp_Qm2HVV9Vag3yo3eYsfeelsER7aKzpurbcHa9Ei8AjbfQzz",
"DPP_IMF_IBC2018_EnglishAudio_silence_stereo.mxf": "hqp_QmbUd8ontivBswhbRUxr8Nrxs2AqTe3dwFGzST9gegyYyBZ",
"DPP_IMF_IBC2018_GermanAudio_audio_stereo.mxf": "hqp_pmfTc5YMC6TerokY0KdEEByVC2qoqE9PFP6nT3qttrbqf3",
"DPP_IMF_IBC2018_6ermanAudio_silence_stereo.mxf": "hqp_Qmck25x2w2TtVSTi8CfT6Ld1y08uKkdNuG8wUkAUue4nu8",
"DPP_IMF_IBC2018_video_I.mxf": "hqp_QmRhV8V6cgCRQMUUqwxENjp5G2f9C69fiuHkABH4ZyTsF",
"DPP_IMF_IBC2018_video_2.mxf": "hqp_QmWRXv6tnigfNz2fyKgHfU351nk5YWyNon6dKRBML8nDuG",
"DPP_IMF_IBC2018_video_lead_in.mxf": "hqp_Qmbad6iaVfr2SdNLJdFoWrE826j626dvng9GpdKcjgnUFQ",
"OPL_OPP_IMF_IBC2018_Without_Leader_English.json": "hqp_QmWIGwQj9EzKncj8S3w6xAE843YE4MENNCvneCGq1zaS8q",
"OPL_OPP_IMF_IBC2018_Without_Leader_English.xml": "hqp_pmcDcGheSVqapYQ242228MPPgHficEDYS2KCdOv8D7TpJV",
"OPL_DPP_IMF_IBC2018_Without_Leader_German.json": "hqp_QmWxymI6Gopacrx4vR2bhz827KQf9snsi6v23uhq8Lo3Yf",
"OPL_DPP_IMF_IBC2018_Without_Leader_German.xml": "hqp_QmR6W7h864GzgjVan67ShX4N3RqjR449o1T4ysREUic2TD",
"PKL_c3753827-7440-4780-aca6-474c71a176df.json": "hqpilmQATbbxqaF6k2p1NHT8m9AkrtiFR5TDOSLcx7tzcii9Dz",
"PKl_c3753827-7440-4780-aca6-474c71a176df.xml": "hqp_QmTrp1TcZySRLskTZsrBKE8mruTyyZ9Ah12nWEhLUDJ9z",
"VOLINDEX.xml": "hqp_QmQKUWPSdSeB5dMYYXGceyfP6CYcr3K8gYAi8ONbmbDVdf",
"coral-reef-poster.jpg": "hqp_QmVffrzlocDfNDAFX8s8uEGAJ3gTtQUXbmdASuGlbf3YFc"
```

FIG. 22(Continued)

```
},
"video": "hqp_QmT2RsSvNsq4xnidtDNR6KKunHSSxcTd5dmX9KCmcgegqq",
"visible": false,
"watermark": {
"font_size": "(h/20)",
"pos_x": "(w-tw)/8",
"pos_y": "(h-h/8)",
"text": "SHORT FRAGMENT FOR DEMONSTRATION ONLY - SEPTEMBER 2018"
```

FIG. 22(Continued)

```
{
  "title": "The IMF Movie",
  "description": "Drama - IMF saves the day! ",
  "language": "en",
  "program_length": "PT0H23M30.665",
  "audio_sequence": {
    "resources": [
      {
        "entry_point": 83.66691666666667,
        "source_duration": 348348,
        "timeline_start": 0,
        "timeline_end": 7.25725,
        "track_file_id": "11111111-1111-1111-1111-111111111111",
        "path": "/MEDIA/IMF Movie studio logo audio stereo.mxf"
      },
      {
        "entry_point": 148.81533333333334,
        "source_duration": 7173166,
        "timeline_start": 7.25725,
        "timeline_end": 156.69820833333333,
        "track_file_id": "22222222-2222-2222-2222-222222222222",
        "path": "/MEDIA/IMF Movie opening credits audio stereo.mxf"
      },
      {
        "entry_point": 0,
        "source_duration": 60190130,
        "timeline_end": 1410.65925,
        "timeline_start": 156.69820833333333,
        "track_file_id": "33333333-3333-3333-3333-333333333333",
        "path": "/MEDIA/IMF Movie main soundtrack English stereo.mxf"
      }
    ]
  },
  "video_sequence": {
    "resources": [
      {
        "entry_point": 83.66691666666667,
        "source_duration": 174,
        "timeline_start": 0,
        "timeline_end": 7.25725,
        "track_file_id": "44444444-4444-4444-4444-444444444444",
        "path" : "/MEDIA/IMF Movie studio logo video.mxf"
      },
```

```
{
  "entry_point": 148.81533333333334,
  "source_duration": 33648,
  "timeline_start": 7.25725,
  "timeline_end": 1410.65925,
  "track_file_id": "55555555-5555-5555-5555-555555555555",
  "path": "/MEDIA/IMF Movie main video.mxf"
    }
   ]
  }
}
```

```
},
"video": "hqp_QmTZRsSvNsq4xnidtDNRGKKunHSSxcTd5dmX9KCmcgegqq",
"visible": false,
"watermark": {
    "font_size": "(h/20)",
    "pos_x": "(w-tw)/8",
    "pos_y": "(h-h/8)",
    "text": "SHORT FRAGMENT FOR DEMONSTRATION ONLY - SEPTEMBER 2018"
}
}
```

FIG. 24

ETHEREUM BLOCK

```
{
difficulty: 1,
extraData: "0xd7830108038467657468877676d312e ... 382e31856c696e75780000000000000000c23219",
gasLimit: 4712388,
gas used: 104966,
hash: "0x1bbb0764af01d1b819b0e52b0d483a730e6bacef6a40700dbcb723e16309a4ee",
logsBloom: "0x000000000000000000000000000800000 ... 00008000000000000000",
miner: "0x0000000000000000000000000000000000000000",
mixHash: "0x0000000000000000000000000000000000000000000000000000000000000000",
nonce: "0x0000000000000000",
number: 5129,
parentHash: "0x5c8c7fdb00993c181f9c2e00b90272f3632f487465d1714922a81c588d9413be",
receiptsRoot: "0x55071ed2e6a29273009f09be5c828313302549aa18a199678ab821b51a780e76",
sha3Uncles: "0x1dcc4de8dec75d7aab85b567b6ccd41ad312451948a7413f0a142fd40d49347",
size: 2042,
stateRoot: "0x9ac77a57b13e8b2c07aa39a2719fbbd1ce0a5d1b2c016ea9ca1c78f7f3476f17",
timestamp: 1521233520,
totaldifficulty: 6840,
transactions: [ "0x491eec1437cb1eae6909e9ccf5358d845ae279d0b630c5e1edc99fff9a8c      "],
transactionsRoot: "0x0cb2e230a55ea025bff4878b7c672717fb709a640b0dc0e1b273a39d1411a5",
uncles: []
}
```

"From": Address of a account calling the contract

TRANSACTION

{
blockHash: "0x1bbb0764af01d1819b0e52b0e52b0d483a730e6bacef6a40700dbcb723e16309a4ee",
blockNumber: 5129,
from: "0x76bbb0984ac61f295a936bfeb091ae2cfae8e47",
gas: 1800000,
gasPrice: 2000000000,
hash: "0x491eec1b437cb1eae690901e9ccf535848ae279d0b630c5e1edc99fff9a8c",
input: "0x24e27684c0bee6ac7ddfa9d9f1048877afa007f0eb ... 127076d0575982afb4ba17f4228d81",
nonce: 4,
r: "0x1be4f8e0611fb8a88d22383fdd760ef59980c38efcea6ca53a585a47ddacbe",
s: "0x1d6c1da1432753d6360bb831e43acdef25684a2cef3f9a9255069adacdef5",
to: "0x1723ec365f6fff933cc21ee57df8067db0360553",
transactionIndex: 0,
v: "0x1c",
value: 800000000000000000
}

"To": Address of the contract

FIG. 28(Continued)

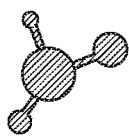 Content Verification Info - VERIFIED!

```
{
"hash": "hq_QmQedd9AuQSdoBjMzNUVp7BaqWRXAJiJGAdcLXLWWKyqiV",
 "qref": {
  "valid": true,
  "hash": "hqp_QmQedd9AuQSdoBjMzNUVp7BaqWRXAJiJGAdcLXLWWKyqiV"
 },
 "qmd": {
  "valid": true,
  "hash":hqp_QmU4wn795KbSGvTH2uki6UwWT1xbv1yqDCM7bEdweYiad8",
  "check": {
   "valid": true,
   "invalidValues": []
  }
 },
 "qstruct": {
  "valid": true,
  "hash": "hqp_QmSHqXe9cr5EtgsYcg7dP9irZ4MHsTFo4Rc5e4hh8oHfPT",
  "parts": [
   {
    "hash": "hqp_QmUv75ETf9x22cjNNbTncVPMuKZpXLPHF7tVz2D9ACthqD",
    "proofs": {
     "rootHash": "acda1564dfc542064b7becdbc2d107c84fe1f942337bfe3c06
f2b4eec5e806b8",
     "chunkSize": 49,
     "chunkNum": 49,
     "chunkLen": 50,
     "finalized": 116
    },
    "size": 2634
   },
   {
```

FIG. 29

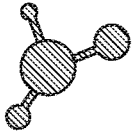 Content Verification Info - FAILED!

```
{
"hash": "hq_QmZ7oxvpECVgvED7QwMHgmKZGpEEoHkRhHWo2NNpeFZV2e",
 "qref": {
   "valid": true,
   "hash": hqp_QmZ7oxvpECVgvED7QwMHgmKZGpEEoHkRhHWo2NNpeFZV2e"
 },
 "qmd": {
   "valid": true,
   "hash":hqp_QmPaddxjFwCc9TPAg652MSRoV9iada8gjB1FSR2wKadbGf",
   "check": {
     "valid": true,
     "invalidValues": []
   }
 },
 "qstruct": {
   "valid": false,
   "error": "Hashes do not match",
   "hash": "hqp_QmUfPJ4ehcbi17fH26QvwY6ViFhACaMsENyvxyptdBPq4T"
 },
 "valid": false
}
```

FIG. 30

DECENTRALIZED CONTENT FABRIC

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

INCORPORATION BY REFERENCE

An Application Data Sheet is filed concurrently herewith as part of this patent document. Each patent application that this patent document claims benefit of or priority to as identified in the concurrently filed Application Data Sheet is incorporated by reference herein in its entirety and for all purposes.

TECHNICAL FIELD

This patent document generally relates to digital content routing over a data network. More specifically, this patent document discloses techniques for ingesting, managing and distributing digital content using a decentralized content fabric providing an overlay network situated on top of an internet protocol layer.

BACKGROUND

Digital content consumption over the Internet is growing explosively. Many argue that value on the Internet has now shifted from data to user attention. Some projections estimate that over 80% of the traffic over the Internet in 2021 will be video. Of this, the share of live content is growing the fastest, up from an estimated 2% in 2013 to 13% by 2021, according to some projections. And, with the mainstream availability and use of gigantic social media, search, and retail platforms whose profit incentives (driven by advertising) are aligned directly with maximizing user attention, the crux of value has shifted from data to user attention.

However, against this backdrop, the elemental technology of the Internet, which is open and scalable for web data (not large form content), has not evolved significantly. Instead, the "client-server-edge-cache" architecture that emerged on top of the open packet based routing Internet to serve web data (documents) over 20 years ago has been stretched to try to support digital content. It is not difficult to appreciate the incongruence of this design: after all, digital content is typically orders of magnitude larger than web documents and creates massively higher traffic demands on the core of the Internet and devours terabytes, petabytes, and zettabytes of storage. The explosion of piecemeal digital rights management (DRM) and a potpourri of device formats means large form content is re-versioned into very many end package formats, and in combination with the edge caching requirements, has further multiplied the bytes that have to be pushed from a source through the Internet core to keep the edge caches "warm" with popular content and has multiplied the storage requirements throughout the entire supply chain. Finally, the "push and cache at the edge" model is simply too slow to keep pace with the continually changing content of interactive and live sources.

On the economic side, the existing storage and content delivery providers, largely content delivery networks (CDNs) and cloud vendors, have high revenues and some have high profit directly from this entrenched legacy architecture overheated with the consumer demand for video. According to some estimates, 71% of Internet traffic is projected to be carried by CDNs by 2021 (including cloud CDNs). Over the top Internet companies that have built their own infrastructure or Internet giants that can ride on their own large networks have successfully moved off of this economic dependence, but the large majority of content owners/providers including studios, broadcasters and new independent content creators who do not have existing Internet business-scale infrastructure to ride on currently use this legacy architecture.

This problem is highlighted in that a packet from a typical stream on a streaming service would traverse the link between the website domain server and a user's Internet service provider (ISP) millions of times because Internet routing is opaque to the actual content being carried.

BRIEF DESCRIPTION OF THE FIGURES

The included drawings are for illustrative purposes and serve only to provide examples of possible structures and operations for the disclosed systems, apparatus, methods and computer program products. These drawings in no way limit any changes in form and detail that may be made by one skilled in the art without departing from the spirit and scope of the disclosed implementations.

In the drawings, Figures (FIGS. 1-30 illustrate examples of some systems, apparatus, methods and computer program products of aspects of a decentralized content fabric according to some implementations.

FIG. 22 shows an example of IMF package content in the content fabric after ingest of the selected content type, implemented with bitcode.

FIG. 24 shows an example of metadata stored in an original content object created from an IMF source package used to specify content, dimensions and placement of a watermark by bitcode in generating an output stream.

FIG. 28 shows an example of a transparent, provable chain of record for content.

FIGS. 29 and 30 show examples of content object verification trees.

DETAILED DESCRIPTION

Figure 1:
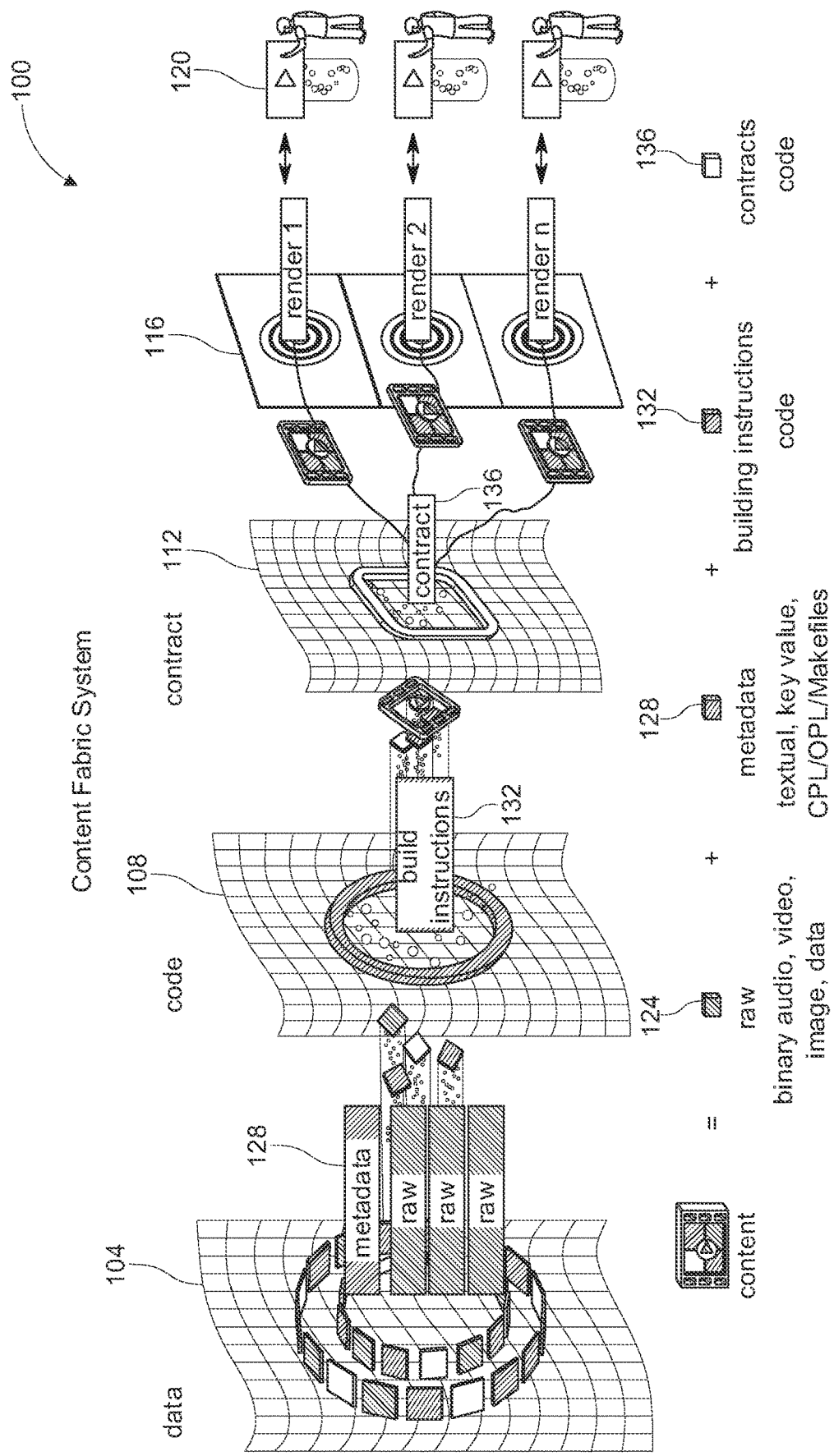
FIG. 1 shows an example of a content fabric architecture.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Described herein are examples of systems, apparatus, methods and computer program products implementing infrastructure, techniques and other aspects of a decentralized content fabric. In some implementations, the content fabric is configured for ingesting, managing and distributing media and other types of digital content over a network, such as the Internet, with low latency and consistent high bandwidth so streaming and download of digital content is improved in comparison with conventional content delivery systems and techniques. Using some examples of the disclosed content fabric, media can be distributed globally, for instance, as professional quality "Internet television (TV)," at high efficiency and low cost. In some implementations, such attributes can be made possible by a decentralized, e.g., "nothing shared" infrastructure of the content fabric that provides one or more of:

self-scaling via a trustless security model, an open fabric-extend protocol, and strong incentives allowing content owners, viewers, sponsors and infrastructure suppliers to benefit;

bandwidth and storage efficiency compared with conventional cloud, content delivery network (CDN) and digital asset management architectures through a content-centric storage and distribution structure;

high speed and low latency for on demand and live content by learning best possible paths to content and locating fast, eligible servers in near real-time;

programmable output, allowing content to carry its code and just-in-time (JIT) application when serving output versions; and certifiable, tamper-resistant content where version history including derivatives is transparent and tamper-resistant and content originators are provable.

In some implementations, the content fabric incorporates one or more of:

a decentralized, low latency and efficient content routing system;

an efficient distributed storage model and JIT composition of metadata, raw data and code;

a trustless security model with blockchain controlled content access that is achieved with proxy re-encryption of content, and authorization of content access in the content fabric via smart contract transactions on the blockchain;

content integrity verification and origin traceability implemented with a fast, provable content version history backed by blockchain transactions; and a metering and compensation system allowing for pricing incentives to balance supply and demand while meeting service level targets.

Some implementations of a content fabric incorporate content routing techniques, an audiovisual pipeline (AV pipe), and contracts.

For instance, an AV pipe can incorporate JIT techniques such as JIT transcoding. The AV pipe can provide fully-pipelined transport with minimal latency. Using such an AV pipe, for instance, when a consumer at a computing device clicks play on a player application implemented on the consumer's device or on a website to play a movie or other video, content object parts of the movie are fetched via an overlay network, described in greater detail herein, using disclosed content routing techniques to find the content object parts. In some implementations, a content object part is the fundamental unit of storage, network transfer and caching in the content fabric. When the content object parts are retrieved, applying the disclosed techniques, the content object parts can be transcoded in near real-time to often beat a playback deadline such as 2 seconds. Some of the disclosed techniques can be applied to serve the content object parts to a player application so the consumer can see and hear the movie with minimal-to-no perceivable latency.

As mentioned above, in some implementations, the AV pipe works with content routing techniques disclosed herein. For instance, in the case of live streaming, there is very little time to fetch content object parts of the stream. Some of the disclosed techniques can be performed to realize a JIT rendering pipeline where content object parts relevant to fulfilling a client request, such as a play command at a consumer's computing device, are in place except for actual livestream bytes.

Some of the disclosed techniques pertain to digital contracts, also referred to herein as contracts, and applicable blockchain techniques. In some implementations, a contract as well as different versions of a content object part associated with the contract can be stored in a blockchain. For instance, version proofs for content object parts can be generated using a hash tree, and the version proof can be verified when a read operation is performed. In some implementations, the version proof itself is part of what is stored in a blockchain smart contract. And when there is an update operation, a version proof of an updated content object part, in which the content has changed, can be stored in the blockchain smart contract. Thus, provability of particular content can be provided by the blockchain record for such content.

In some implementations, fabric nodes, often implemented as host computing devices running a software stack, also have a contract. These fabric nodes can be thought of as workers of a system implementing aspects of the content fabric. By assigning a contract to a fabric node, there is an ability to record trusted work. So, for example, when a fabric node performs JIT transcoding on unencrypted content, performance of such transcoding operations can be recorded against an associated fabric node contract.

Some of the disclosed techniques provide access control using a blockchain smart contract, interaction with a security model for re-encryption, and storing versions/hashes of a content object part with the contract in a blockchain ledger. Additional related techniques facilitate how consumers get access to content as well as how a consumer's data is protected using a crypto-wallet. These contract-related services integrate with the security and blockchain aspects of the content fabric, according to some implementations.

In some implementations, a security model is established to manage how content is encrypted and how access control is governed. For instance, such a security model can provide encryption methods and operations as well as re-encryption methods and operations for serving content to a recipient in a trustless manner.

Some of the disclosed implementations provide an overlay network, which is implemented primarily with application software, as opposed to conventional networks with operations implemented using hardware or low-level system software. The term "overlay" is used to describe examples of the overlay network disclosed herein because aspects and operations are often implemented in an application layer or other type of layer situated on top of a conventional Internet Protocol (IP) layer. Thus, when the overlay network is implemented in the application layer, some of the disclosed techniques provide for routing by content, as opposed to conventional techniques for routing by host. Thus, in some implementations, hardware such as hosts, servers, other types of computing devices, etc. are of little relevance when addressing by content. That is, in the application layer, it generally does not matter which particular computing device stores the content or some part of the content. In some implementations, content-centric routing provides foundational differences between the disclosed content fabric's implementation using an overlay network versus conventional IP-based routing. For instance, a content representation used by the disclosed content fabric can be de-duplicated and served from an original source, in contrast with the duplication of content data accompanying conventional host-centric IP-based routing schemes.

In some implementations, a translation layer is situated between the application layer and a conventional IP network implementing transmission control protocol/internet protocol (TCP/IP), so the translation layer serves as an intermediary. For instance, the translation layer can facilitate determining which computing device stores content, which is being requested at the application layer, and can facilitate reliably transmitting the content over IP.

FIG. 1 shows an example of a content fabric architecture. In FIG. 1, a decentralized content fabric system 100 provides an AV pipe through which media such as video can be generated. In the example of FIG. 1, there are three main logical layers to implement an overlay network: a data layer 104, a code layer 108, and a contract layer 112. When media is retrieved through system 100, layers 104, 108 and 112 work together in near real-time using one or more software stacks to serve the media as a consumable 116 through the overlay network. By incorporating software stacks, system 100 has both vertical and horizontal dimensions; that is, content is retrieved and composed in a supply chain along a horizontal direction from data layer 104 through code layer 108 and contract layer 112 to a player 120 providing an output in the form of consumable media 116 at a consumer's computing device, while a software stack at a fabric node provides a vertical dimension, as explained in greater detail herein.

In the example of FIG. 1, data layer 104 stores and manages content such as large form content. Data layer 104 provides an underlying structure for content, which can get passed around the overlay network. Data layer 104 includes an interconnected network of content object parts, which have been stored as data files or other blocks of raw data. As explained in further detail below, each content object part can be identified by a hash value, the result of a one-way hash operation maintained using cryptography. In some implementations, a content object part is immutable once finalized and identified by a hash value that is calculated across all of the data stored in the content object part. Using a cryptographic hash method, the authenticity of a content object part's data can be verified by recalculating the hash. The hash also serves as a criterion for data deduplication.

In the example of FIG. 1, media provided as an input to data layer 104 is broken into pieces of "raw" data 124, often in the form of binary audio, video, and/or images. Another input to data layer 104 is metadata 128, which describes how to make an output in the form of consumable media 116, and can be in the form of text, key values, etc. Building instructions 132, also referred to herein as build instructions 132, are situated in code layer 108 and are configured to build consumable media 116 from raw data 124 and metadata 128. Build instructions 132 are a type of code such as bitcode to facilitate execution in a secure way. Another type of code appearing in system 100 is contracts 136, situated in contract layer 112 and often implemented using blockchain and described in greater detail herein.

In implementations such as that illustrated in FIG. 1, a content object, described in greater detail herein, includes content object parts in the form of raw data 124 as well as metadata 128. The content object can be made dynamic and transactional by build instructions 132 and contracts 136. Thus, when a movie or other type of media is assembled from content object parts, code to render the movie from the content object parts is immediately available.

In FIG. 1, fabric logic can be implemented in code layer 108. Thus, content routing operations can be provided by code layer 108, among other dynamic operations. Code layer 108 is configured to transform and deliver media for consumption through the AV pipe. In some implementations, continuous machine learning is integrated to tag content and otherwise facilitate operation of code layer 108 by determining highest bandwidth, lowest latency paths. In code layer 108, content can be classified, and content objects can be identified. Code layer 108 can generate consumable media JIT on user request. Code layer 108 is programmable to combine raw data, metadata and code for dynamic, personalized output.

In FIG. 1, contract layer 112 controls content access via a blockchain ledger, in some implementations. Contract layer 112 can be configured to protect content, for instance, by re-encrypting accessed content using trustless encryption. Contract layer 112 also protects user data using, for instance, a cryptographic wallet. In some implementations, contract layer 112 can provide content transparently and securely to third parties. Also, in some implementations, aggregate user data can be collected with "zero knowledge," as explained in greater detail herein. In some examples, contract layer 112 can be configured to prove versions of content cryptographically. Version and access history can be recorded in the ledger. Also, contribution of work by fabric nodes can be recorded and compensated.

In some implementations, a blockchain-based versioning protocol is provided for media, as explained in greater detail herein. Such a customization and application of blockchain can facilitate a decentralized store of version histories of the content object parts, since versioning/history can be made part of what blockchain holds. Such versioning techniques are applicable since many content object parts evolve to have different versions. A new version is typically defined by one or more changes, and such a change is often by reference. Versioning can occur with a single content object part and across a number of content object parts.

In some implementations, a content object's data is stored in data containers referred to herein as content object parts. A content object can have a referential object structure to facilitate use in the content fabric. Any media or any large structured or unstructured data in the content fabric like a video stream, a file, a package, a set of files, or a data object, e.g., a software program or game, genomics data, structural or mechanical design object, etc. can be made to have a content object structure using some of the disclosed techniques. A content object structure or structures can be generated as part of ingesting media or any source data.

Different implementations of content routing methods are disclosed herein that facilitate distribution of content object parts as well as finding the content object parts inside a domain and, in some instances, outside of a domain in near real-time. In some examples, an intra-domain routing protocol is provided. In some implementations, intra-domain routing can be integrated with distributed and decentralized hashing. As explained in greater detail herein, in some examples, an inter-domain routing protocol with lightweight routing tables is provided.

In some implementations, machine learning (ML) methods can be used to select best paths among fabric nodes in the content fabric. ML can be used to identify a particular fabric node for communicating with a consumer's computing device, as well as be used to identify upstream fabric nodes to get content object parts from.

Some implementations are applicable to different digital media supply chains, such as over-the-top streaming distribution using single "master" formats, low latency live content distribution, personalized content with dynamic and JIT operations such as watermarking, clipping, validation and automatic metadata tagging, and digital asset marketplaces for scalable value exchange between content owners, viewers, sponsors and licensees.

In some implementations, the content fabric incentivizes participation to drive performance and efficiency, including: for owners and licensees, scalable, transparent capabilities for rights management, audience reporting and content commerce; for users, transparency for providing data for their attention to content; and for infrastructure providers, automatic compensation (payment and cost offset) for contributing bandwidth, computation and storage.

In some implementations, the disclosed content fabric incorporates: blockchain decentralized ledgers for large scale consensus on distributed data, tamper resistant storage, and scalable low cost microtransactions; large scale ML and deep-learning; and scalable compute infrastructure with graphics processing units (GPUs), tensor processing units (TPUs), and other specialized compute platforms. Additionally, blockchain ledgers and smart contracts, crypto-economics, e.g., combining game theory, decentralized ledgers and classic market economics, make it possible to create large scale pricing systems that will incentivize supply, demand, and performance in decentralized systems.

In some implementations of the overlay network, a software stack provides relevant operations, and each fabric node runs the same software stack. A fabric node that runs this stack is also referred to herein as a "content node". In some implementations, the content fabric enables fabric nodes to communicate with one another to securely store and serve content using a decentralized framework, meaning no state need be shared via any centralized entities such as databases, tables, ledgers, etc.

In some implementations, content and metadata may be stored once, and consumable media is rendered on demand. Internally, the content fabric allows digital content to be stored in an object structure, namely a content object, which can include content object parts, e.g., raw data as well as metadata, and code which operates on the raw data and metadata JIT at serving time to yield consumable media versions. The code, such as build instructions, that operates on the raw data and metadata allows for flexible re-use of media, updates of the code without updating a software stack (for scalability), and sandboxing for security and metering.

In some implementations, the content fabric may be "trustless" in that content is encrypted and re-encrypted for authorized receivers without the software stack or fabric node on which a software stack runs having to access content in plain-text, and without having access to the content's encryption keys.

In some implementations, access to content objects in the content fabric including create, update (write), and view (read) is mediated by transactions on an embedded blockchain ledger that runs within a software stack. An application interface of the content fabric supports a blockchain platform virtual machine, such as the Ethereum virtual machine, and, in turn, blockchain smart contracts. Each operation on a content object can be implemented as a transaction against a smart contract for that object, in turn recording the address of the entity/user that requested the operation, the identifier of the content object and any details of the transaction.

In some implementations, content operations are programmable. For instance, base smart contracts for content objects can have custom insertion points (hooks) that allow for invoking any transaction—credit or debit of an account, event logging, authorization, verification check, etc.—before and after any content operation, providing intrinsic commerce, rights management, and workflow capabilities.

In some implementations, content versions are provable and tamper-resistant. Content objects can have a version proof, such as a Merkle tree calculation of the object's hashes for fast verification of the integrity of the object. The root value of the Merkle proof is recorded in the blockchain transactions for that content object allowing for a tamper-resistant record of the version history of the object ("who changed what when").

In some implementations of the disclosed content fabric, a content routing system locates content object parts throughout the overlay network using an original distributed hash table (DHT) structure and global, continuous ML to ensure low latency high bandwidth delivery of those content object parts to client devices, also referred to herein as clients. Unlike conventional peer-to-peer networks, some implementations achieve low latency high bandwidth serving even as the system grows in number of fabric nodes and number of content objects to giant scale. By the same token, some implementations of the disclosed systems are incentivized to grow in direct benefit to maintain this high performance.

In a DHT, the fabric nodes in the network can be treated as the buckets in a hash map that spans the entire network. The DHT can be keyed by each fabric node's ID, and the values are any resource associated with or stored by that fabric node, such as file hashes or keywords. In this way, the fabric node ID not only serves as identification of the fabric node, but also as a direct map to a set of values to be located in the network. In some contexts, the crux of the DHT's characteristics is the particular method the DHT uses to search its network to locate the fabric node ID that can return the desired value in response to an application or user request.

In some implementations, each fabric node is identified with a 32-byte node ID, which also is a node address on the embedded blockchain ledger. In some instances, content object part hashes can be sharded over the fabric nodes using a partitioning method that, with the routing method, is designed to a) locate content object parts on a fabric node with low latency consistently, even as the number of fabric nodes and number of content objects in the content fabric grows, and b) not require moving around content as new fabric nodes and content are added.

In some implementations, the partitioning method has global configuration parameters including: 1) a "level," which defines the number of partitions in the network, 2) a "number of partitions per node" (np), which defines the number of partitions each fabric node stores, and 3) a static configuration of the number of copies of a partition (cp). In some instances, each partition is itself identified by a partition ID (e.g., 4 bits or one hexadecimal number for every position in the partition ID), and content object part hashes are also represented as 32-byte IDs.

Content object parts can be assigned to be stored in a partition by matching a prefix in their part hash to the partition ID, where the length of this prefix is controlled by the current partition level of the network. Similarly, fabric nodes can be assigned to store and serve a set of partitions by matching a prefix in their node ID to all partition IDs that are within (e.g., less than or equal to) an XOR distance calculation that is equal to the configured number of partitions per node, also referred to herein as "numparts." In some examples, for calculation of the XOR distance, the 32-bytes that make up the node ID, the content object part hash, and the partition ID are expressed as 32 pairs of hexadecimal characters (each hex character representing 4 bits). When content object parts are retrieved from the network, the routing method locates the fabric nodes that can serve the partition to which the content object part belongs, and uses the most favorable fabric node to serve the content object part. In some implementations, as the number of fabric nodes in the overlay network increases to accommodate more content, the network dynamically repartitions with minimal "reshuffling" of existing content object parts.

In some implementations, given a number of partitions in a network=p, a number of partitions per fabric node=np, and a number of copies=nc, the network desirably has (p/np)*nc fabric nodes. For example, for a network that has 16 partitions, and maintains 8 partitions per fabric node, and 7 copies of each partition, the network has (16/8)*7=14 fabric nodes. As those partitions start to fill with new content and as the number of fabric nodes in the network increases, some implementations can divide each partition space into 16 smaller partitions, increasing the number of partitions from 16 to 256, for example, with each existing fabric node shedding a portion of the now more specific partition space and new fabric nodes taking on the new partition space. Assuming the part hashes are generally evenly dispersed over the partition space, some implementations can introduce the new partitions and scale up the network while not having to move any content or renumber fabric nodes/content and still maintain the same redundancy of each partition.

In some implementations, each subsequent level uses the next pair of hexadecimal characters to identify the partition, and contained content object parts, and fabric nodes storing the partition. For example, considering the partition ID:

0f 1a 66 aa 4d 5e 6f 7a ab be cd de of 76 e3 a8 44 98 b4 c5 11 00 34 dd 3d 47 a8 91 32 fa 01 12

Level 1—uses "0"
Level 2—uses "0f"
Level 3—uses "0f 1", etc.

In an example, consider a content object part with a hash starting with 0f 1a 66 aa . . . That is assigned to 'level 3' partition ID:

0f1,
and a node ID with a hash starting with:
0f 1a 00 00 . . .

The content object part may stay on this fabric node as the network grows from Level 3 through Level 4 because the XOR distance is 0:

XOR distance(0f1, 0f1)=0
XOR distance(0f 1a, 0f 1a)=0

At level 5, the XOR distance calculation between the node ID and partition ID yields a value of "6":

XOR distance(0f 1a 6,0f 1a 0)=6

Assuming the numparts configuration of the network is 7 or greater (XOR distance of 0 through 6), the partition may stay on this fabric node.

Finally, at level 6, the partition ID and node ID diverge beyond the XOR distance constraint and the partition is shed from this fabric node and assumed by a new fabric node:

XOR(0f 1a 66, 0f 1a 00)>>6

Note that the network grew by 3 orders of magnitude before any changes were made to where this content is located.

In some implementations, eligible content nodes store desired content object parts inside of domains of content nodes that are reachable, for instance, by layer 2 broadcast for intra-domain content routing. In some implementations, inter-domain routing methods can be performed to locate content object parts on fabric nodes outside of the domain. The disclosed approaches can be implemented to integrate with large-scale, continuous ML to select fabric nodes and paths in the overlay network (both within domain and out of domain) that are predicted to serve the requesting client with low latency and high bandwidth, at the client's bottleneck bandwidth capacity.

In some implementations, the content fabric provides to applications (and, in turn, consumers) two primitives for content publishing and retrieval: GET and PUT. Each primitive takes a content object part hash as its primary argument. The content fabric is then responsible to either locate and return the content object part (GET) or to publish the content object part (PUT) to the appropriate fabric nodes based on the partitioning method.

"Private" IP networks such as small office LANs, corporate WANs and public clouds, include host computing devices that can reach one another via layer 2 broadcast. IPv6 multicast is by default available within these private networks without special configuration. The content fabric can be configured to take advantage of this capability to use the native capability of the network to learn what fabric nodes within the domain have a content object part and to retrieve the content object part directly from the selected fabric node, for instance, selected by ML score. Fabric nodes join a set of IPv6 multicast groups where the addresses are directly computed from the partition IDs the fabric node is responsible for, and directly reply to requests for content object parts they are responsible for.

Figure 2:
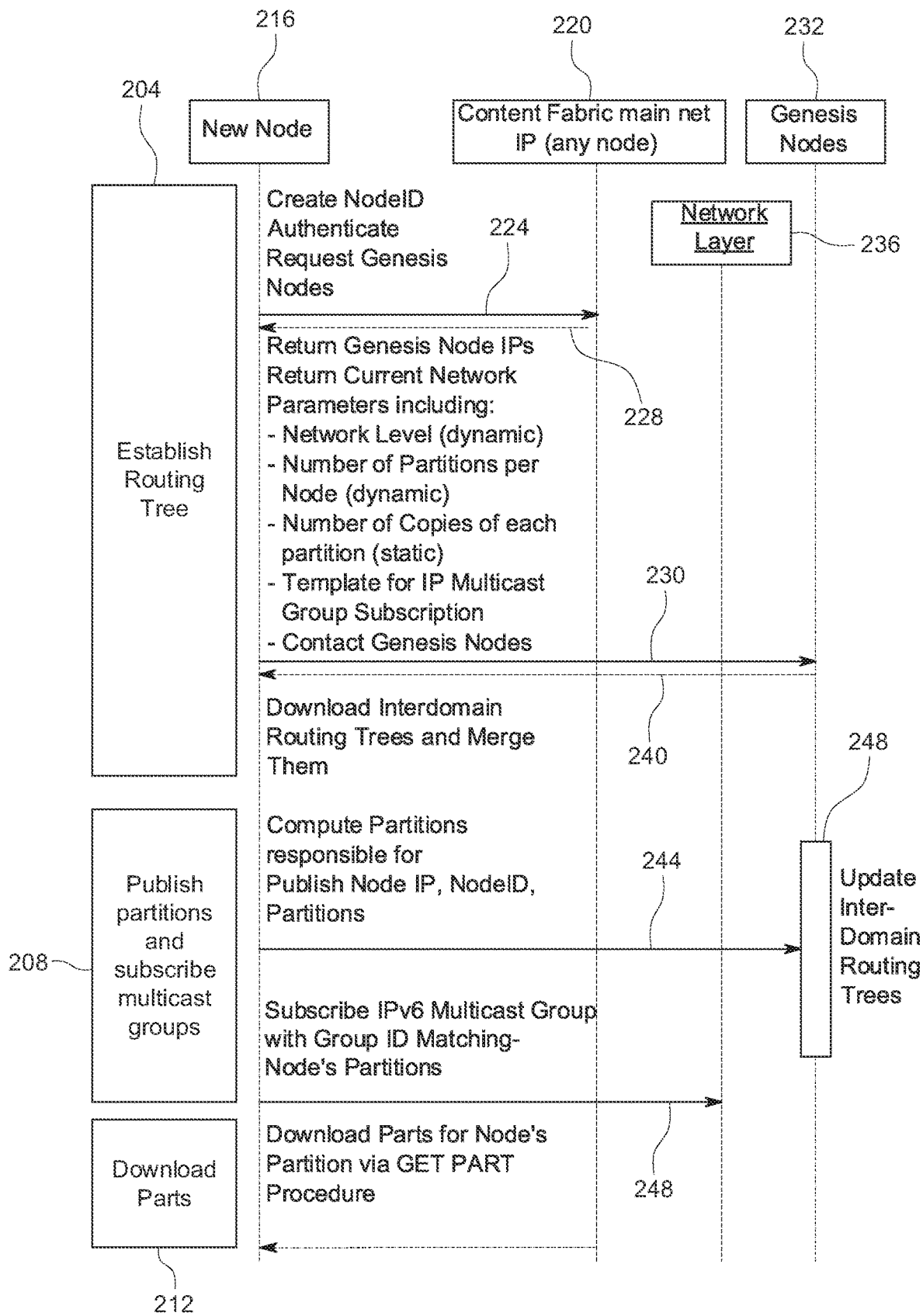
FIG. 2 shows an example of a bootstrapping method for a new fabric node to join a content fabric.
Figure 3:
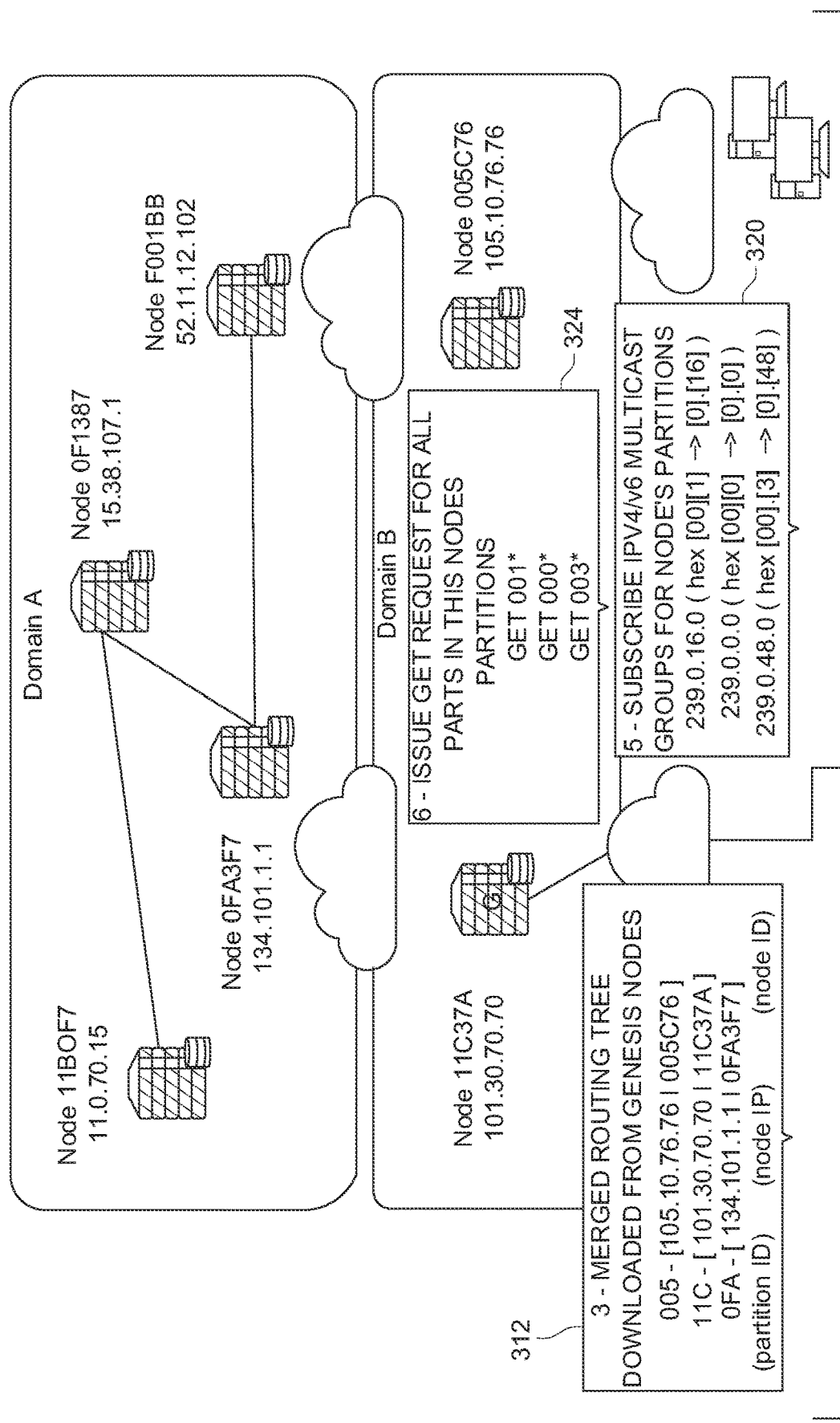
FIG. 3 shows an example of a sequence of events in an instance of the bootstrapping method of FIG. 2.
Figure 3:
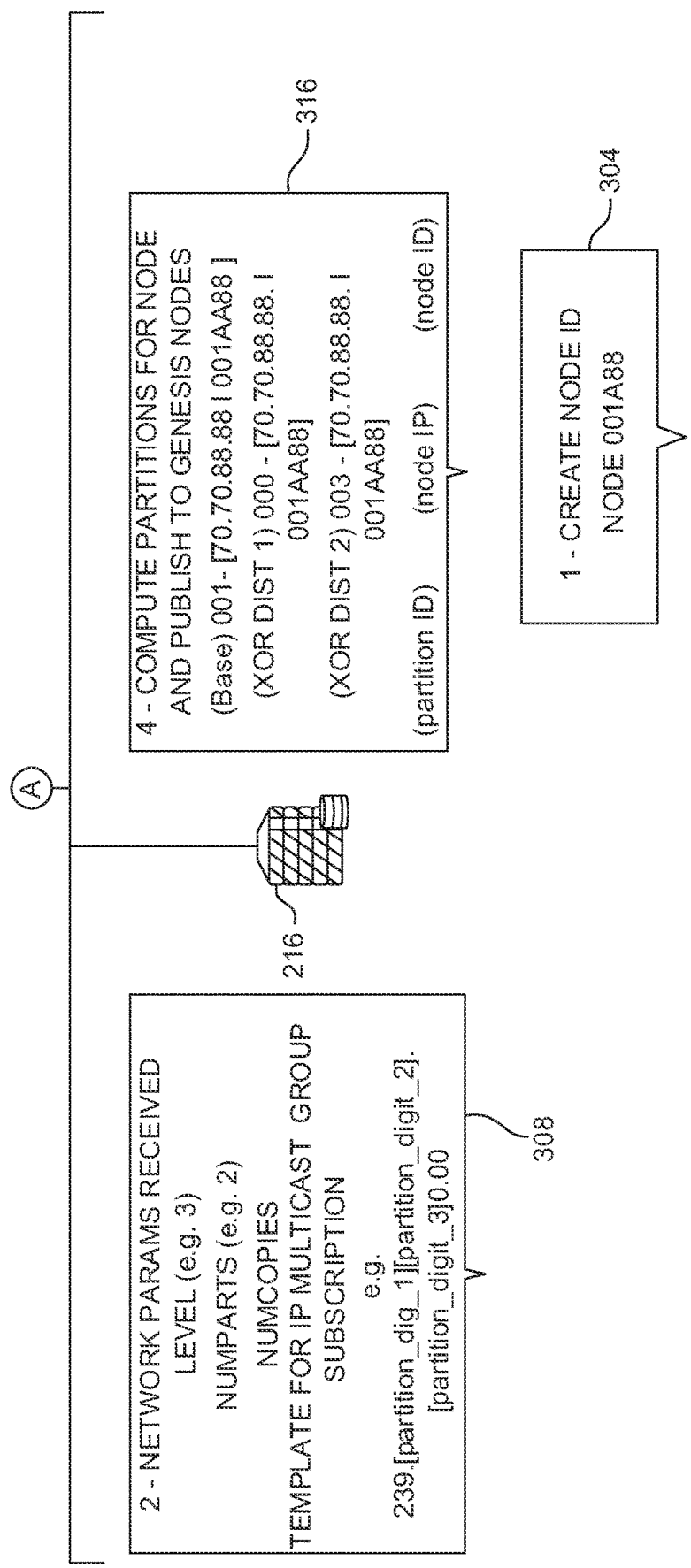

FIG. 2 shows an example of a bootstrapping method for a new fabric node to join a content fabric. FIG. 3 shows an example of a sequence of events in an instance of the bootstrapping method of FIG. 2. Some implementations of the method of FIG. 2 can be broken into stages, namely stage 204, in which a routing tree is acquired, stage 208, in which a fabric node's partitions are computed and published, and a subscribe operation to subscribe the fabric node to local multicast groups for those partitions is performed, and stage 212, in which content object parts can be downloaded.

In the example of FIGS. 2 and 3, a new fabric node 216 generates a node ID for itself as illustrated by block 304 of FIG. 3, and an authentication can be performed. Fabric node 216 then sends a request message at 224 of FIG. 2 to any existing fabric node 220 of the content fabric. In response to the request, at 228, existing fabric node 220 returns a list of genesis fabric nodes, referring to fabric nodes that have been present since the initial state of the overlay network, and thus usually have the richest inter-domain partition knowledge. At 228 of FIG. 2, existing fabric node 220 also returns a number of current network parameters, which can include a current network level, the current numparts per node, a number of copies of each partition (numcopies), and a template for IP multicast group subscription. An example of these network parameters received by new fabric node 216 is shown in block 308 of FIG. 3.

In FIG. 2, in response to receiving the network parameters, new fabric node 216 can send a request 230 for inter-domain routing trees to one or more genesis nodes 232 through a network layer 236. An example of a genesis node is node 11C37A of FIG. 3. The genesis node or nodes 232 can respond at 240 of FIG. 2 with the latest versions of inter-domain routing trees, which can be merged at new fabric node 216 for the most up-to-date version. An example of merged routing trees downloaded from genesis nodes is shown in block 312 of FIG. 3.

In FIG. 2, new fabric node 216 computes the partition IDs that node 216 will cover as described in greater detail herein. An example of the computed partition IDs is shown in block 316 of FIG. 3. New fabric node 216 then publishes, at 244 of FIG. 2, the new fabric node's node ID, public IP address, partition IDs and any other associated details to the genesis fabric node(s) 232 who update their routing trees at 248 with the details of new fabric node 216.

In FIG. 2, after 244, new fabric node 216 subscribes at 248 to an IPv6 multicast group whose address can be directly computed from the partition IDs that new fabric node 216 is responsible for. An example of the subscribe operation is shown in block 320 of FIG. 3. Once new fabric node 216 has established its routing tree, new fabric node 216 will start a background method for acquiring the content object parts the new fabric node is responsible for. For instance, in block 324 of FIG. 3, since new fabric node 216 is now 'online' and could receive requests for content object parts the new fabric node hasn't yet acquired, new fabric node 216 can acquire content object parts on demand through GET requests using the GET operation described in greater detail herein.

Figure 4:
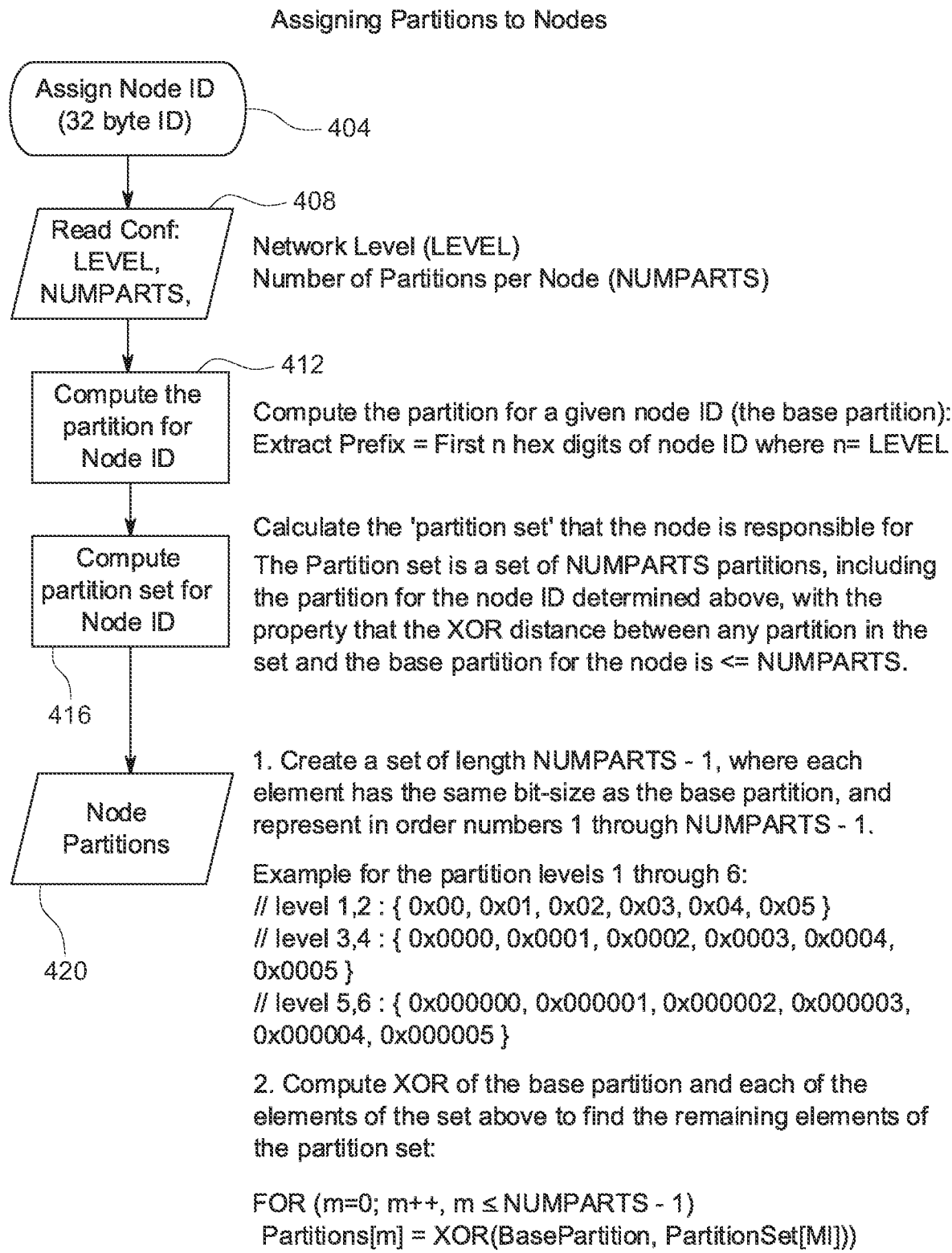
FIG. 4 shows an example of a method for assigning partitions to fabric nodes.

FIG. 4 shows an example of a method for assigning partitions to fabric nodes. At 404, a node ID, for instance, in the form of a 32 byte ID, is assigned to a fabric node. In some implementations, the node ID and assignment can be self-generated by the fabric node. The method proceeds from 404 to 408, at which the fabric node retrieves network parameters including, in this example, network level and numparts. At 412, following 408, the partition for a given node ID for the fabric node is computed, and the computed partition is referred to as the base partition. For example, the first n hex digits of the node ID, where n=level, can be extracted as a prefix. The method then proceeds to 416, at which the partition set that the fabric node is responsible for is calculated. In this example, the partition set is a set of partition IDs of size equal to numparts, including the partition ID for the node ID determined above, with the property that the XOR distance between the IDs of any partition in the set and the base partition for the fabric node is less than or equal to numparts. At 420, a method implementing a deterministic algorithm is performed to create a set of size numparts, where each element has the same bit size as the base partition and is represented as illustrated in FIG. 4. And, at 420, an XOR of the base partition and each of the elements of the set illustrated in FIG. 4 is computed to find the remaining elements of the partition set.

Figure 5:
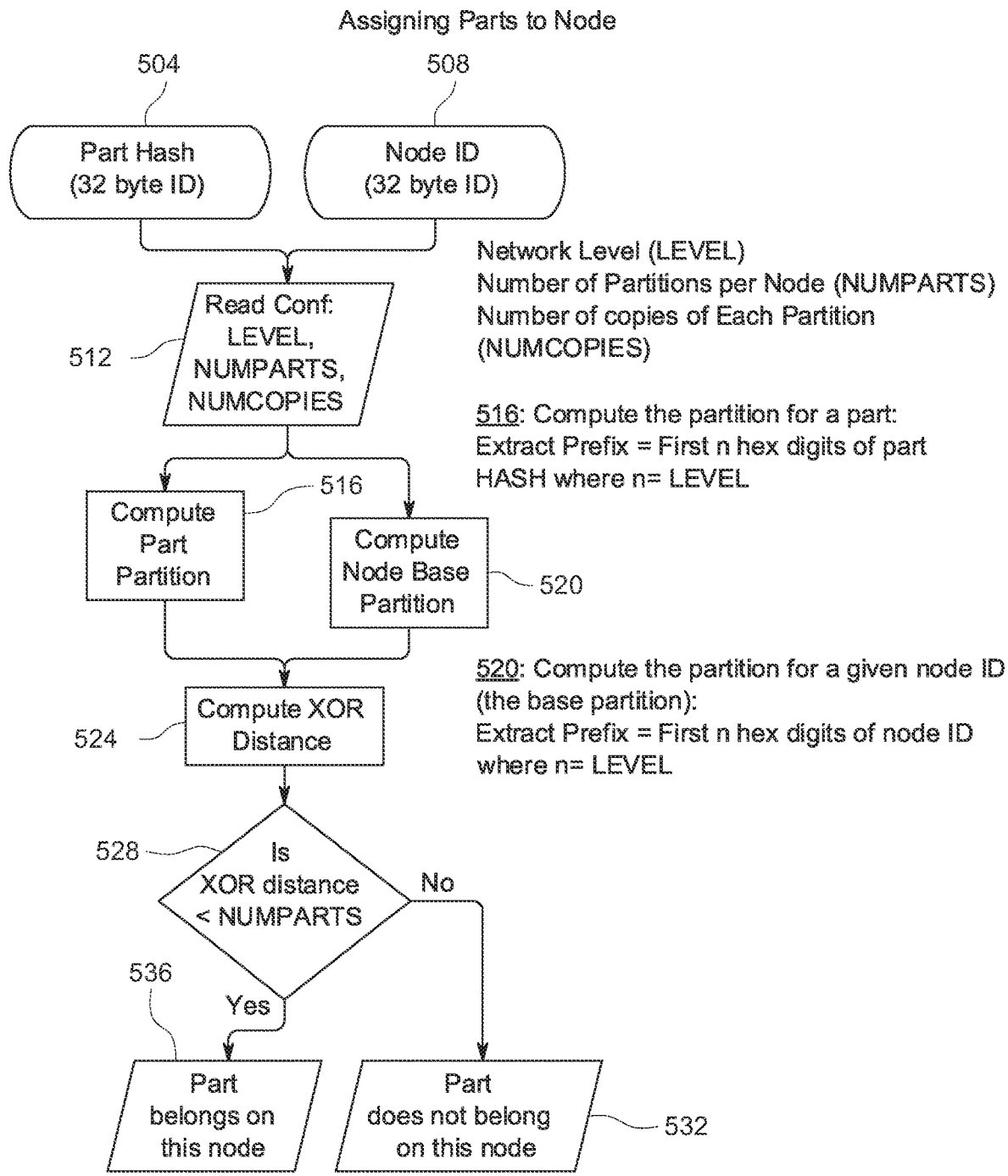
FIG. 5 shows an example of a method for assigning content object parts to a fabric node.

FIG. 5 shows an example of a method for assigning content object parts to a fabric node. At 504 and 508, inputs in the form of a content object part hash and a node ID, for example, in the form of 32 byte IDs, are provided. At 512, other inputs in the form of a network level and numparts, as described above at 408 of FIG. 4, are provided. In this example, at 512, numcopies is also provided as an input. At 516, following 512, a partition for the content object part is computed. Also, in this example, a prefix is extracted, where the prefix is the first n hex digits of the content object part hash, where n is the network level.

In FIG. 5, also following 512, at 520, a node base partition is computed to extract a prefix as described above at 412 of FIG. 4. At 524, following 516 and 520, an XOR distance is computed between the values determined at 516 and 520. At 528, it is determined whether the XOR distance is less than numparts. If not, the method proceeds to 532, at which it is determined that the content object part does not belong on the fabric node being considered. Returning to 528, if the XOR distance is less than numparts, the method continues to 536, at which it is concluded that the content object part belongs on the fabric node.

Figure 6:
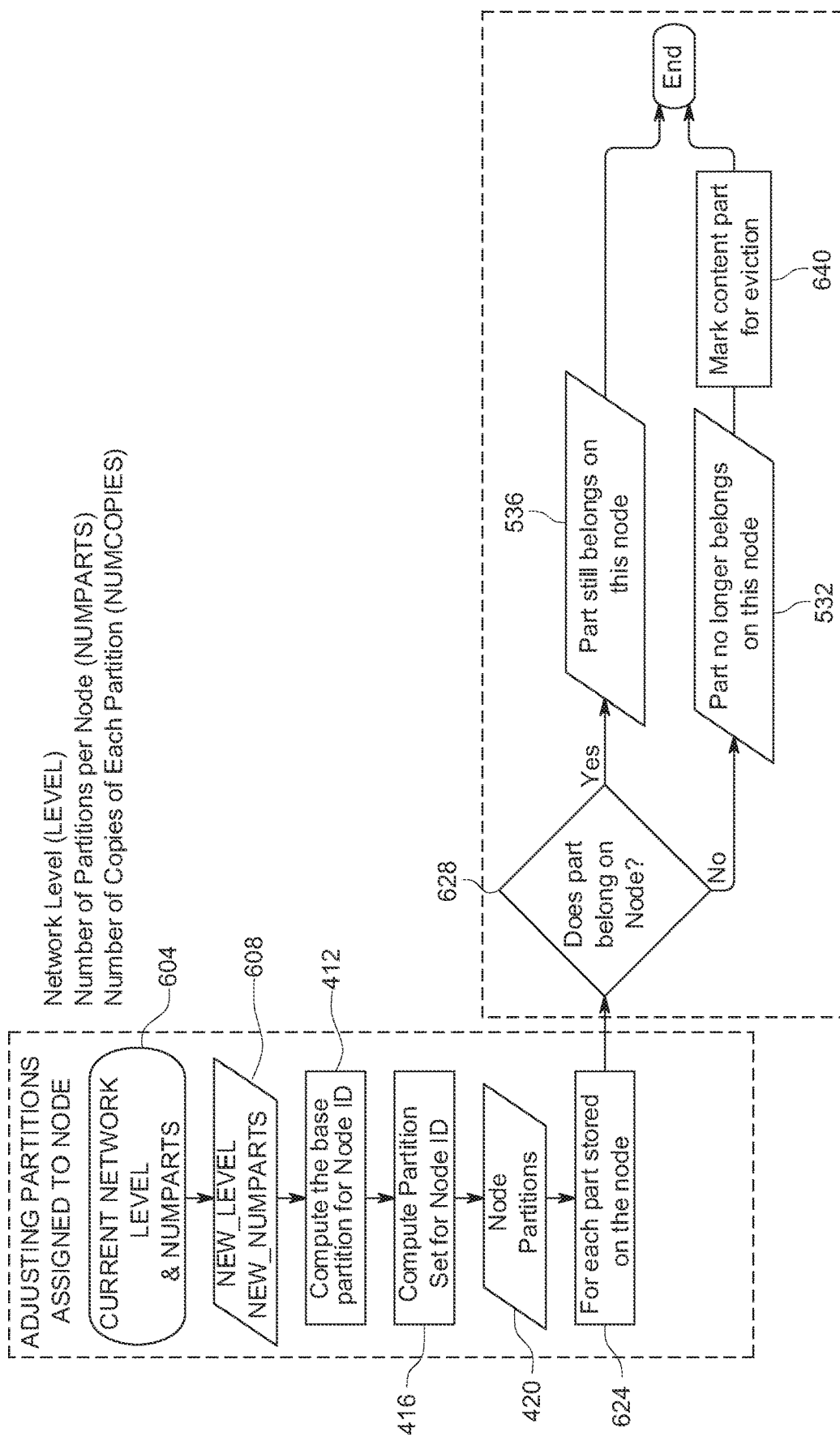
FIG. 6 shows an example of a method for re-partitioning the overlay network of the content fabric.

FIG. 6 shows an example of a method for re-partitioning the overlay network of the content fabric. In some implementations, using the method of FIG. 6, partitions assigned to a particular fabric node can be adjusted. At 604, current network parameters including network level, numparts and numcopies are retrieved. At 608, input parameters in the form of at least new network level and new numparts for adjusting the partitioning are provided to desirably replace the current parameters retrieved at 604. Following 608, operations 412, 416 and 420 of FIG. 4 are performed.

In FIG. 6, at 624, following 420, for each content object part stored on the fabric node, it can be determined at 628 whether the given content object part belongs on the particular node, for instance, using techniques as described above at operations 516, 520, 524 and 528 of FIG. 5. Possible outcomes of 628 in FIG. 6 include 532 and 536 of FIG. 5. In this example, when it is determined at 532 that the content object part no longer belongs on the fabric node, the particular content object part can be marked at 640 for eviction, for instance, for later addressing during a background cleanup method or during live cache processing on the node.

Figure 7:
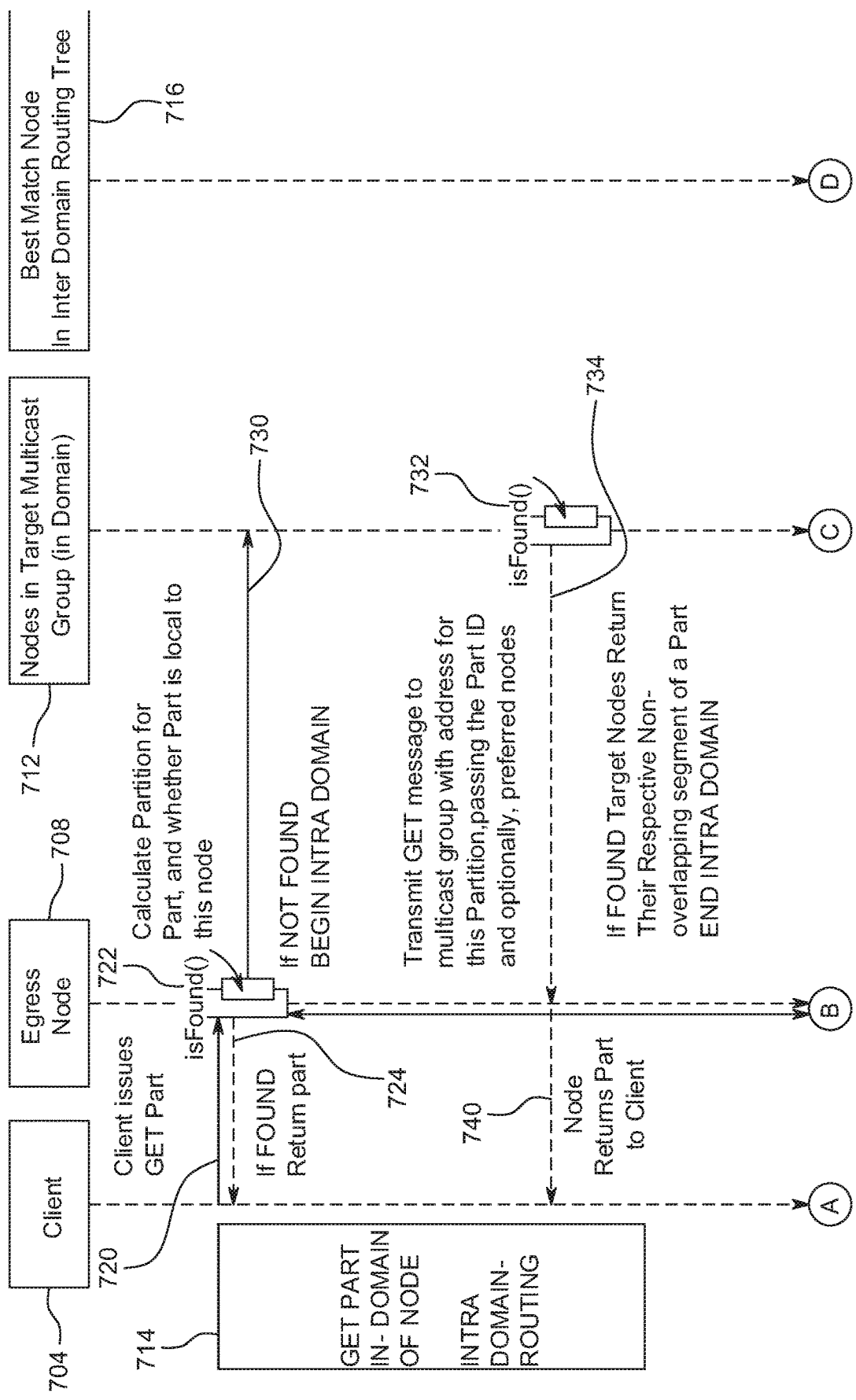
FIG. 7 shows an example of a content routing method for retrieving a content object part.
Figure 7:
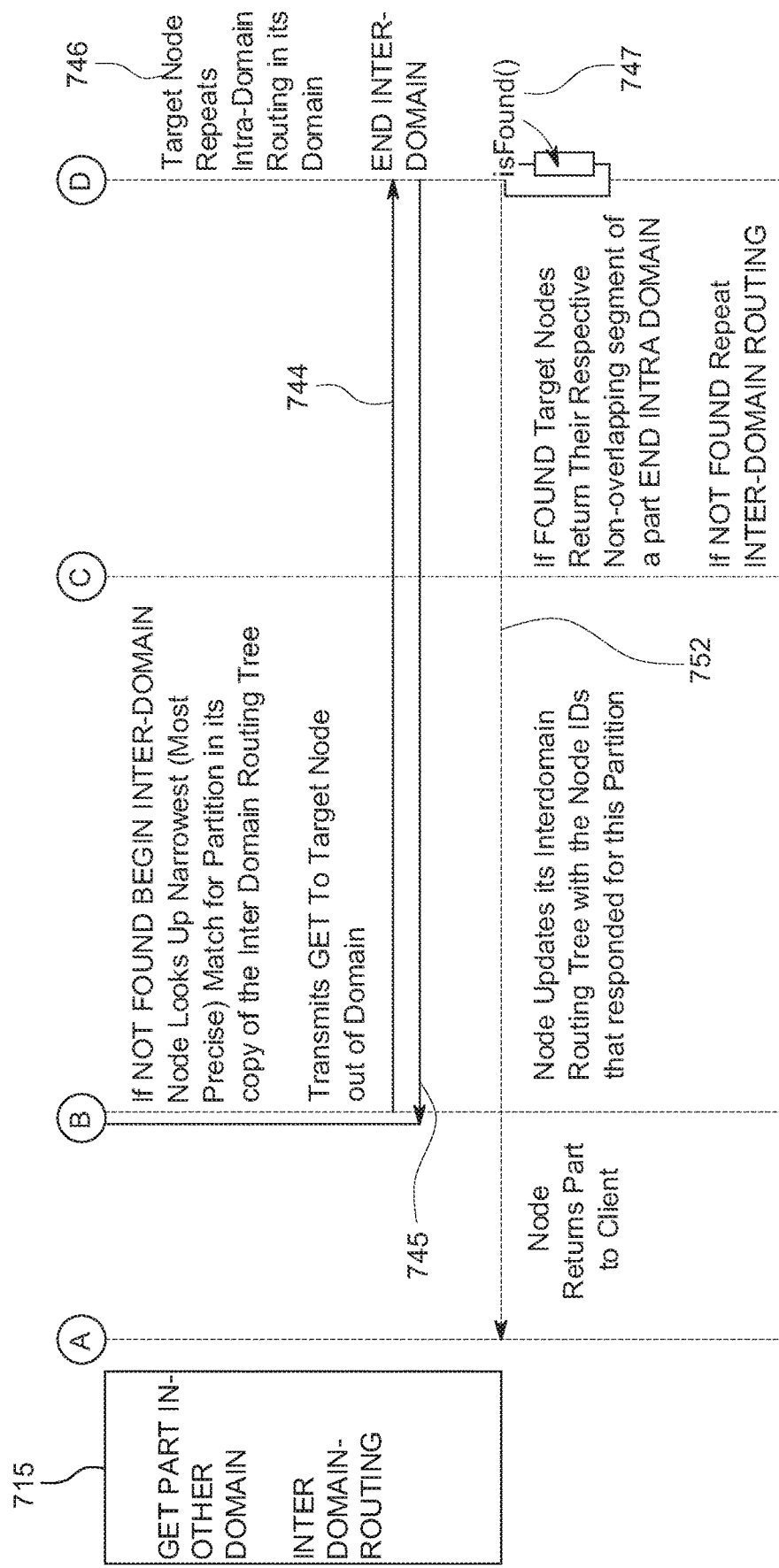
Figure 8:
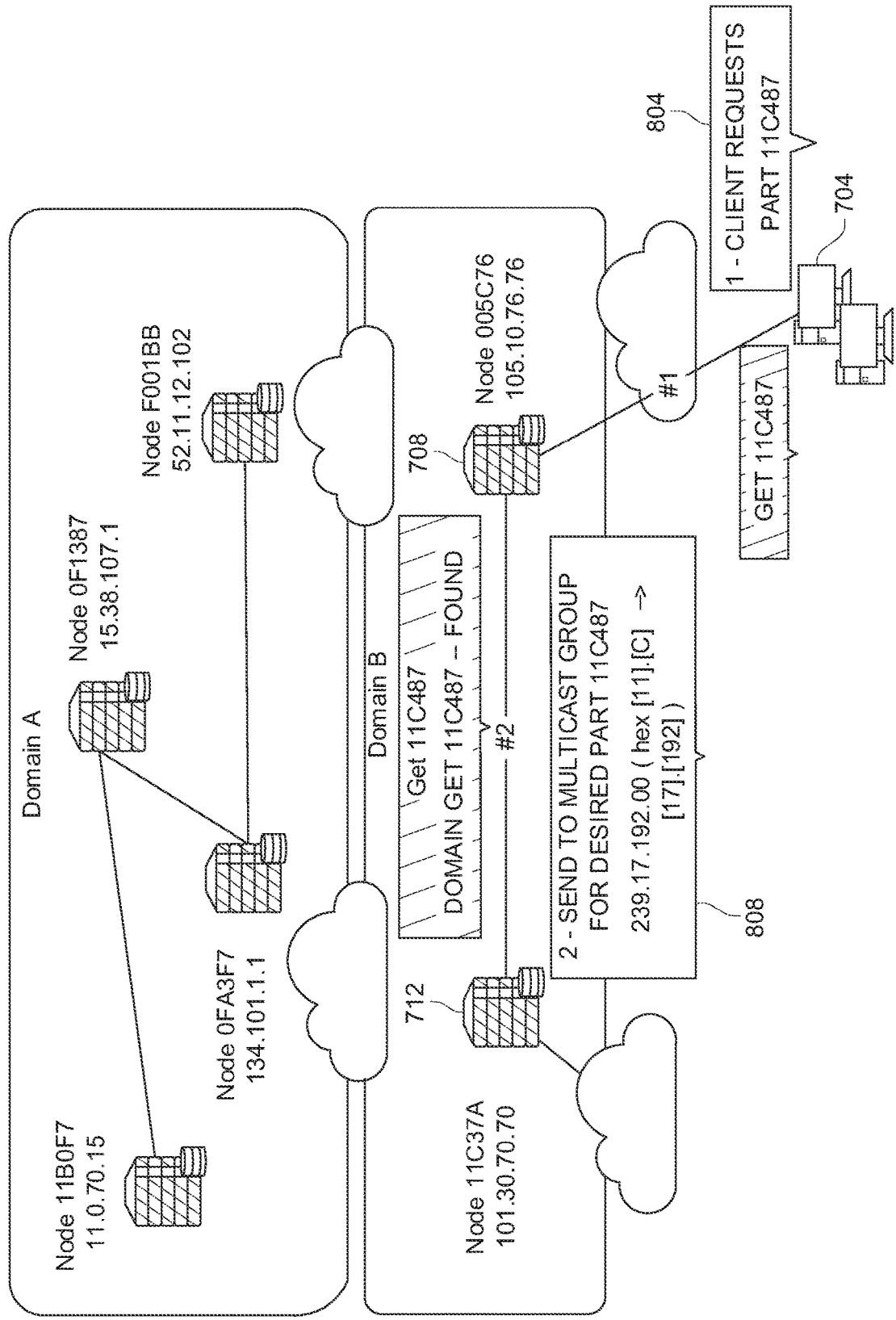
FIG. 8 shows an example of a first fabric node in a domain acquiring a content object part from a second fabric node in the same domain in response to a client sending a request for the content object part to the first fabric node, when the first fabric node does not have the content object part.

FIG. 7 shows an example of a content routing method for retrieving a content object part, and FIG. 8 shows an example of a first fabric node in a domain acquiring a content object part from a second fabric node in the same domain in response to a client sending a request for the content object part to the first fabric node, when the first fabric node does not have the content object part. In FIGS. 7 and 8, a client 704 is in communication with an egress node 708, which is in communication with other fabric nodes 712 in a target multicast group within the domain of egress node 708, labeled "Domain B" in FIG. 8.

In FIG. 7, two stages of content routing are illustrated: first, intra-domain routing 714, and then inter-domain routing 715. Both types of routing are explained in greater detail herein. At 720, client 704 sends to egress node 708 a request to GET a content object part, illustrated in box 804 in FIG. 8. In response to this request, egress node 708 calculates a partition for the requested content object part and determines whether the requested part is local to node 708, that is, in one of the partitions of node 708, as shown in FIG. 7. If egress node 708 finds, at 722, the requested content object part stored on a disk or other memory at egress node 708, egress node 708 returns the found part to client 704 at 724.

If egress node 708 does not find the requested content object part locally, egress node 708 initiates an intra-domain GET at 730, where egress node 708 transmits a GET message to intra-domain nodes 712 using a network address for the calculated partition such as a multicast address, passing the content object part's part ID and, in some instances, identifiers of preferred nodes based on the fabric nodes' ML-predicted performance scores. An example of the GET message is illustrated in box 808 of FIG. 8. In FIG. 7, if one or more of intra-domain nodes 712 find the requested content object part at 732, the node(s) 712 return at 734 the requested part to egress node 708, which can then relay the found part to client 704 at 740. In some implementations, when two or more of intra-domain nodes 712 have the requested content object part, each node 712 returns a respective non-overlapping segment of the content object part. Such can be desirable to avoid a redundant transmission of data from multiple fabric nodes that respond to a request. Responding fabric nodes can compute non-overlapping segments within the requested content object part according to a position derived from data in the multicasted request.

In FIG. 7, when no intra-domain nodes 712 are able to find the requested content object part, inter-domain routing 715 begins. In some implementations, egress node 708 looks up a narrowest, or most precise, match for the partition in egress node 708's copy of an inter-domain routing tree. In some implementations, egress node 708 finds the most specific match to the target partition that has currently known fabric nodes and sends a request to the best scoring of these fabric nodes, identified in FIG. 7 as best match node 716.

Figure 9:
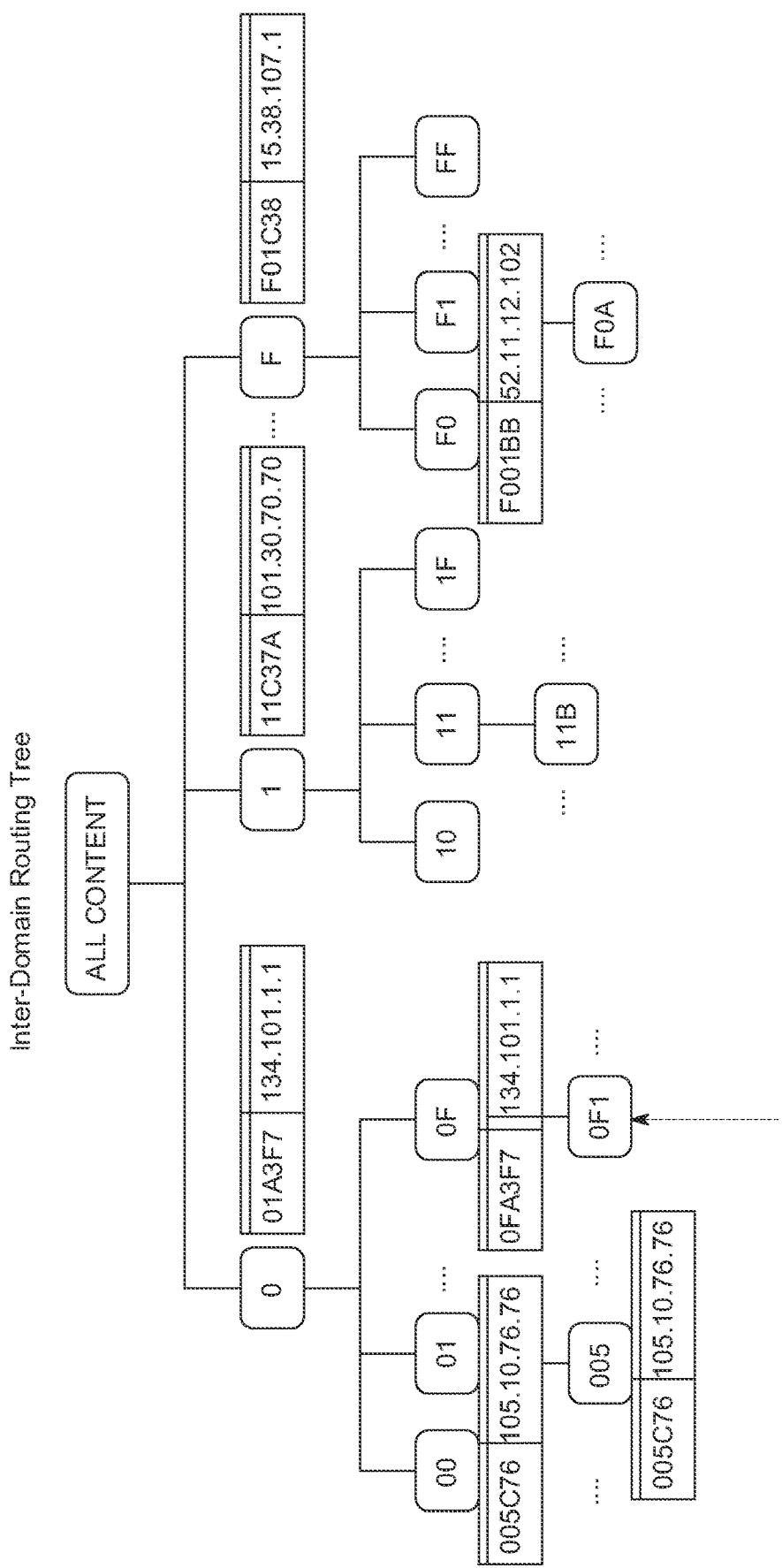
FIG. 9 shows an example of an inter-domain routing tree illustrating the location of a content object part using a designated partition level.

For instance, FIG. 9 shows an example of an inter-domain routing tree illustrating the location of a content object part, '0f 1a 66 aa 4d 5e 6f 7a ab be cd de of 76 e3 a8 44 98 b4 c5 11 00 34 dd 3d 47 a8 91 32 fa 01 12', using a designated partition level. Using such a routing tree, returning to FIG. 7, an IP address of best match node 716 is retrieved, so egress node 708 can send, at 744, a GET to best match node 716 to request the content object part.

In some implementations, the inter-domain routing converges on average to find a domain outside of egress node 708's domain containing the content object part within well fewer than log(n) steps and within a maximum of log(n) steps (where n is the number of domains in the network), and once the domain is found, the intra-domain lookup is performed in the external domain to return the content object part immediately. In some implementations, the inter-domain routing protocol uses a routing table such as that illustrated in FIG. 9 structured as a binary tree where each level in the tree corresponds to increasingly specific "levels" within the partition ID being searched for, and a list of node IDs and their address details that are known to have that partition ID.

Figure 10:
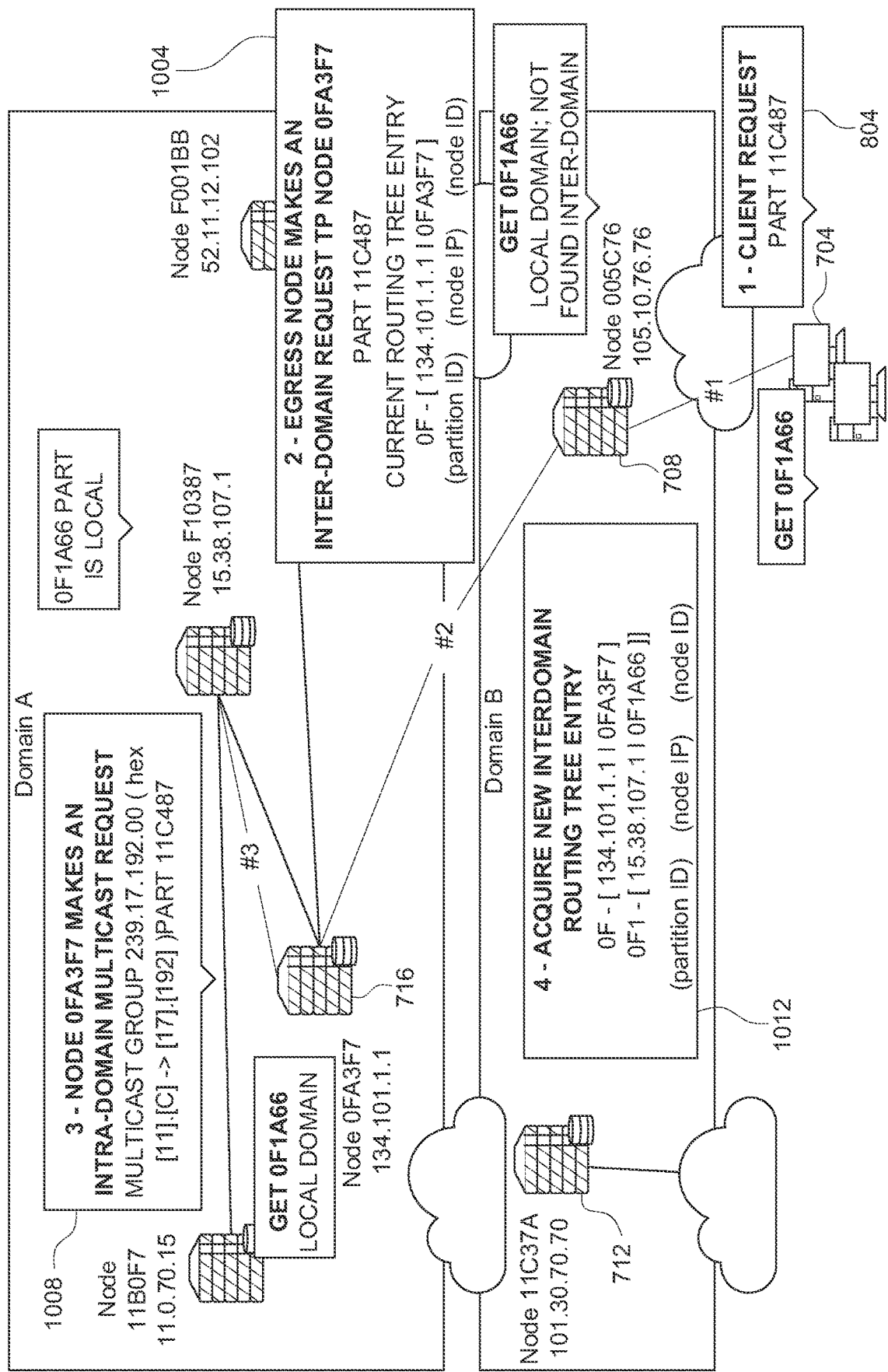
FIG. 10 shows an example of a first fabric node in a first domain acquiring a content object part from a second fabric node in a second domain outside of the first domain in response to a client sending a request for the content object part to the first fabric node, when the first fabric node does not have the content object part.

FIG. 10 shows an example of a first fabric node in a first domain acquiring a content object part from a second fabric node in a second domain outside of the first domain in response to a client sending a request for the content object part to the first fabric node, when the first fabric node does not have the content object part. FIG. 10 is similar to FIG. 8 in some respects, with like reference numerals indicating like parts. In FIG. 10, inter-domain routing requests are sent from Domain B to Domain A, as illustrated. For instance, an example of egress node 708 making an inter-domain GET request 744 is illustrated by box 1004. Returning to FIG. 7, if best match node 716 has the requested content object part, at 745, best match node 716 returns the requested part to egress node 708. If best match node 716 does not have the requested content object part, at 746, best match node 716 can perform operations 730 and 734 within Domain A to find a fabric node within Domain A that has the requested part. Returning to the example of FIG. 10, operations 730 and 734 performed by node 716 are illustrated in box 1008.

If the requested content object part is retrieved in Domain A at 747 of FIG. 7, target nodes in Domain A send respective non-overlapping segments of the content object part back through egress node 708 to client 704 at 752. At this stage, it is desirable for egress node 708 to update its inter-domain routing tree of FIG. 9 with node IDs that responded with content object parts for the designated partition. An example of such an update is illustrated in box 1012 of FIG. 10.

It should also be noted that in instances when no fabric nodes in Domain A of FIG. 10 have the requested content object part, additional inter-domain routing can be performed between Domain B and other domains such as Domains C, D, etc. That is, egress node 708 can send requests to high scoring fabric nodes in the next level up, e.g., less specific, that are known to have matching partitions.

In some implementations, PUT-ing a new content object part into the overlay network uses a similar method as GET-ing a content object part. For instance, when a client makes a request to a fabric node, such as an ingress node as described below, to PUT the content object part, the ingress node can multicast the content object part on the multicast groups associated with the ingress node's partition ID, and desirably enough fabric nodes respond to meet a replication requirement for the network. Else the ingress node consults the inter-domain routing tree and publishes the content object part by again finding the most specific matching known fabric node(s), which apply intra-domain routing until a sufficient number of matching target fabric nodes are returned. The new content object part is transmitted to these fabric node(s), and the routing tree is updated with learned node IDs and address details.

Figure 11:
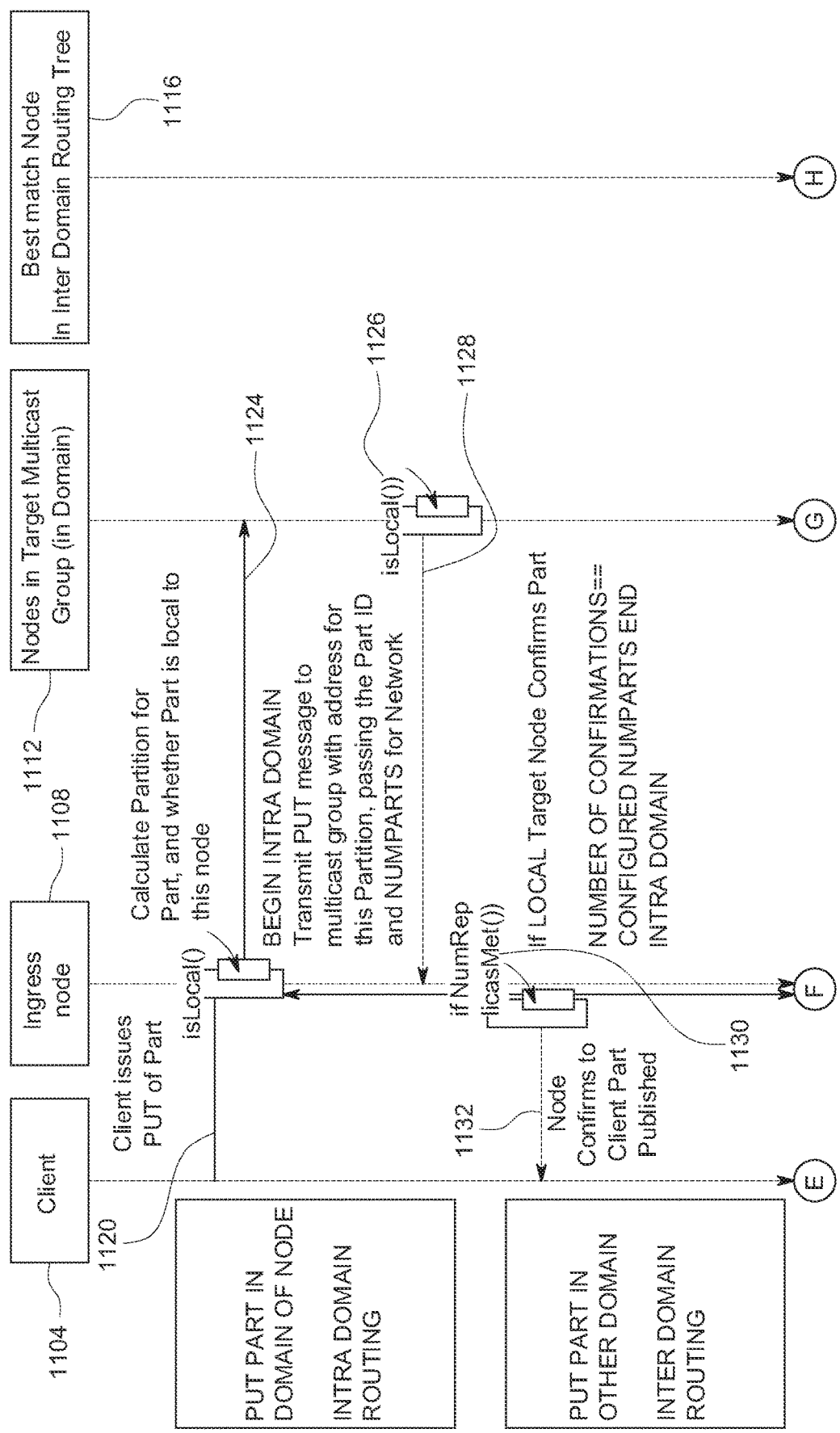
FIG. 11 shows an example of a content routing method for publishing a content object part into the content fabric.
Figure 11:
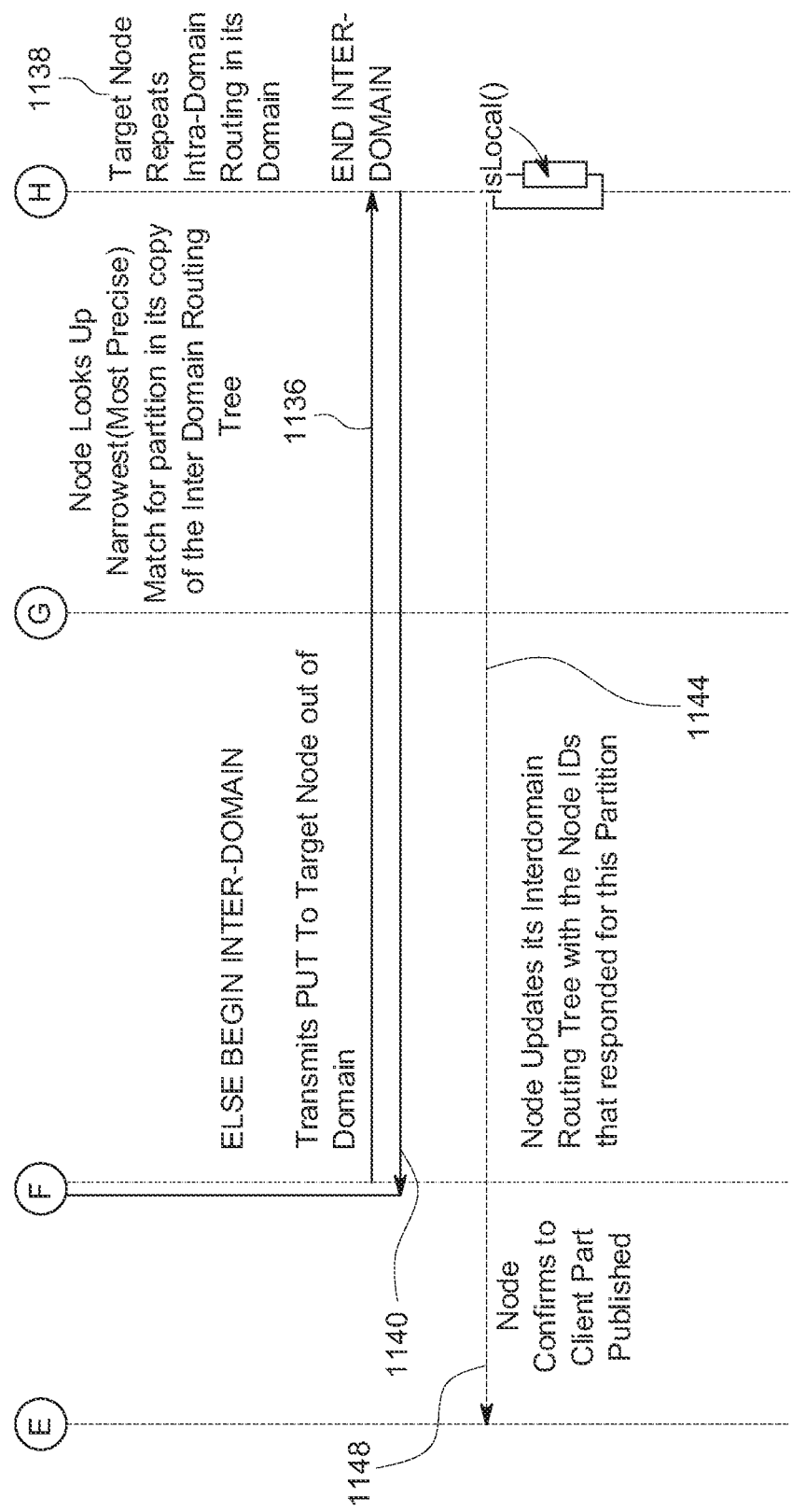

FIG. 11 shows an example of a content routing method for publishing a content object part into the content fabric. In FIG. 11, entities participating in the publishing include a client 1104, an ingress node 1108, intra-domain fabric nodes 1112, that is, in the domain of ingress node 1108, and a best match node 1116 referring to a best match node in an inter-domain routing tree as described above with reference to FIG. 9. In FIG. 11, at 1120, client 1104 issues a PUT of a content object part to ingress node 1108. In response to the PUT, ingress node 1108 calculates a partition for the content object part and determines whether the content object part is to be stored locally at ingress node 1108. At 1124, ingress node 1108 begins intra-domain routing by transmitting a PUT message to intra-domain nodes 1112, with an address for the partition, passing a part ID and numparts. The part ID identifies the content object part.

In FIG. 11, at 1126, if one or more intra-domain nodes 1112 can confirm that the content object part can be stored locally at the one or more nodes 1112, at 1128, the node(s) 1112 communicate(s) back to ingress node 1108 a confirmation message. At 1130, if the number of confirmations is equal to or greater than a desired number of replicas indicated by numparts, then registration is complete, in which case ingress node 1108 can confirm, at 1132, back to client 1104 that the content object part has been successfully published. Returning to 1128, if the number of confirmations received back from nodes 1112 is less than numparts, the method continues at 1136 where ingress node 1108 transmits a PUT to a target node outside of the domain of ingress node 1108. In this example, the target node is best match node 1116 identified using the inter-domain routing tree.

In FIG. 11, best match node 1116 can perform and repeat intra-domain routing in the domain of node 1116, at 1138, as described above. That is, node 1116 can perform PUTs in the fabric nodes in that domain. If, at 1140, the number of confirmations back from nodes in the domain of best match node 1116 plus the number of confirmations at 1128 does not equal or exceed numparts, inter-domain routing to additional different domains can be performed. Target nodes that accept and store the content object part in response to the PUT return confirmations at 1144 back to ingress node 1108, at which point ingress node 1108 can update its inter-domain routing tree with the node IDs of the target nodes that responded for the partition. Then, at 1148, ingress node 1108 confirms back to client 1104 that the content object part was successfully published.

In some implementations, a continuous ML system allows individual clients to learn fabric nodes and paths that yield high performance.

In some implementations, the content fabric provides an overlay network where fabric nodes are equal participants in a full mesh network, and content object parts including raw data, metadata and code are delivered. Thus, it is not required for the overlay network to have direct knowledge of the underlying Internet topology and routing infrastructure. When a client makes a request of the content fabric to GET content, the client is directly served by a fabric node, which is referred to herein as an egress node for the sake of ML. That egress node either has the content object part or searches to find a fabric node that can supply the content object part, as described in greater detail herein. The supplying fabric node is referred to herein as an origin node for the sake of ML.

In some implementations, in terms of delivery quality, it can be desirable to optimize with ML:

start-up latency: it can be desirable for a client to receive parts with minimum latency, for instance, meeting the "200 milliseconds" considered instantaneous by human perception, to start playing/experiencing served content.

delivery bandwidth: it can be desirable for clients to receive streams and downloads from the content fabric such that their "bottleneck bandwidth" in their connection to the Internet is the bottleneck in receiving speed.

least use of core Internet bandwidth: to minimize cost, it can be desirable to use the core Internet bandwidth as little as possible given meeting the client quality targets. Thus, it can be desirable to "localize" the selection of egress and origin nodes to avoid crossing the Internet core as much as possible.

Given the overlay network model, in some implementations, two separate dimensions can be independently optimized and in turn "learned"—the selection of an egress node, and the selection of an origin node relative to an egress, which is called an "egress-origin segment." Additionally some implementations optimize these features for each individual client, meaning that not all clients will prefer the same choices and that some implementations cannot know a priori a good choice for a client except to "learn" from appropriate peers.

Some implementations construct a collaborative filtering system in which individual clients learn the best egress nodes and the best egress-origin segments by learning from "like" clients. Specifically, some implementations train a collaborative filtering model where clients learn from clients in their own regions to select egress nodes and learn from all clients to select egress-origin segments.

Thus, in some implementations, each client request is served by: an origin node with constrained bandwidth and capacity, an egress-origin segment in the overlay comprised of underlying network links that can be congested, an egress node with constrained bandwidth and capacity, and a client-egress segment which may not be controlled by the system.

As client requests are fulfilled, some implementations record the delivery bandwidth and time to first byte attributable to the egress-origin segment and attributable to the egress nodes.

Some implementations use the score of the segments and egress node to train the model. And some implementations use the trained model to identify best segments to route subsequent requests.

In some implementations, a collaborative filtering method simultaneously derives the underlying features and the prediction function and minimizes the cost functions for each in two separate applications of the model: one that maximizes the delivery bandwidth, and a second that minimizes the time to first byte (or time to first segment). Some implementations apply the collaborative filtering method independently to the egress-origin segment measurements and the egress node measurements to predict the future scores for each value (bandwidth and time to first byte), for each client, and the model learns expected scores for new clients.

The training may occur in near real-time to ensure that the content fabric adapts fast to changes in resources, failed fabric nodes etc. In some implementations, a computational matrix to continually train this system can scale with the number of clients and the number of paths between fabric nodes. Modern TPU and parallel processing systems are often equipped to perform fast matrix multiplication on very large scale matrices such as "billion×billion" dimensions and learning.

Figure 12:
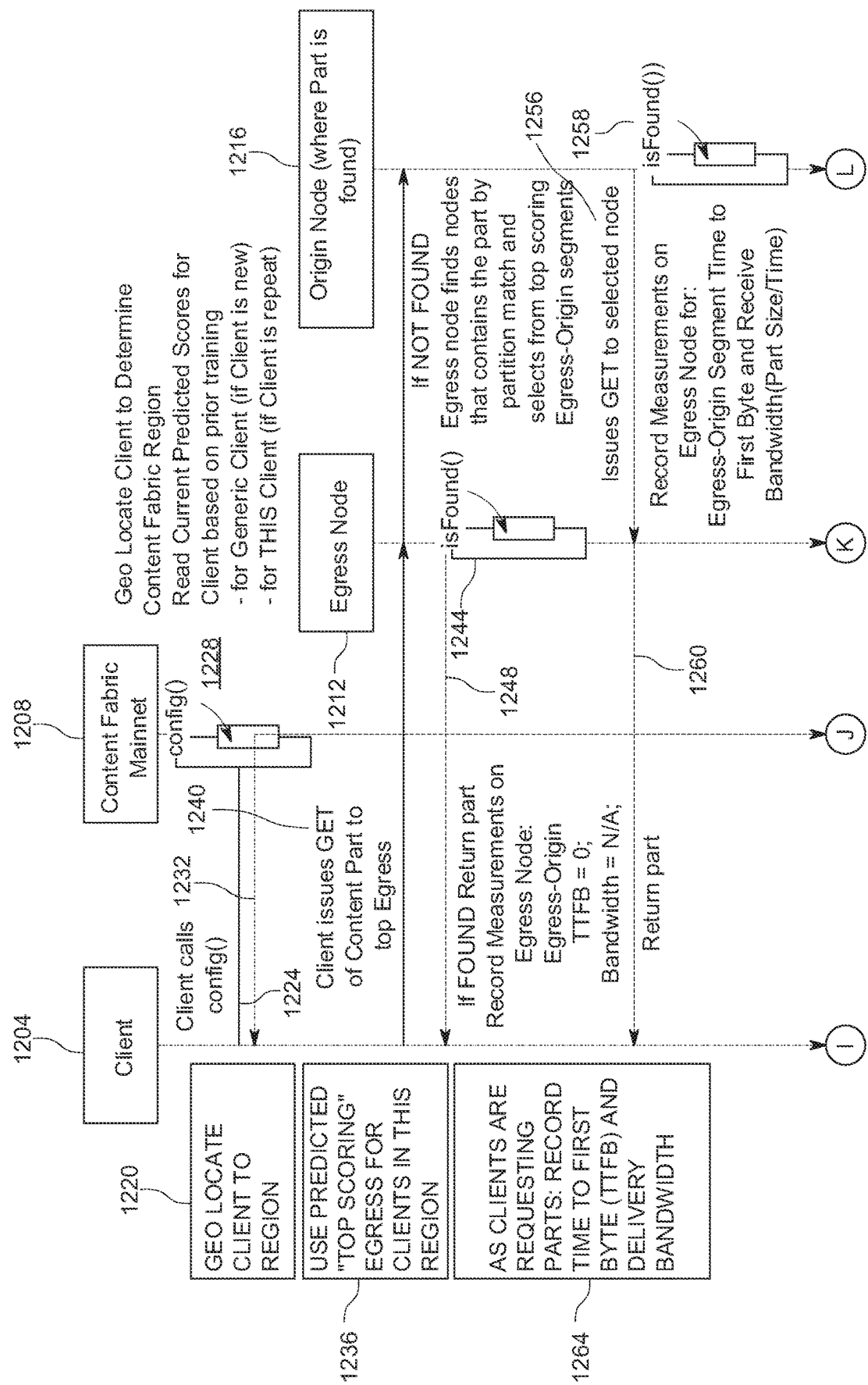
FIG. 12 shows an example of a continuous machine learning (ML) method for predicting best performing egress nodes and egress-origin segments per client.
Figure 12:
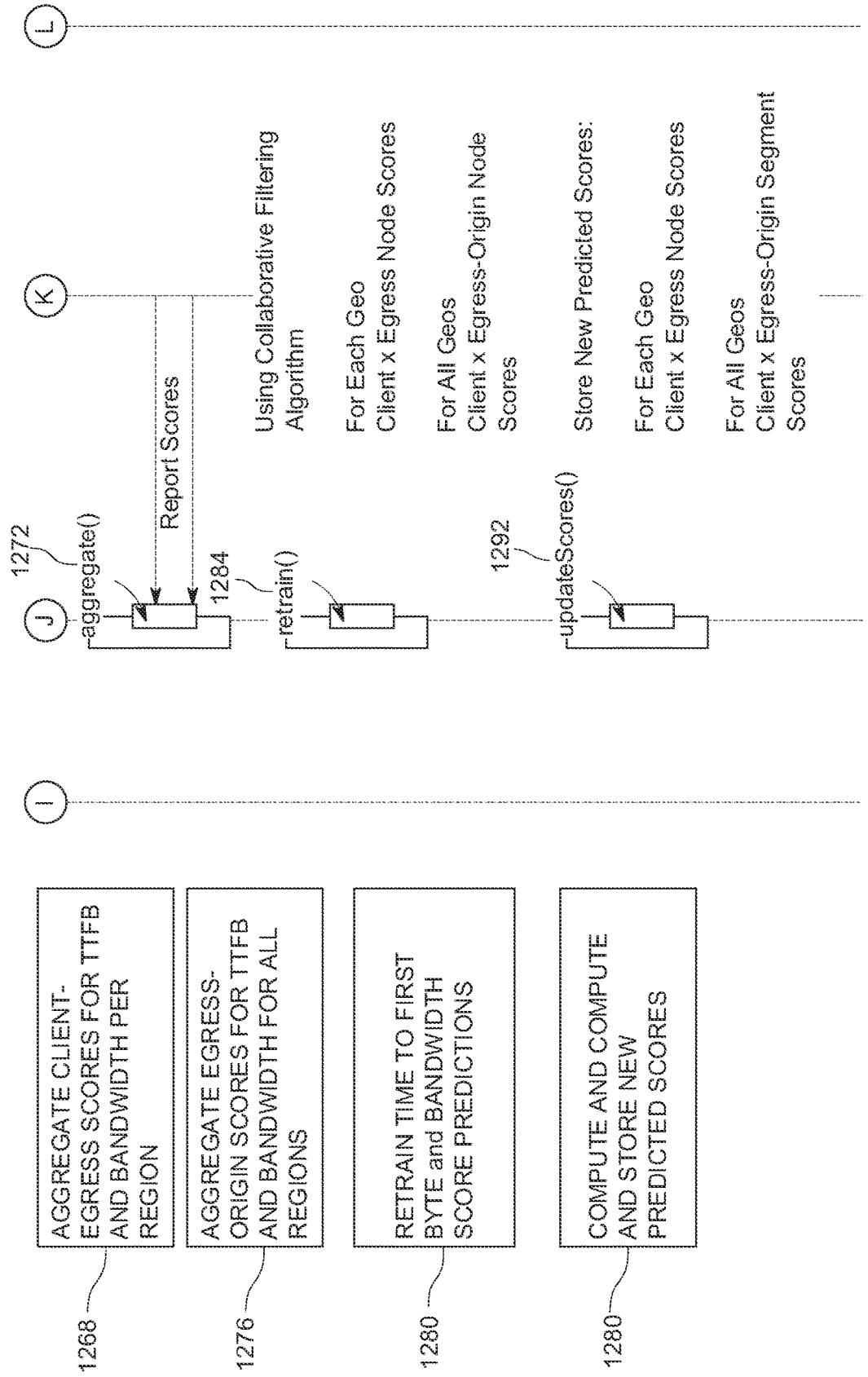

FIG. 12 shows an example of a continuous machine learning (ML) method for predicting best performing egress nodes and egress-origin segments per client. In FIG. 12, participating entities include a client 1204, an ML system 1208 implemented on one or more fabric nodes of the content fabric, an egress node 1212, and an origin node 1216. At stage 1220 of FIG. 12, ML system 1208 is configured to geo-locate client 1204 to determine a geographic region of the content fabric to serve client 1204. In this example, at 1224, client 1204 calls a config( ) method at system 1208. At 1228, ML system 1208 performs the config( ) method to geo-locate client 1204, and the corresponding content fabric geographic region is returned from system 1208 to client 1204 at 1232.

In the example of FIG. 12, current predicted scores for fabric nodes in the determined geographic region for client 1204 are read at 1236 and are based on prior training. The prediction can be for a generic client in situations where client 1204 is new to system 1208. In other instances, when client 1204 is a repeat, the prediction can be specific to client 1204. The current predicted scores are used by ML system 1208 to identify a top scoring egress node for clients in the determined content fabric region. In this example, the top scoring egress node is egress node 1212. Thus, at 1240, client 1204 issues a GET of a content object part to egress node 1212. If egress node 1212 finds at 1244 the requested content object part, at 1248, egress node 1212 returns the found part back to client 1204. In instances where egress node 1212 is unable to find the requested content object part in memory or otherwise local to egress node 1212, at 1252, egress node 1212 finds among the top scoring egress-origin segments the origin nodes that contain the requested content object part by partition match and issues a GET using the intra-domain and inter-domain protocols described in greater detail herein to these origin nodes. In this example, origin node 1216 completes a high scoring egress-origin segment for egress node 1212, and contains the desired contain object part by partition match. Thus, at 1256, egress node 1212 issues a GET to origin node 1216, origin node 1216 identifies the content object part at 1258, and egress node 1212 receives the desired content object part from origin node 1216. The content object part is then returned from egress node 1212 back to client 1204 at 1260.

In FIG. 12, in some implementations, at 1264, measurements can be recorded as content object parts are found and delivered to client 1204. In this example, when egress node 1212 finds the content object part on origin node 1216, egress node 1212 can record measurements detailing the egress-origin segment, time to first byte (TTFB) to receive the content object part, and bandwidth as well as other parameters, as illustrated in FIG. 12. Also, in instances when egress node 1212 has the requested content object part, such measurements can be recorded, in which case, TTFB=0, and bandwidth is not applicable (N/A). Also, as content object parts are returned to client 1204, client-egress scores for TTFB and bandwidth per region can be aggregated at 1268 by ML system 1208. In some implementations, such scores are retrieved from egress node 1212 for aggregation 1272. In some implementations, egress-origin scores are also aggregated for TTFB and bandwidth for all geographic regions at 1276 of FIG. 12.

In the example of FIG. 12, at 1280, TTFB and bandwidth score predictions can be retrained using these aggregated measurements. For instance, as illustrated by reference numeral 1284, ML system 1208 can retrain using a collaborative filtering method using egress node measurements for each geographic region and egress-origin node measurements for all geographic regions in this example. Then, at 1288, new predicted scores can be computed and stored in memory by system 1208. For instance, system 1208 can call an updatescores( ) method 1292 to store new predicted scores. For example, for each geographic region, egress node scores can be stored, and for all geographic regions, egress-origin segment scores can be stored.

In some implementations, in addition to selecting the best egress and content routes based on ML, popular content can be opportunistically cached in the available capacity of the fabric nodes. In some implementations, to select the best content to cache, a second continuous learning model can be used to predict most popular content, and can be used in conjunction with JIT rendering of multiple versions of output media through bitcode in the content fabric.

Predicting popular content can be considered a "time series" problem. For time series prediction, a gradient boosting decision tree is applied in some implementations. In some other implementations, sequential models may be used. In some implementations, the gradient boosting decision tree is applied to a screening data set, where features include content request time, content request duration, content title, playout platform, and other content metadata.

In some implementations, there are two ways to split time series data into training, validation, and testing: a side-by-side split and a walk-forward split. In the side-by-side split, which can be used for a mainstream ML model, the data set is split into at least two portions, one used for training and the other used for testing (with the timeframe of both aligned). The walk-forward split, in comparison, is aimed specifically at data sets with a strong correlation with time.

Figure 13:
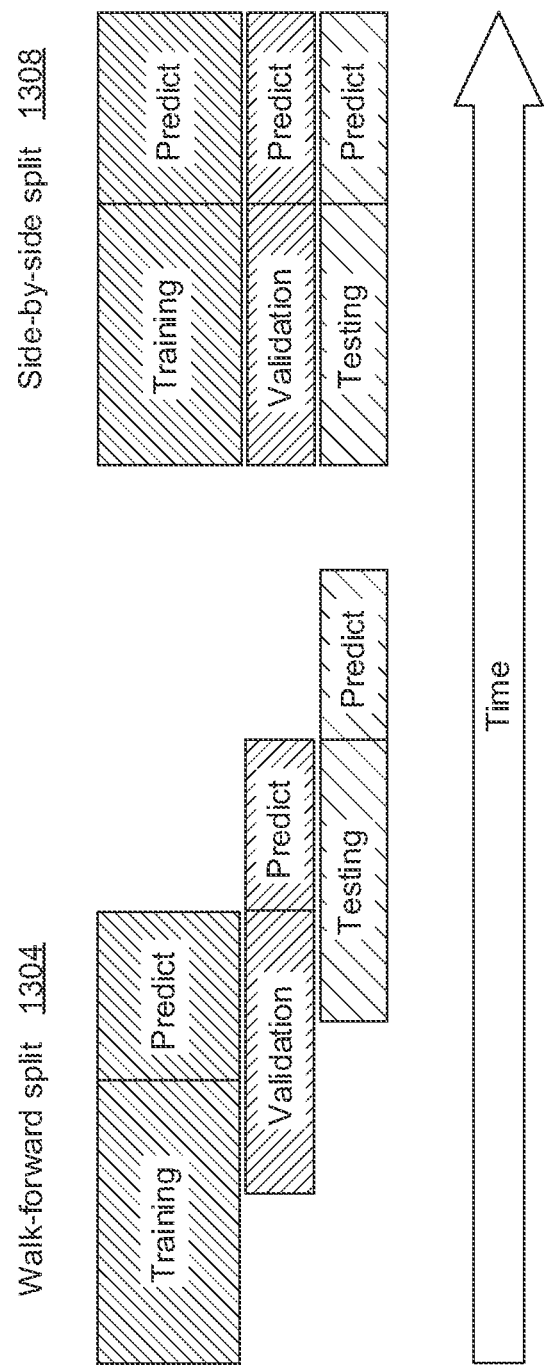
FIG. 13 shows an example of split schemes for training, validation, and testing in a timeframe, where the timeframe of a data set chosen for validation is shifted forward by one prediction interval relative to the timeframe for training.

FIG. 13 shows an example of split schemes for training, validation, and testing in a timeframe, where the timeframe of a data set chosen for validation is shifted forward by one prediction interval relative to the timeframe for training. A walk-forward split 1304 and a side-by-side split 1308 are shown. As shown in FIG. 13, train, validate and test can be performed on the full data set but over different timeframes. Some implementations use a walk-forward split approach, and experimentation can be performed to determine the optimal time duration and time offset in the model.

In some implementations, the model includes a number of features such as content categories, streaming type, request day of the week, and request lifetime, as well as a number of statistical features derived from the data set, such as time windows of popularity, global attention statistics and past request aggregation from previous time periods. For aggregation methods, some implementations use mean, median, max, min, days since, and differences of mean values between adjacent time windows.

In some implementations, the content fabric provides a universal (type and size agnostic) distributed storage solution for digital content that is fundamentally different than conventional distributed file systems and cloud storage in a few key ways: 1) the content fabric avoids duplication of storage or network bandwidth transmission as the content is re-purposed for various output versions, 2) the content fabric provides flexible personalization of the media delivered (programmability), and 3) the content fabric includes intrinsic versioning and an ability to prove the validity of a piece of content and its version history.

In some implementations, a content object's data is stored in data containers called content object parts. A content object part is the fundamental unit of storage, network transfer and caching as mentioned above. A content object part is immutable once finalized and identified by a hash value that is calculated across all of the content object part's content. Thanks to the use of a cryptographic hash function, the authenticity of a content object part's data can be verified by recalculating the hash. The hash also serves as criterion for data deduplication.

In some implementations, when file data is ingested into the content fabric, the file data is automatically partitioned into content object parts to desirably have a consistent part size. Large file data can be split up and stored in multiple content object parts. Multiple small files can be aggregated into a single content object part. User-provided metadata can also be stored in the content object parts, as described above with reference to FIG. 1. In some implementations, even fabric-internal data structures such as a list of content object parts or content verification proofs can be stored in content object parts. In some implementations, the content object is a small data structure that references content object parts by hash and is stored itself as a content object part.

Figure 14:
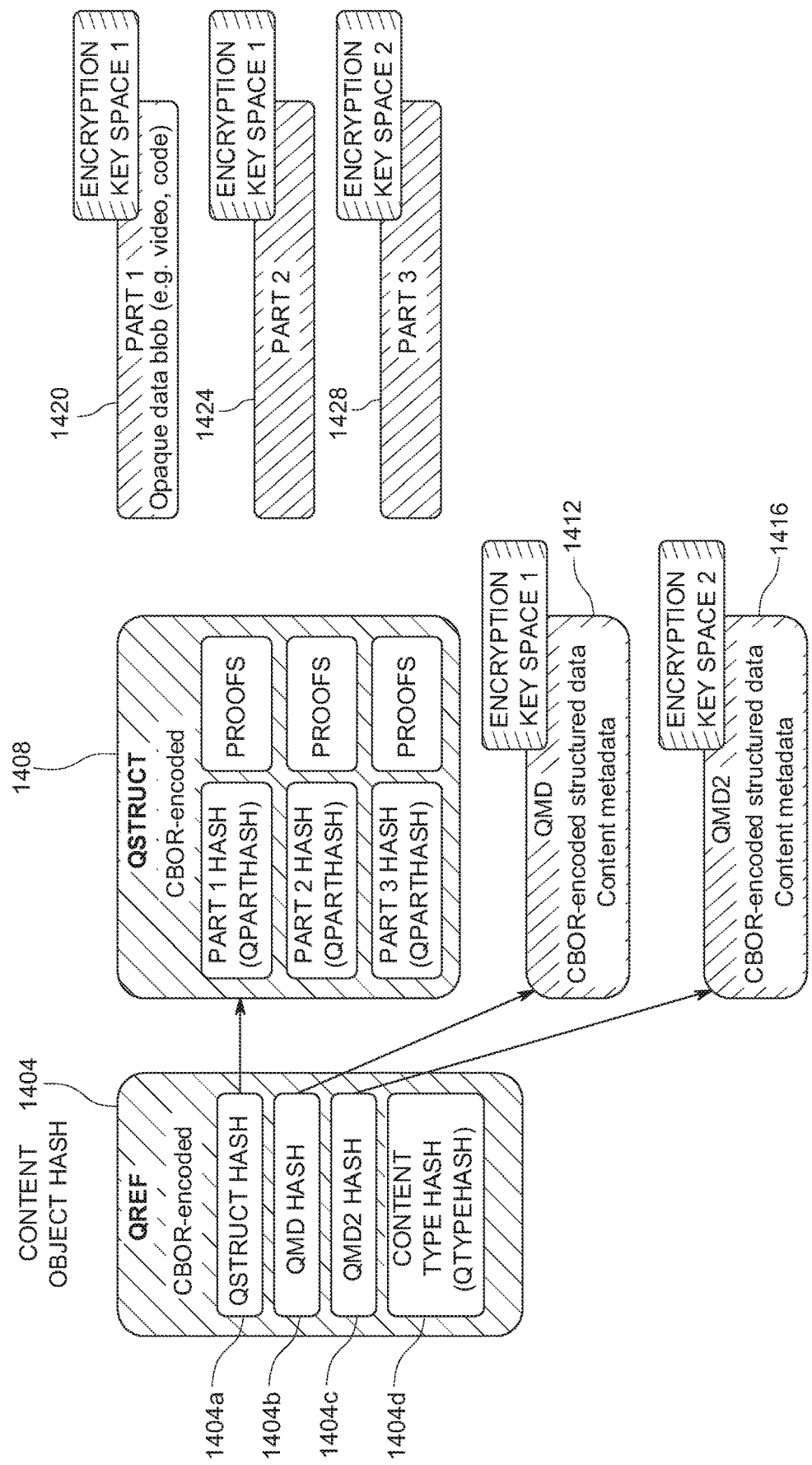
FIG. 14 shows an example of a content object structure in the content fabric.

FIG. 14 shows an example of a content object structure in the content fabric. In this example, a content object includes structural portions in the form of QREF 1404 and QSTRUCT 1408. The content object also includes data portions in the form of metadata QMD 1412 and QMD2 1416, as well as opaque data in the form of opaque data parts 1420, 1424 and 1428. For instance, one or more of opaque data parts 1420-1428 can be an opaque data blob such as raw data and/or code.

In FIG. 14, QREF 1404 of the content object is a content object hash. For instance, the QREF can be encoded in the Concise Binary Object Representation (CBOR) format. CBOR can be desirable in some implementations because CBOR is JSON-like and schema-less, but more efficient in size and faster in processing. The use of a standard encoding format can facilitate validation of the authenticity of metadata: the content object part hash allows validation of the content object part's binary content, while the open format allows extraction of the metadata from it.

In this example, QREF 1404 has sub-components including a QSTRUCT hash 1404a, a QMD hash 1404b, a QMD2 hash 1404c, and a content type hash labeled QTYPEHASH 1404d. In this example, QSTRUCT hash 1404a is a hash of QSTRUCT 1408, which is also CBOR-encoded in this example. QSTRUCT 1408 includes hashes of opaque data parts 1420, 1424 and 1428 as well as associated proofs. In QREF 1404, QMD hash 1404b is a hash of QMD 1412, which is CBOR-encoded structured data stored in an encryption key space 1. By the same token, QMD2 hash 1404c of QREF 1404 is a hash of QMD2 1416, which is also CBOR-encoded structured data and stored in encryption key space 2, as shown in FIG. 14. Opaque data parts 1420-1428 can also be stored in designated encryption key spaces as illustrated in FIG. 14.

In some implementations, using a hierarchical reference structure, content objects scale from small to very large. In some implementations, none of the employed structures impose a limit on size, neither for binary data nor for metadata. The reference structure also provides efficient and fast versioning of content. In some implementations, creating a new version of content includes copying the reference structure, pointing back at the previous version's data, and then creating new structures and data for the pieces that change in the new version. For example, adding a new file to an existing content object results in a new (set of) data, a modified subset of metadata, and updated internal structures. Existing file data (represented as existing content object parts) and the unchanged metadata subset are not duplicated in some implementations.

Figure 15:
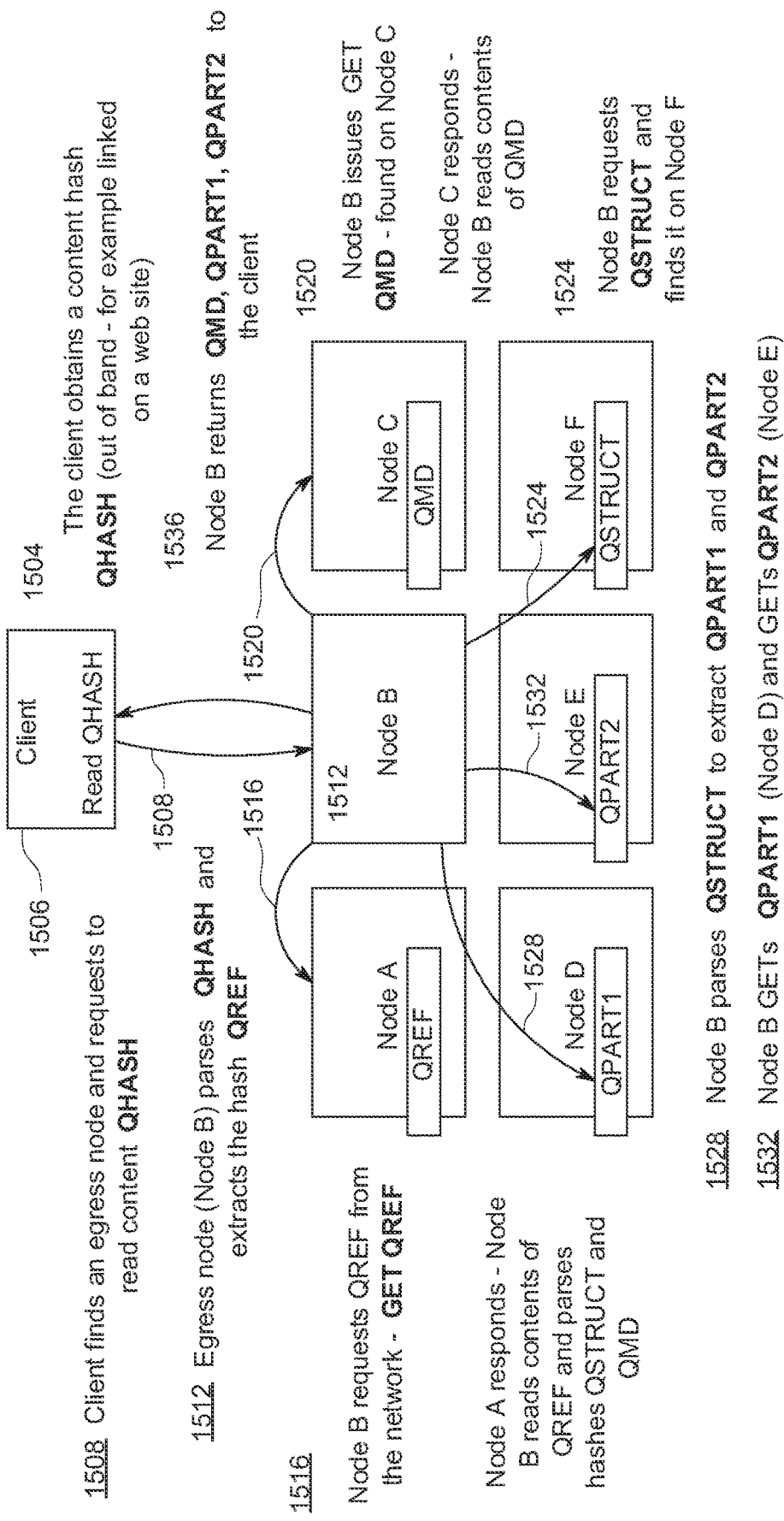
FIG. 15 shows an example of a method for finding content objects by hash.

FIG. 15 shows an example of a method for finding content objects by hash. At 1504, a client 1506 obtains a content hash, QHASH, out of band, for example, linked on a website. At 1508, client 1506 finds an egress node and requests to read content identified by QHASH. An example of such an egress node is node B of FIG. 15. At 1512, node B parses QHASH and extracts a content object hash, QREF, in this example. At 1516, node B requests QREF from the content fabric, for instance, using a GET QREF command. In this example, node A of FIG. 15 has QREF and, thus, responds. Node B can then read contents of QREF and parse hashes QSTRUCT and QMD from QREF, as illustrated in FIG. 14. At 1520 of FIG. 15, node B issues a GET QMD, and node C responds since QMD is stored on node C, as shown in FIG. 15. So node B can read contents of QMD. At 1524, node B requests QSTRUCT and finds QSTRUCT on node F. When node B retrieves QSTRUCT from node F, at 1528, node B parses QSTRUCT to extract QPART 1 and QPART 2. At 1532, node B then gets QPART 1 from node D and gets QPART 2 from node E, as shown in FIG. 15. At 1536, node B can return QMD, QPART1, and QPART2 to client 1506.

Figure 16:
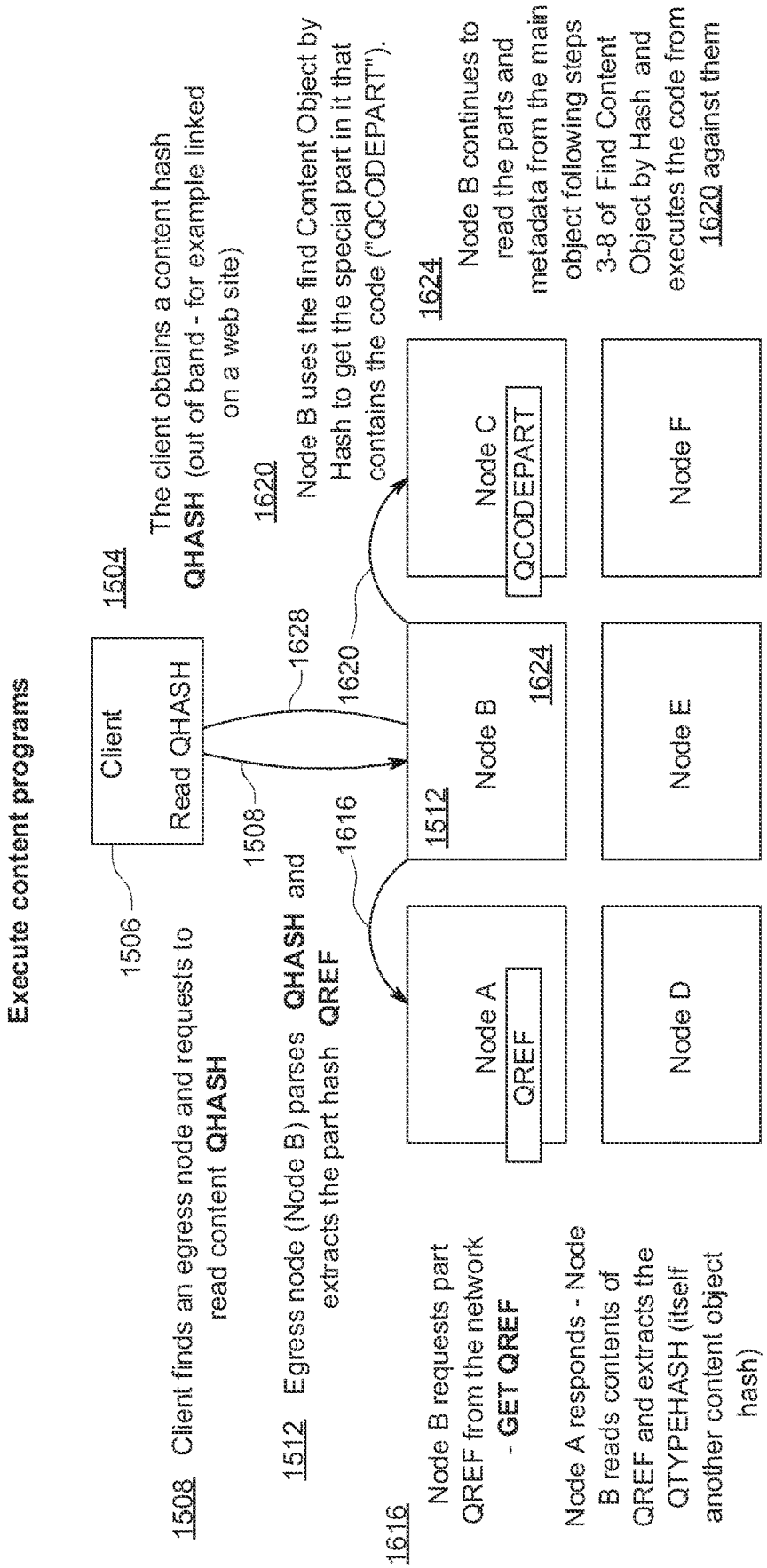
FIG. 16 shows an example of a method for executing content programs against content object parts and metadata.

FIG. 16 shows an example of a method for executing content programs against content object parts and metadata. In FIG. 16, client 1506 performs operations 1504 and 1508 as described above with reference to FIG. 15. Node B performs operation 1512 as also described above. At 1616 of FIG. 16, node B requests QREF from the content fabric using a GET QREF. In this example, node A responds, since node A has QREF. Node B then reads contents of QREF and extracts QTYPEHASH, referring to another content object hash. At 1620, node B finds the other content object by hash and extracts a portion in that content object that contains code, QCODEPART. At 1624, node B continues to read content object parts and metadata as described above at operations 1512-1532 of FIG. 15. Then, QCODEPART can be executed against the content object parts and metadata read at 1624. Results can then be returned to client 1506 at 1628.

Figure 17:
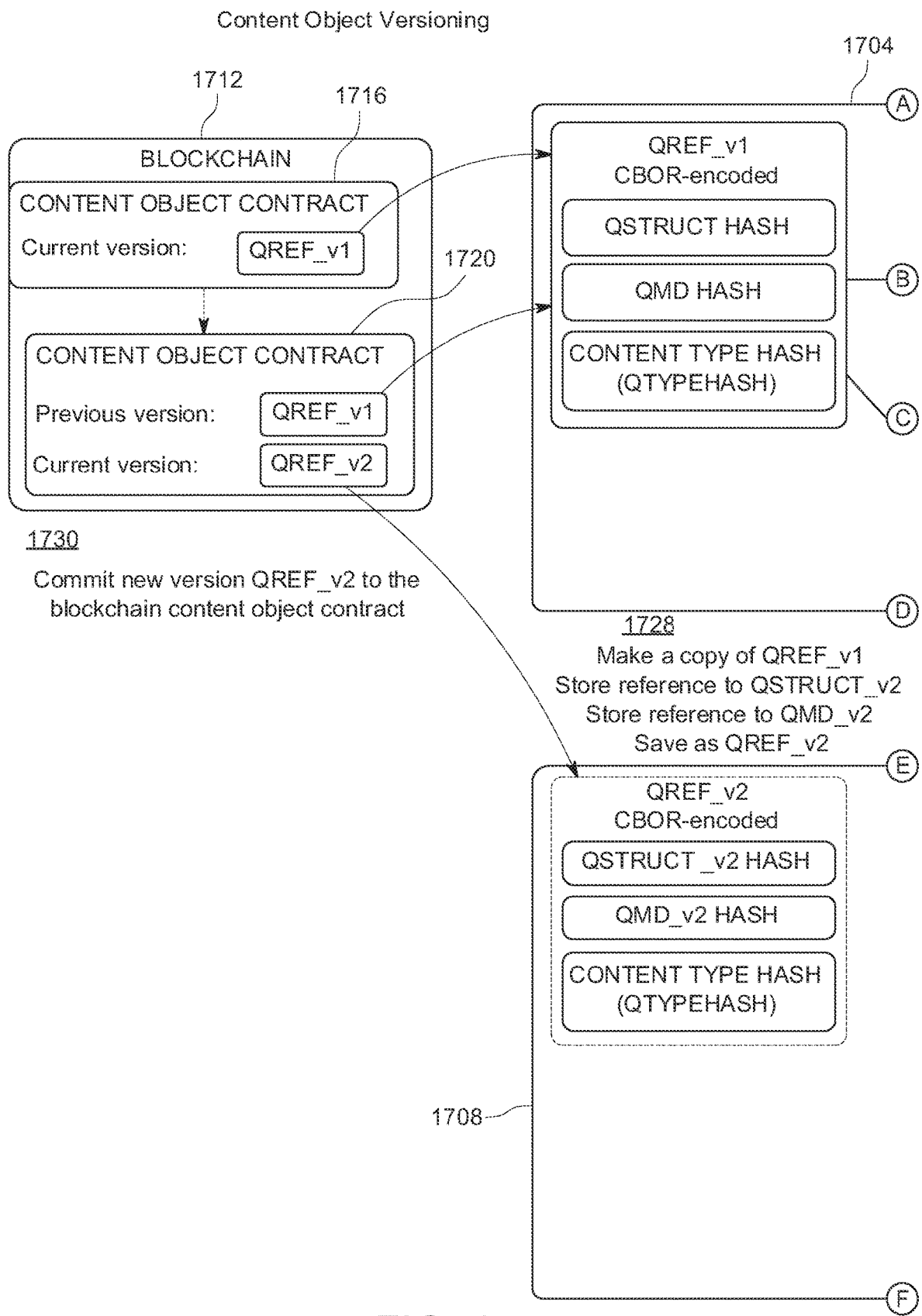
FIG. 17 shows an example of content object versioning.
Figure 17:
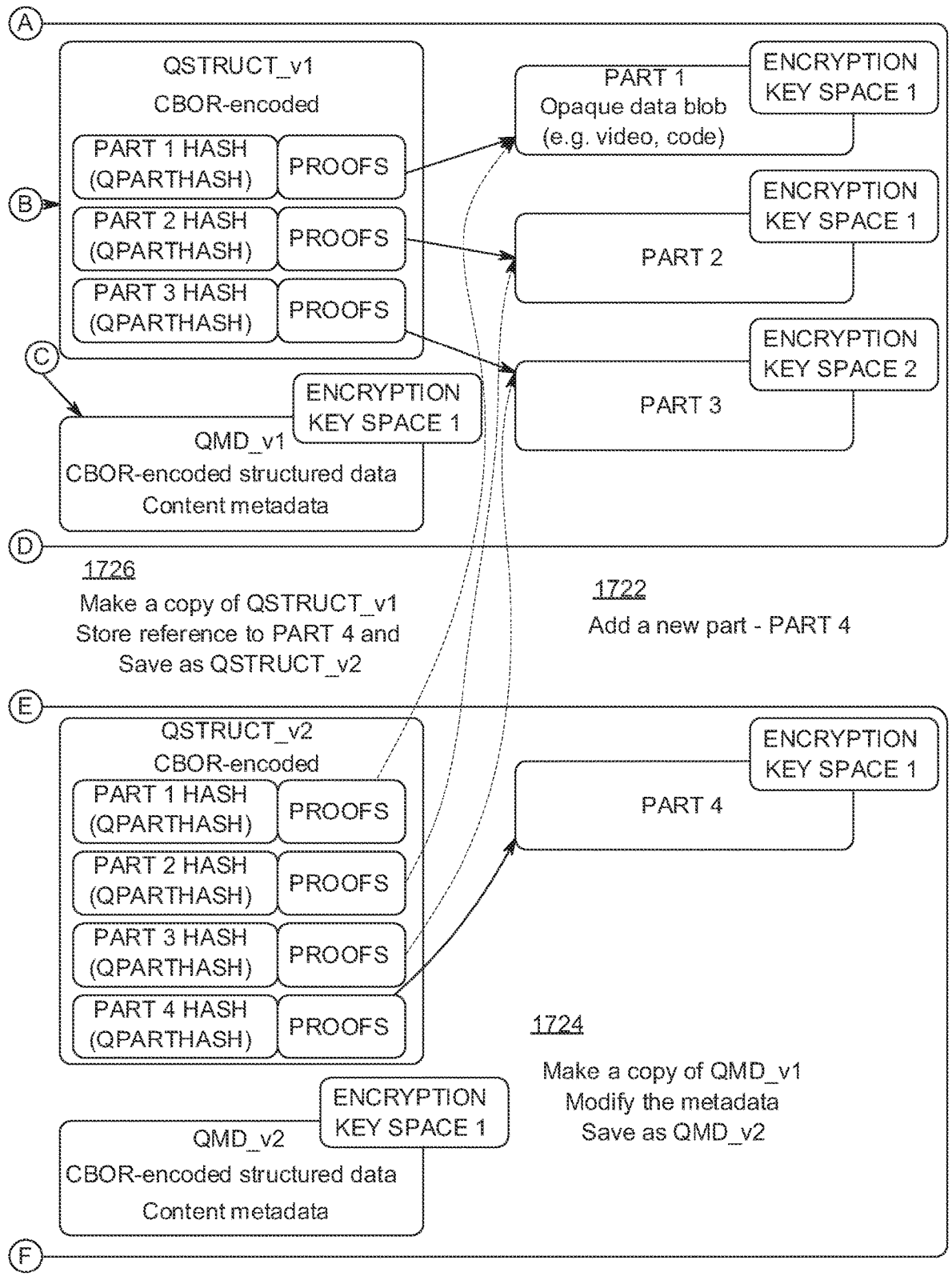

FIG. 17 shows an example of content object versioning. In FIG. 17, a first version 1704 of the content object structure of FIG. 14 is shown. A second version 1708 of the content object structure is also shown. In this example, a blockchain 1712 is also shown. In blockchain 1712 is a content object contract at a first point in time 1716 and at a second point in time 1720. In this example, at first time 1716, the contract identifies QREF_v1, that is, version 1704. At the later time 1720, the content object contract identifies QREF_v1 as the previous version, while QREF_v2, i.e., second version 1708, is identified as the current version.

In the example of FIG. 17, at 1722, there is an instruction to update version 1704 by adding a new part, labeled part 4 in this example. In response to this instruction, at 1724, a copy of the previous version of QMD, QMD_v1, is made, and QMD_v1 is modified and saved as QMD_v2 in second version 1708. At 1726, a copy of the first version of QSTRUCT, QSTRUCT_v1, is made, and a reference to part 4 is added to create a second version of QSTRUCT, QSTRUCT_v2, also shown in second version 1708. At 1728, a copy of QREF_v1 is made. References to QSTRUCT_v2 and QMD_v2 are stored and then saved as QREF_v2 in second version 1708. At 1730, QREF_v2 is recorded as the current version to the content object contract of blockchain 1712.

Figure 18:
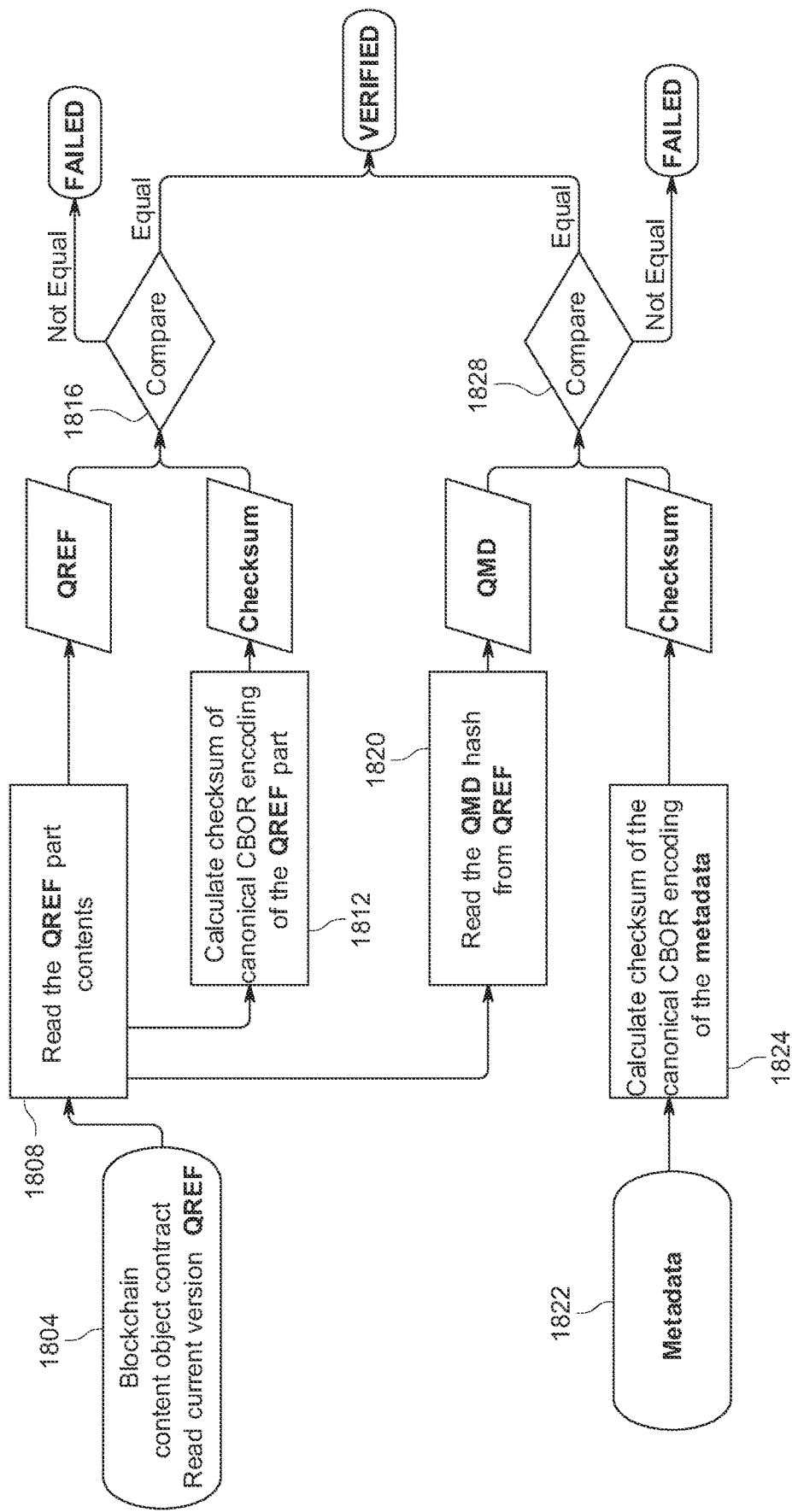
FIG. 18 shows an example of a method for verification of metadata in a content object.

FIG. 18 shows an example of a method for verification of metadata in a content object. In FIG. 18, at 1804, a current version of QREF is provided using a blockchain content object contract such as contract 1720 of FIG. 17. At 1808 of FIG. 18, QREF contents are read, for instance, in the form of hashes 1404a-1404d of FIG. 14. A checksum of canonical CBOR encoding of QREF is calculated at 1812 of FIG. 18. The checksum and QREF are compared at 1816. When QREF and the checksum are not equal, verification of the metadata fails. At 1816, when QREF and checksum are equal, verification is established. Returning to 1808, after reading the contents of QREF, at 1820, QMD hash 1404b of FIG. 14 is read. Metadata 1822 provided as an input in FIG. 18 is processed at 1824, where a checksum of canonical CBOR encoding of the metadata is calculated. This checksum is then compared at 1828 with the QMD hash read at 1820. When the QMD hash and checksum of 1824 are equal, verification is established. When the QMD hash and checksum of 1824 are not equal, verification fails.

Figure 19:
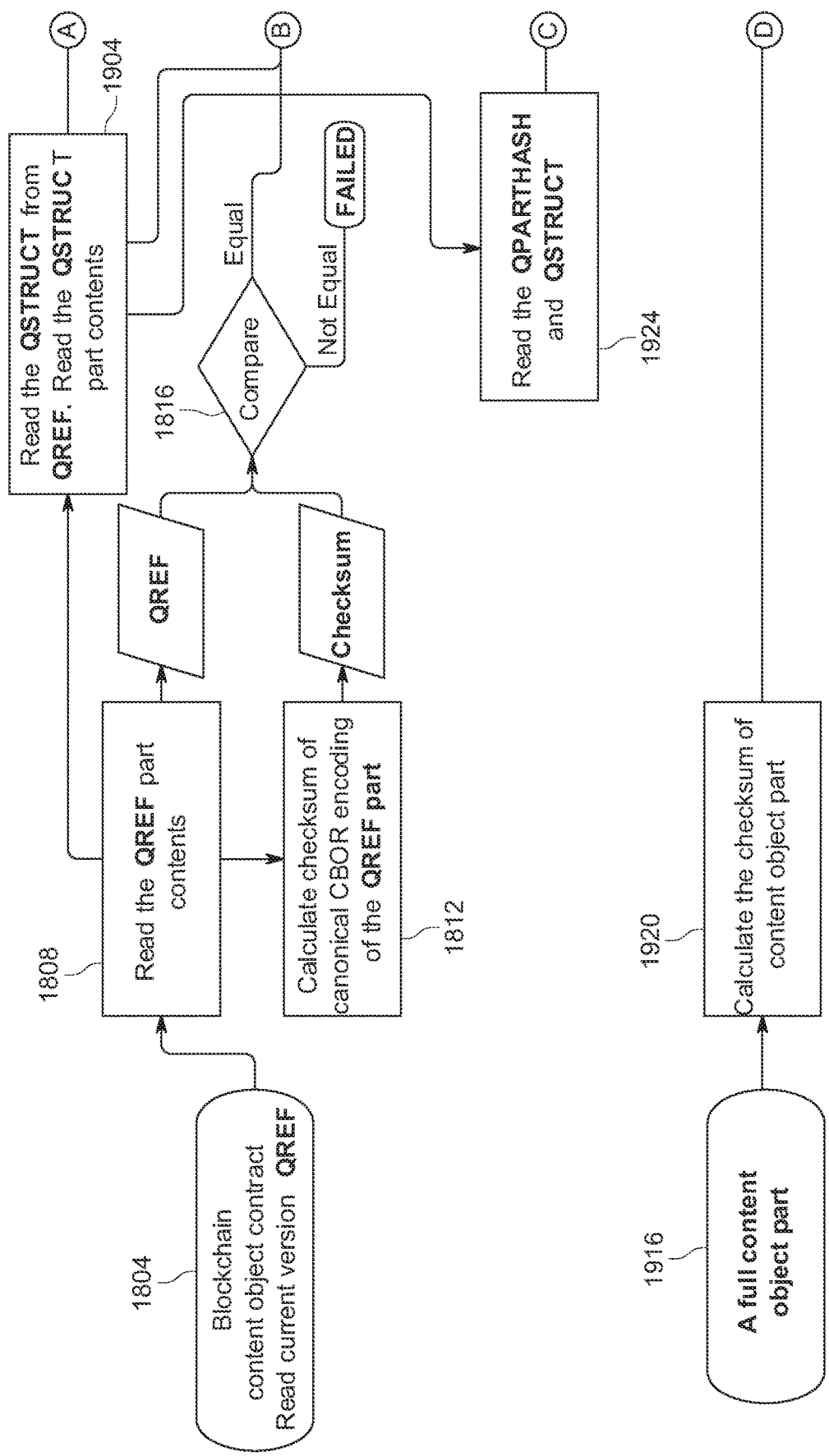
FIG. 19 shows an example of a method for verification of a full content object part.
Figure 19:
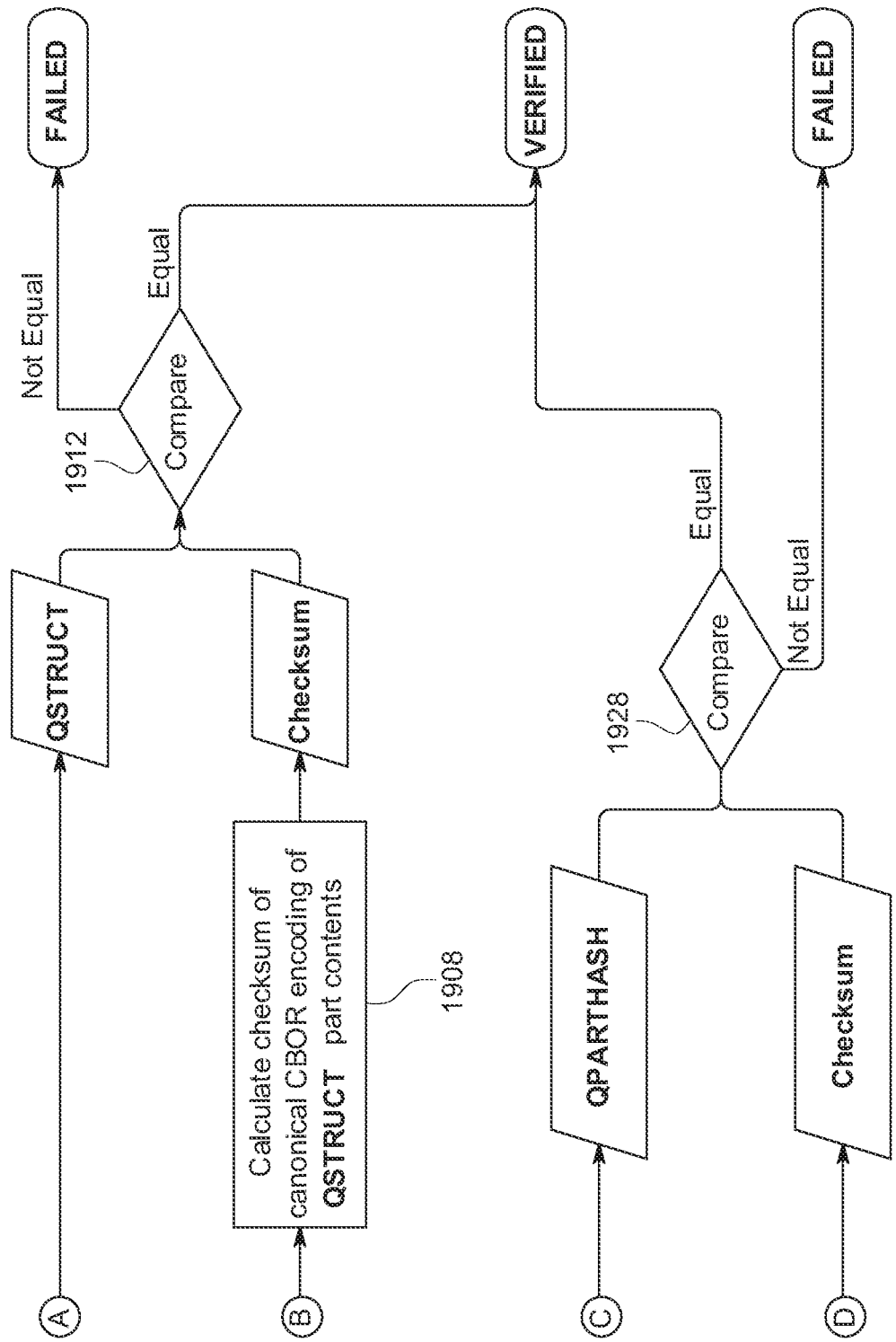

FIG. 19 shows an example of a method for verification of a full content object part. In FIG. 19, operations 1804, 1808, 1812 and 1816 as described above with reference to FIG. 18 are performed. In FIG. 19, following 1808, QSTRUCT hash 1404a of QREF 1404 of FIG. 14 is read at 1904 of FIG. 19. Following 1904, at 1908, a checksum of canonical CBOR encoding of QSTRUCT contents is calculated. This operation at 1908 also follows a determination at 1816 that operands are not equal. The QSTRUCT hash and checksum of 1908 are then compared at 1912. If the QSTRUCT hash and checksum are not equal, verification fails. If the QSTRUCT hash and checksum are equal, verification is established. Also, in FIG. 19, a full content object part is provided as an input at 1916. At 1920, a checksum of the content object part is calculated. This checksum is compared with a QPARTHASH read from QSTRUCT 1408 of FIG. 14 at 1924 of FIG. 19 in a compare operation at 1928. If the QPARTHASH and checksum of 1920 are not equal, verification fails. If the QPARTHASH and checksum of 1920 are equal, verification is established. It should also be noted that operation 1924 is desirably repeated for all QPARTHASHes contained in QSTRUCT 1408 of FIG. 14 for separate verifications, in some implementations.

Figure 20:
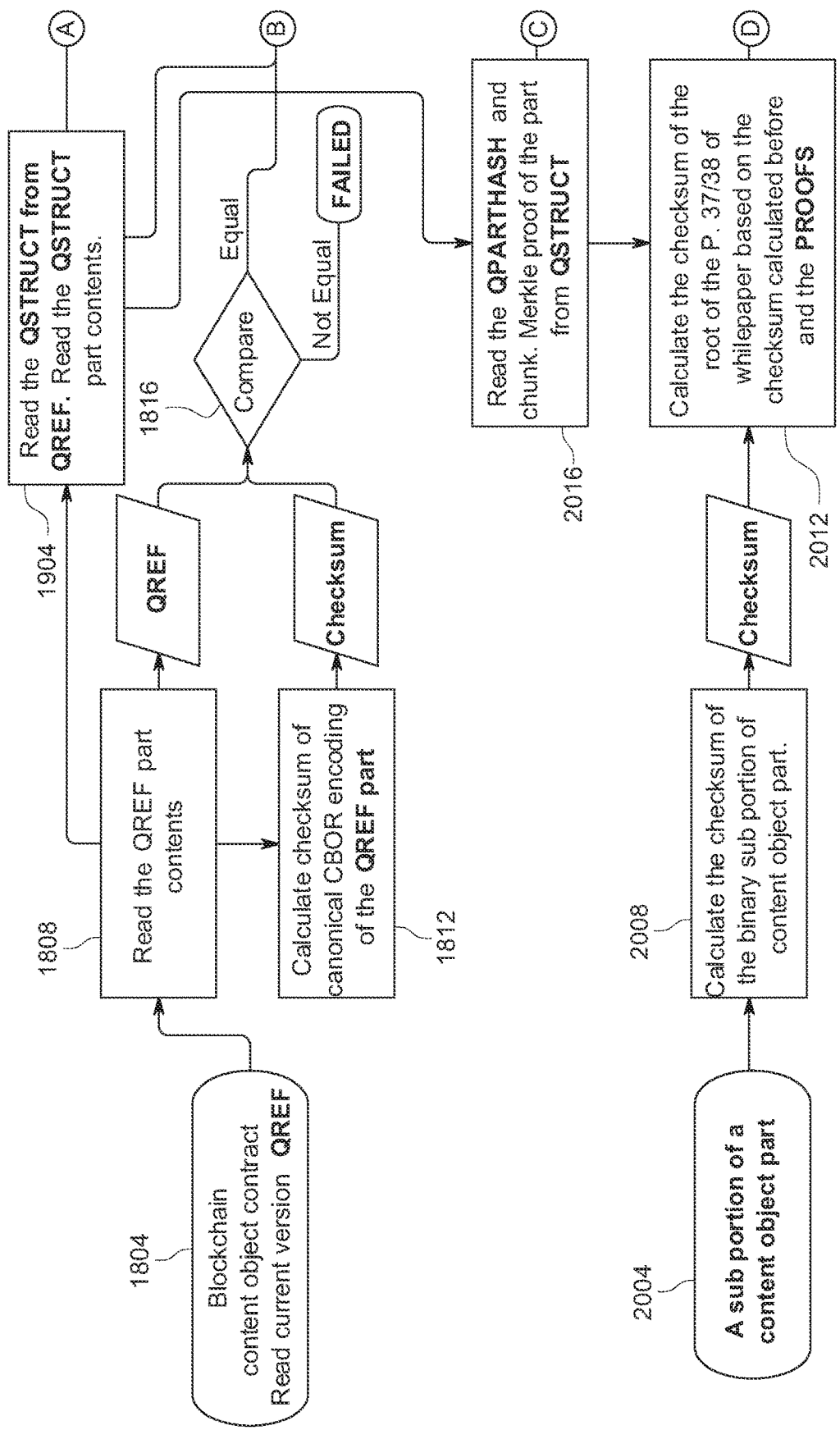
FIG. 20 shows an example of a method for verification of a sub-portion of a content object part.
Figure 20:
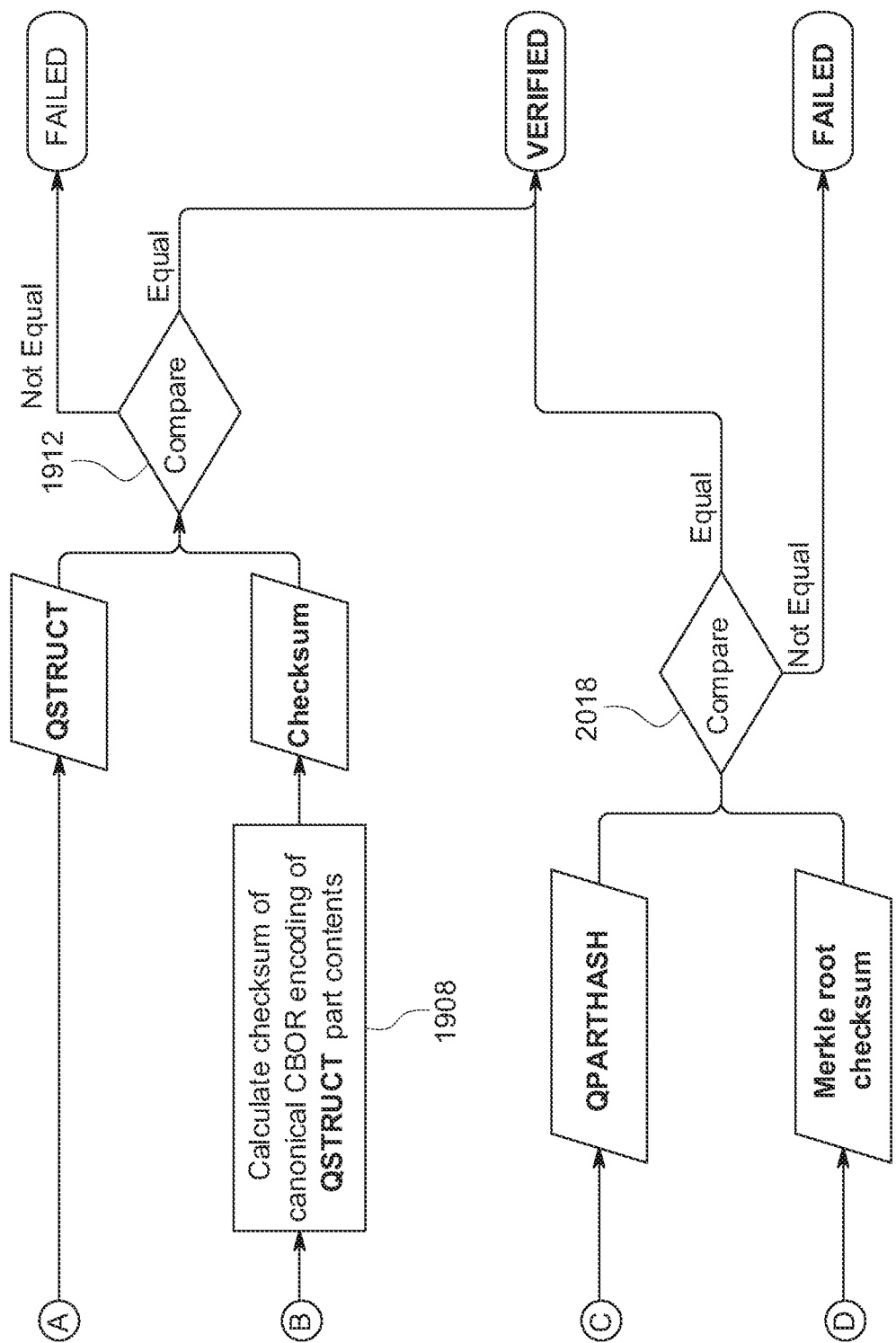

FIG. 20 shows an example of a method for verification of a sub-portion of a content object part. In FIG. 20, operations 1804, 1808, 1812, 1816, 1904, 1908 and 1912 are performed in the manner described above with reference to FIGS. 18 and 19. In FIG. 20, rather than a full content object part being provided as an input, a binary sub-portion of a content object part is provided as an input at 2004. At 2008, a checksum of the sub-portion of the content object part is calculated. Then, at 2012, a checksum of the root of a chunk Merkle tree based on the checksum calculated at 2008 and based on proofs is calculated. At 2016, following 1904 in FIG. 20, QPARTHASH is read from QSTRUCT obtained at 1904, and the Chunk Merkle Proof, as described in greater detail herein, based on QSTRUCT is calculated. Then, QPARTHASH is compared with the Merkle root checksum of 2012 at 2018. When QPARTHASH and the Merkle root checksum are not equal, verification fails. When QPARTHASH and the Merkle root checksum are equal, verification is established.

In some implementations, re-use of the same content in creation of output variants, and consequent benefits to distribution efficiency and personalization, are facilitated in the content fabric through use of JIT compilation capabilities that allow multiple front end compilers to leverage the optimization of compilation to machine code (backend compilation) for multiple source code languages. In some implementations, the system compiles the source code to an intermediate representation language, e.g., abstract syntax tree (AST), and allows for development of maximally optimized compilation of AST to machine code.

In some implementations, this method decouples "front end" compilation from source code, and "back end" compilation from source to machine code, via AST, and many beneficial side effects, one of which is the ability to support JIT compilation of source code to machine code via AST. Also, the system may use cross-platform compilation (static and dynamic). In some implementations, the content fabric benefits by providing a purpose-built "sandbox" for deploying code that modifies content objects. The sandbox can be part of the content fabric and can be extended to clients using application programming interfaces (APIs) via web assembly machine code (WASM).

In some implementations, bitcode can be written in any supported language, e.g., C++, Go and Javascript for WASM, but different languages may be used. Some implementations define an interface between the content fabric and modules loaded JIT that allows for a content fabric method to call into the module, and the module to call back into the content fabric method. This calling context can facilitate reading/writing content and metadata to/from the content fabric, and can facilitate a security sandbox for both authorizing code operations and metering their use of system resources (e.g., for compensation and charging).

Figure 21:
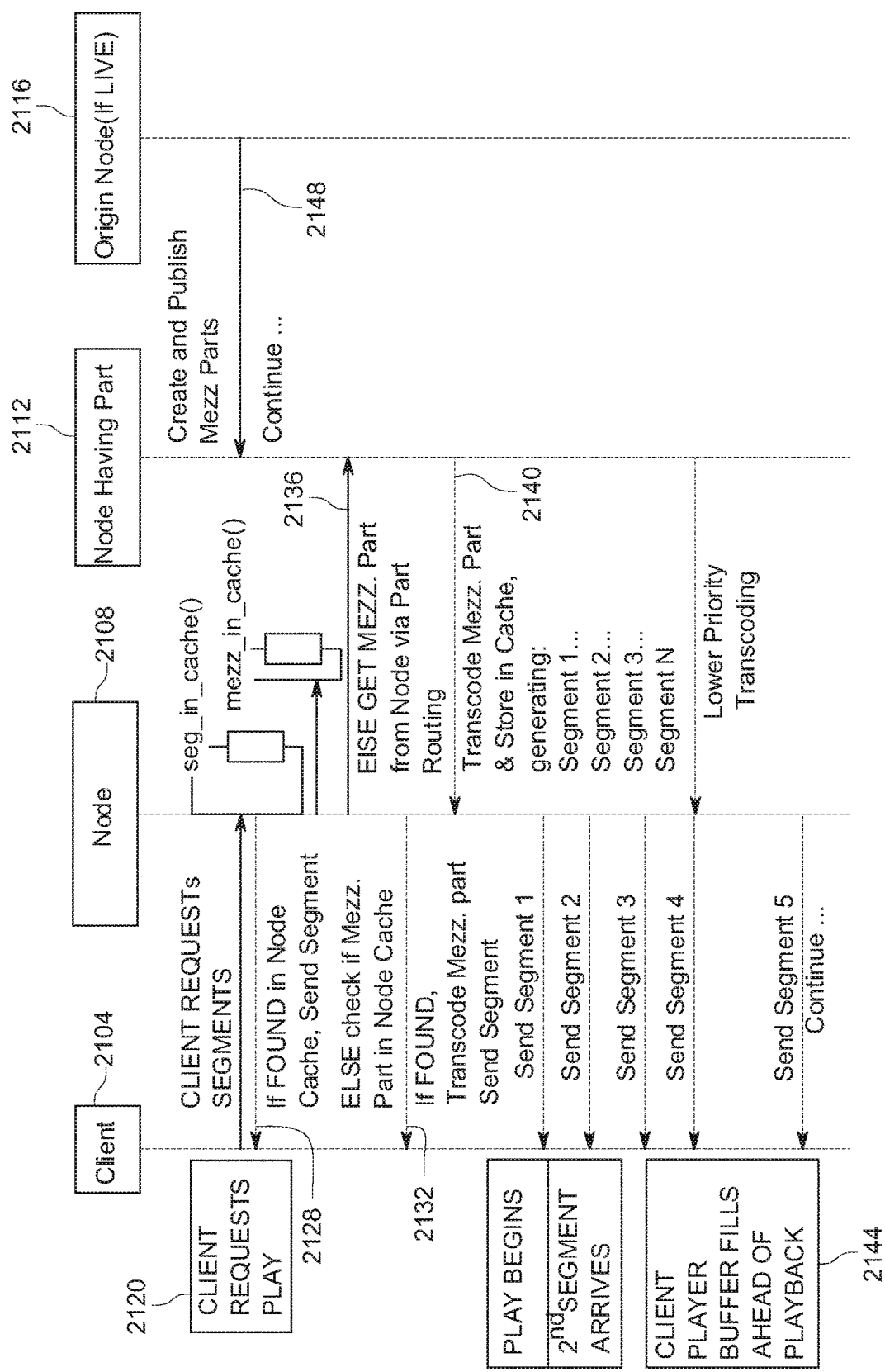
FIG. 21 shows an example of a method for just-in-time (JIT) transcoding, packaging and transport within the content fabric.

FIG. 21 shows an example of a method for just-in-time (JIT) transcoding, packaging and transport within the content fabric. Entities participating in the method of FIG. 21 include client 2104, a fabric node 2108, another fabric node having a desired content object part 2112, and an origin fabric node 2116 in the case of a live streaming implementation. At 2120 of FIG. 21, client 2014 requests to play digital content in the form of a video. At 2124, client 2104 requests a segment of the video from fabric node 2108. If fabric node 2108 finds at 2126 the requested segment in cache at node 2108, the segment is returned from node 2108 to client 2104 at 2128. In some instances, node 2108 is not able to find the requested segment in node 2108's cache, so node 2108 can determine at 2130 if a corresponding mezzanine-marked part, a higher bit rate version of the segment, is stored in node 2108's cache. If the mezzanine version is found, the mezzanine version can be transcoded and returned, at 2132, to client 2104.

In FIG. 21, in some instances, if the requested segment and the mezzanine version of the segment are not in cache at node 2108, node 2108 can send a GET for the mezzanine version to the node having the part 2112 at 2136, using routing methods described in greater detail herein. Node 2112 can return the mezzanine version to node 2108 at 2140. Node 2108 can then begin transcoding the received mezzanine version into individual segments 1, 2, 3, 4 . . . N at 2142. As the segments 1-N are transcoded, node 2108 sends the transcoded segments to client 2104, where the segments can be desirably buffered ahead of playback at 2144.

In FIG. 21, in the case of live transmission, in some implementations, it is desirable to create and publish mezzanine versions of segments from origin fabric node 2116 at 2148 as those mezzanine versions are available in the live transmission. In this way, latency can be minimized or eliminated in streaming live video as the live video is pushed into a pre-established content object structure.

In some implementations, new output variants can be introduced without having to create additional copies of a mezzanine source (language versions, territory versions, repairs, new playout device formats, etc.) and can be updated or extended without changing or taking down the content fabric. In some implementations, bitcode stored in content object parts in the content fabric can be versioned and updated without having to change other parts of the pipeline.

Figure 22:
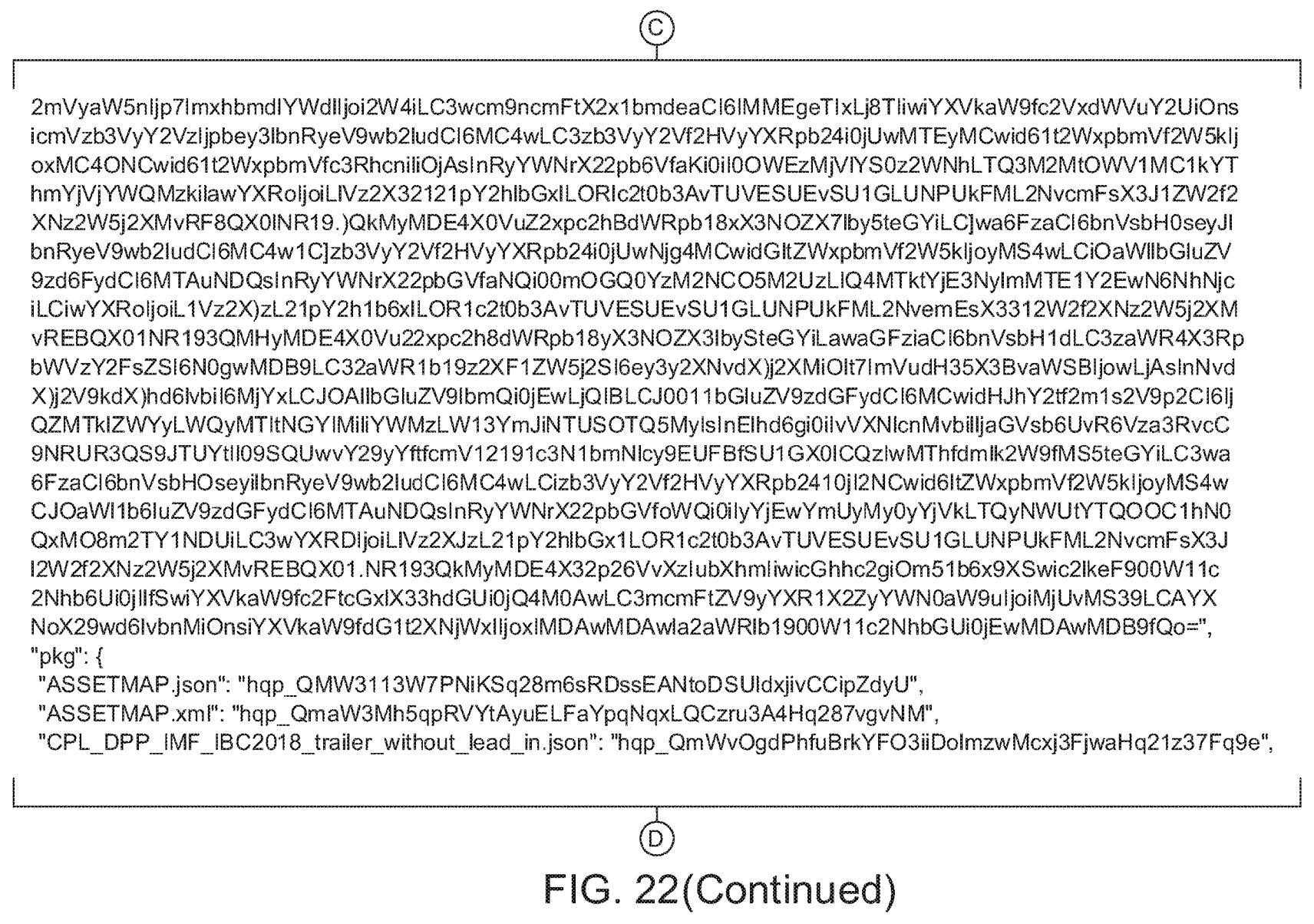
Figure 23:
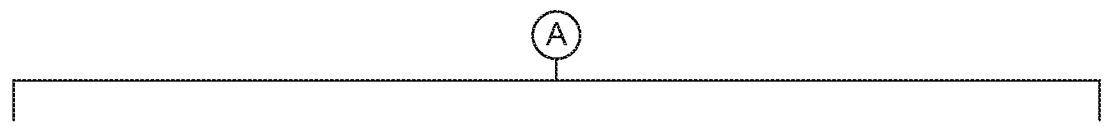
FIG. 23 shows an example of description for an English language version of a consumer streaming deliverable from an interoperable master format (IMF) package where the package specifies multiple language versions.

When new content is published to the content fabric, such as an interoperable master format (IMF) package, an ingest content type template can be selected by the user or client of the API. That content type implements bitcode that the content fabric invokes to write the content in the package to the content fabric. FIG. 22 shows an example of IMF package content in the content fabric after ingest of the selected content type, implemented with bitcode. In this example, for the IMF content type, the audio and video tracks can be written as content object parts, and the relevant portions of the content play lists and offering playlists (CPLs and OPLs respectively) are written as metadata key,value tuples. In some implementations, the core logic to create an output variant is written as a metadata value using a JSON object; this object, termed an "offering," is a grouping of the key names for the audio and video tracks, starting time code, duration and parameters, for example, to create an output version. FIG. 23 shows an example of description for an English language version of a consumer streaming deliverable from an IMF package where the package specifies multiple language versions.

In some implementations, when a user requests to stream a DASH or HLS version of a content object in its target language version, the bitcode module reads the appropriate metadata and the metadata pointing at the constituent video and audio content object parts, reads the content of these parts, and generates a manifest file, which is then served to the client and the stream, which is served. The manifest and the segments can be built on-the-fly by the bitcode. In this case, the bitcode drives audio/video processing modules to perform the scaling and bitrate transcoding to generate only the segments the client requests as the requests are made. For instance, in FIG. 21, there can be DASH and HLS manifest files and segments generated from a mezzanine master package, for instance, in IMF format, using bitcode at the time of user request.

In some implementations, the bitcode environment in the content fabric can accommodate code that operates on the parts such as raw data and metadata of a content object in the content fabric for personalizing or customizing output such as consumable media. Some implementations use bitcode to, for example, apply custom watermarks, as described below with reference to FIG. 24, provide custom clipping functions, and implement automatic video classification and metadata tagging via ML. In this case the ML model that provides the video classification code runs inside a container loaded by the bitcode sandbox, illustrating a breadth of possibilities for creating intelligent content coding pipelines. In some implementations, the content fabric allows such operations to be embedded directly into the media delivery pipeline, to be versioned and updated without affecting the rest of the pipeline, and to draw on re-usable metadata and content.

FIG. 24 shows an example of metadata stored in an original content object created from an IMF source package used to specify content, dimensions and placement of a watermark by bitcode in generating an output stream. In this example, the content object was created from an IMF source package with mezzanine level video.

In some implementations, the content fabric has capacity to store metadata classifying the content, and, with the programmability of the bitcode sandbox, to use this metadata to create customized or personalized media output or to offer personalized, JIT searching and interest matching of content in the fabric. A video classification machine using a deep learning pipeline can be incorporated, in some implementations.

In some implementations, video tagging is performed to iterate video frame by frame, e.g., using OpenCV, FFMPEG, or the content fabric AV pipe, followed by applying a per-frame encoding procedure using a convolutional neural network, resulting in an n-dimensional vector per frame expressing the frame-level video features. The frame-level features are then aggregated to form a video-level feature vector, which is then input to a video-level classifier to predict the video labels.

In some implementations of the content fabric video tagging pipeline, some videos are encoded into one-frame-per-second frames. Raw frames are fed into an inception network, and the ReLu activation of the last hidden layer is fetched to form frame-level features. These frame-level features are aggregated. In some implementations, context gating, a learnable non-linear unit, is applied to the aggregated video-level features, followed by a video classifier—a mix of neural network expert systems—to perform final tagging. Some implementations aggregate spatial representation in recognition of 'places.'

In some implementations of the video tagging architecture, context gating is performed, which generally refers to training a non-linear gating unit such that relevant aspects of a video are enhanced, and off-topic features are suppressed. Some implementations use a method called "mix of neural network experts," which is based on the original mixture of expert methods in which one trains multiple simple 'expert' networks, to optimize their 'expert' domain, followed by a convolution with a gating distribution, effectively learning both the parameters of the individual expert networks and the parameters of the gating function. Such an approach effectively forms an ensemble for the final prediction, where the bias and variance can be appropriately balanced, thereby overcoming overfitting effects in individual expert models.

The paradigm of engineering sufficiently "trustworthy" systems is becoming increasingly difficult to sustain successfully as more and more content flows over the Internet to ever more variations of rights management, ever more points of vulnerability exist in the increasingly complex technological supply chain, and the value of digital content incentivizes theft.

In some implementations, the content fabric backs content access control—operations to create, update, or access content—with blockchain transactions executed through a native ledger embedded in a content fabric software stack. The system ensures that parties are authentic, and its consensus ensures that only valid (authorized) transactions on the content can be carried out. The content fabric can intrinsically couple control over the content's modification and access to the blockchain, while maintaining scalable storage and distribution outside of the blockchain.

In some implementations, the content fabric allows content access control and authorization to take advantage of blockchain ledgers for "programmable" transactions between parties. For instance, each transaction on the blockchain can execute a small piece of code that represents the terms of access for each content object. This small piece of code is referred to as a smart contract. In some implementations, the content fabric may implement a blockchain that is compatible with the Ethereum protocol and exposes an Ethereum Virtual Machine interface for applications, although other protocols/blockchains may be used.

In some implementations, the 'ledger' is charged with at least three operations: 1) providing the authoritative 'directory' of content including the only trusted reference to the list of versions of each content object and the final verification 'hash' (the ground truth) for each of these versions, 2) execution of the 'access control' logic allowing users to read and write content as well as contract terms enforcement and commercial terms reconciliation (payments and credits), and 3) recording access operations on content in the content fabric (the 'ledger' operation).

In some implementations, the blockchain provides an ordered list of transactions. Each transaction is performed by a blockchain participant and could have side effects: a state change in a particular account or contract, a transfer of value, or one or more blockchain 'events'. Transactions are identified by a 'transaction ID.' The content of a transaction as well as the 'transaction receipt' are available to blockchain participants. In some implementations, because the ledger is public, transactions can store 'proofs' of the activities they are recording, for example in the content fabric, the final 'checksum' of a new content after an update. The way in which transactions can offer public verification of a particular action without revealing the details of the action belongs to a class of cryptography referred to as zero-knowledge proofs.

In some implementations, participants in the blockchain fall into two categories: account owners and contracts. Account owners are primarily people in control of their actions against the blockchain, for example, creation or update of content, accessing or viewing content, etc. Applications operated by people or automated processes also can be account owners. These applications are often trusted by the people who run them to do what they were constructed to do, and they are trusted to operate the blockchain accounts they have been given access to. On the other hand, contracts are generally autonomous participants—they operate based on their 'code'. For example, a contract written to pay 2 credits to each user who supplies a particular record signed by a signature accepted by this contract will behave the same way and pay the 2 credits when the signature is matched, and decline to pay otherwise. An account owner generally is identified by its 'address' on the blockchain and owns a public/private key pair that it uses to sign its transactions against the blockchain.

In some implementations, a contract is identified by its 'address'. The contract will have an address if it has been successfully deployed by its creator. The creator is generally known because the creation of the contract is done in a 'transaction' where the 'from' address is the contract creator.

In some implementations, a content space is configurable to set base policies controlling access to associated content objects. The content space can be represented by the smart contract and, in such instances, is referred to as a content space contract. In some implementations, the content fabric operates as a single, global content space. In some other implementations, additional content spaces can be created for special purpose use.

In some implementations, a content node has a blockchain account, represented by its public/private key pair. By the same token, a user of the content fabric can have a blockchain account represented by its public/private key pair.

In some implementations, a library is implemented as a repository of content, setting policies for how the library's content objects work. The library can be created inside a content space and can be represented by a smart contract, referred to herein as a library smart contract, which is determined by the containing content space. The library can have a user as an owner.

In some implementations, content is a representation of a digital asset and is created in a library. The content can be represented by a smart contract, referred to herein as a content smart contract, which is determined by the containing Library. In some implementations, each content object has an instance of the content smart contract.

Users can have various roles, in some implementations. For instance, a library owner can dictate the behavior of content objects inside the library, for example, who can create content, who owns the content once created, how content is accessed or commercialized, etc. Another role of a user is content owner. This owner of a content object can control reading and writing access to the content. A content object can have multiple owners, and these owners can have slightly different privileges, for example, modifying or updating the content object versus publishing the content object for consumer access and determining commercial terms. In some implementations, a degree of control over the content is set by the library. Another role is consumer, referring to a user who does not own content and can access content based on the content object's contract terms, including commercial terms such as access or viewing charge.

Figure 25:
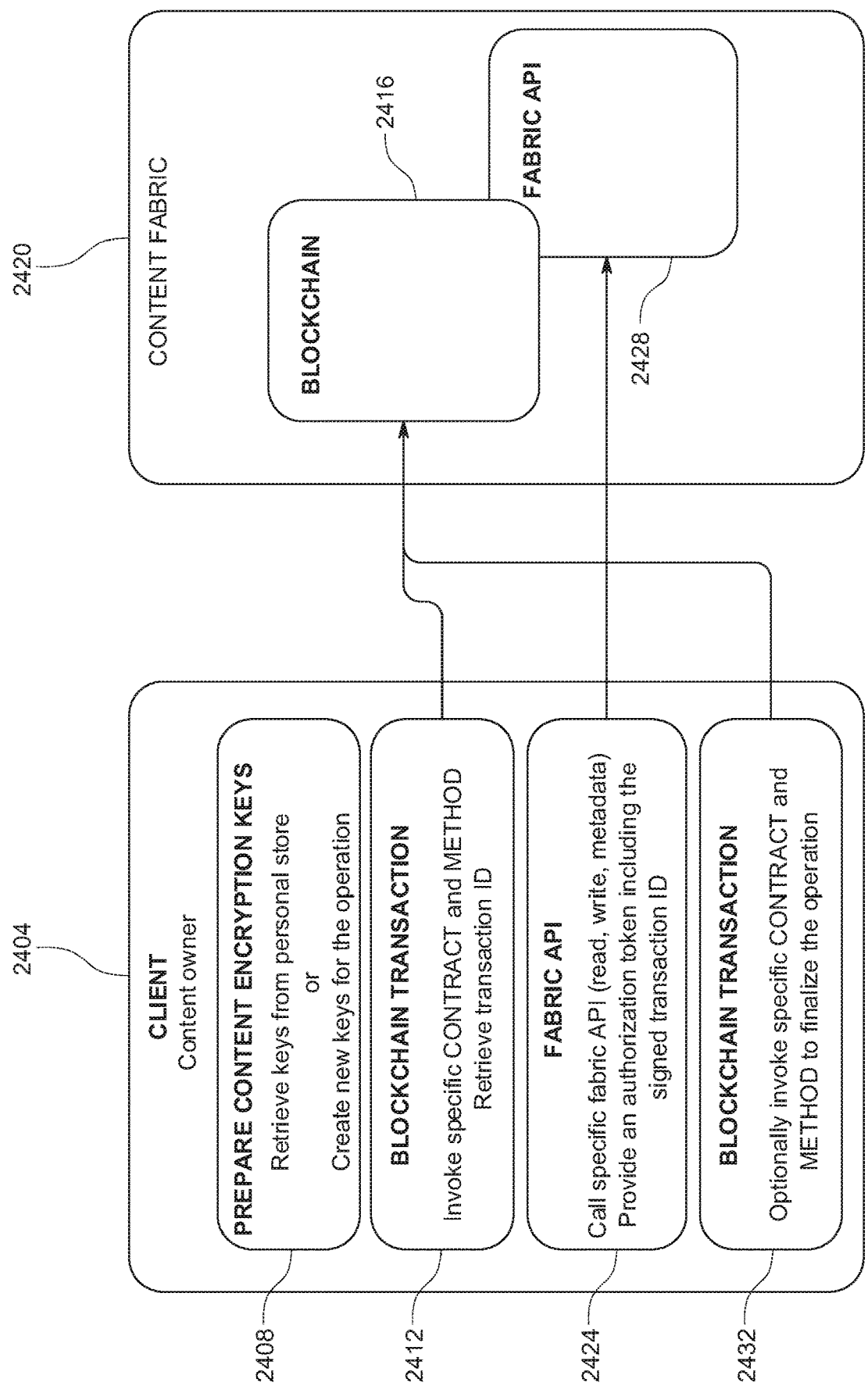
FIG. 25 shows an example of a flow of content fabric operations providing content security and blockchain control.

FIG. 25 shows an example of a flow of content fabric operations providing content security and blockchain control. In some implementations, operations on content objects in the content fabric follow a flow of first invoking the appropriate blockchain transaction on the appropriate contract address, and then using the proof of a valid transaction—indicating that the operation is authorized—to make an authorized API call on the content fabric. Specifically, a client 2404 of the content fabric API securely obtains his/her public/private keys, for instance, by retrieving keys from a personal store or creating new keys at 2408. At 2412, client 2404 creates a blockchain transaction signed with the private key, and the transaction is recorded in a blockchain 2416 of content fabric 2420. At 2412, a specific contract and associated method may be invoked. On successful completion of the transaction (which can perform authorization logic), at 2424, client 2404 creates an authorization token including the transaction ID, and passes this token in a corresponding content fabric API 2428. Optionally, content fabric API 2428 may prompt client 2404 to call a finalization method on the contract in order to complete the API transaction at 2432.

In some implementations, publishing a content object into the content fabric assumes a content library has been created, and that library exists within a content space. The content library is created within the content space and, as such, often is based on the content space giving a user permission to do so. For example, a global content space can allow users to create libraries for a fee. In some implementations, the content space is created by the originator of the content fabric, but additional content spaces can also be created by participants in the content fabric for special use, such as for private or semi-private subsets of the content fabric with dedicated private fabric nodes.

In some implementations, because of their genesis roles, content spaces are trusted by fabric nodes, and fabric nodes are configured to trust content spaces by their maintainers. A new content space is created by deploying the content space contract and configuring fabric nodes to recognize the new space.

In some implementations, to create a library, a user or client program makes an API call directly, or via a user interface. The API implementation executes a method on the content space contract, createlibrary( ), which in turn will create a new instance of the library smart contract for that particular library based on the parameters specified. The calling user becomes the owner of the library contract and as such will be able to further configure the library contract.

Figure 26:
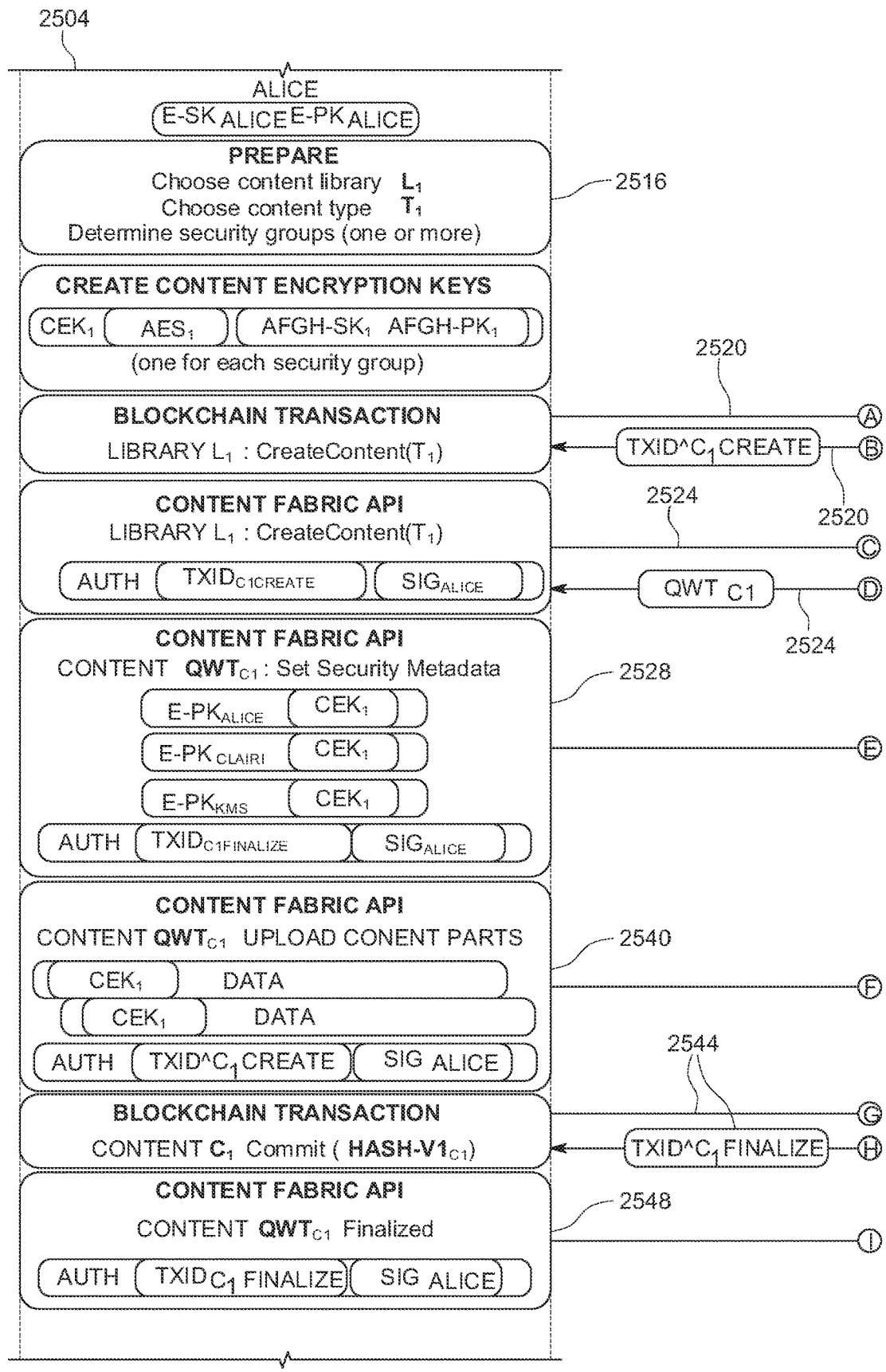
FIG. 26 shows an example of a method for implementing secure content creation in the content fabric.
Figure 26:
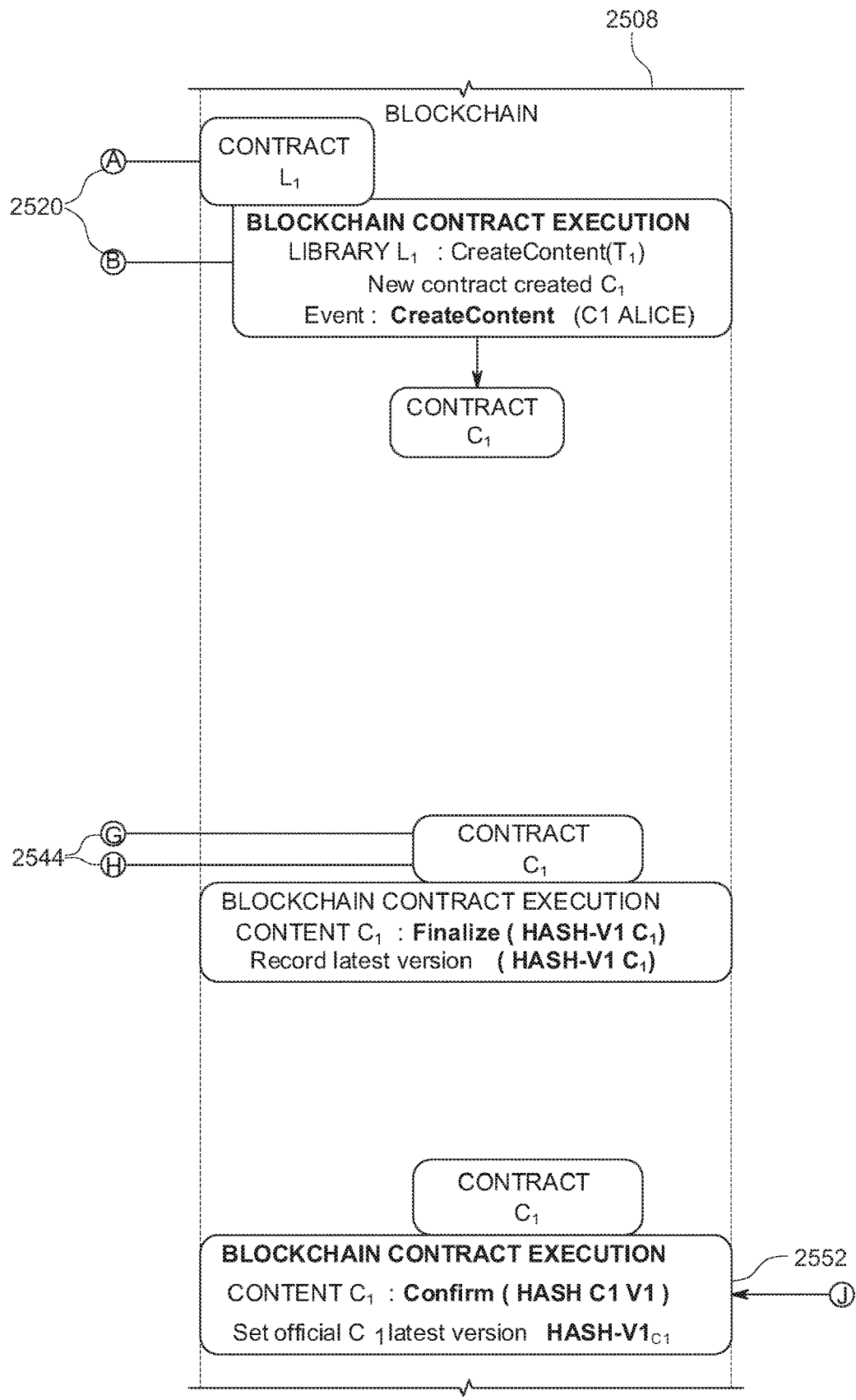
Figure 26:
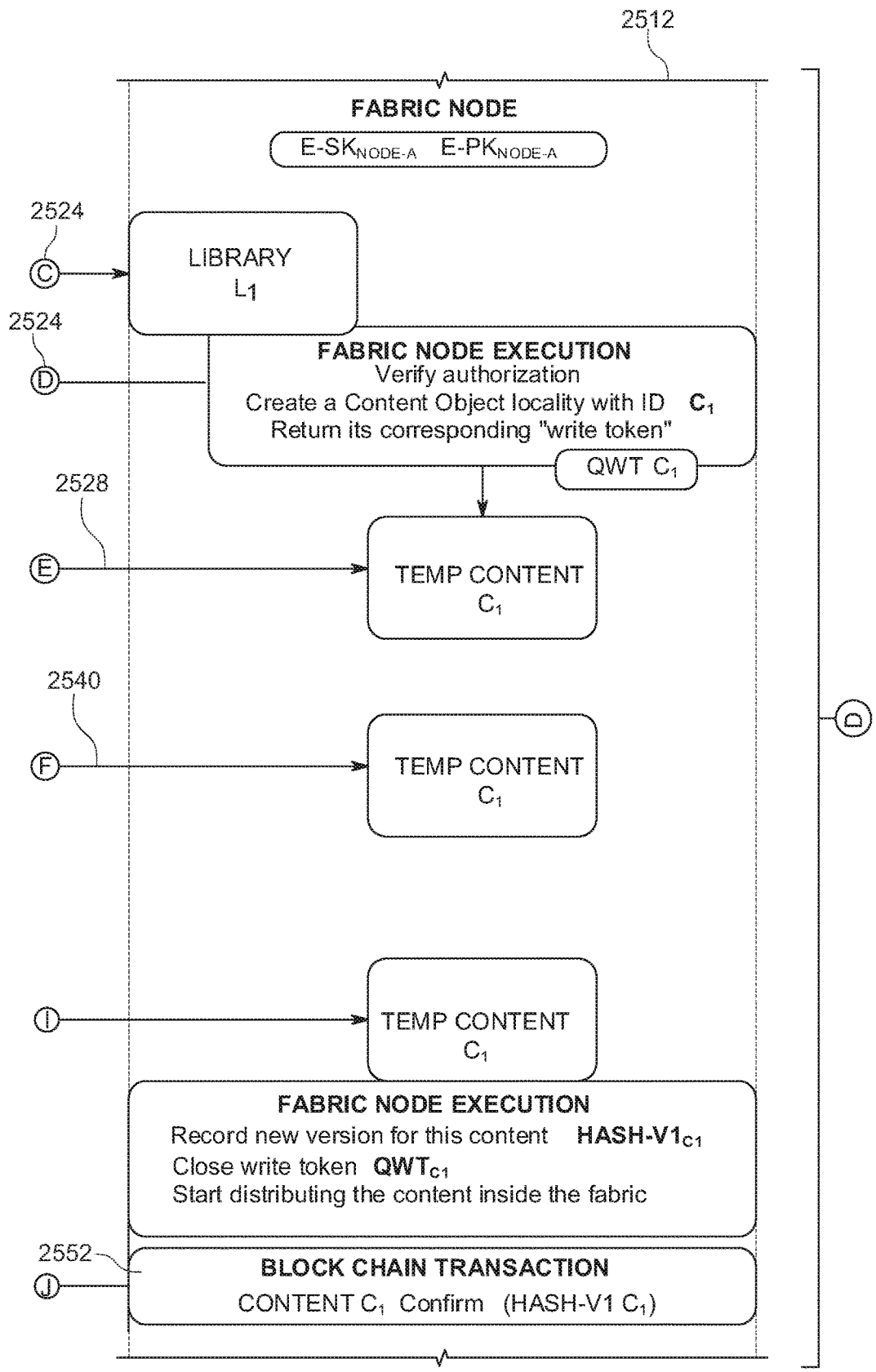
Figure 26:
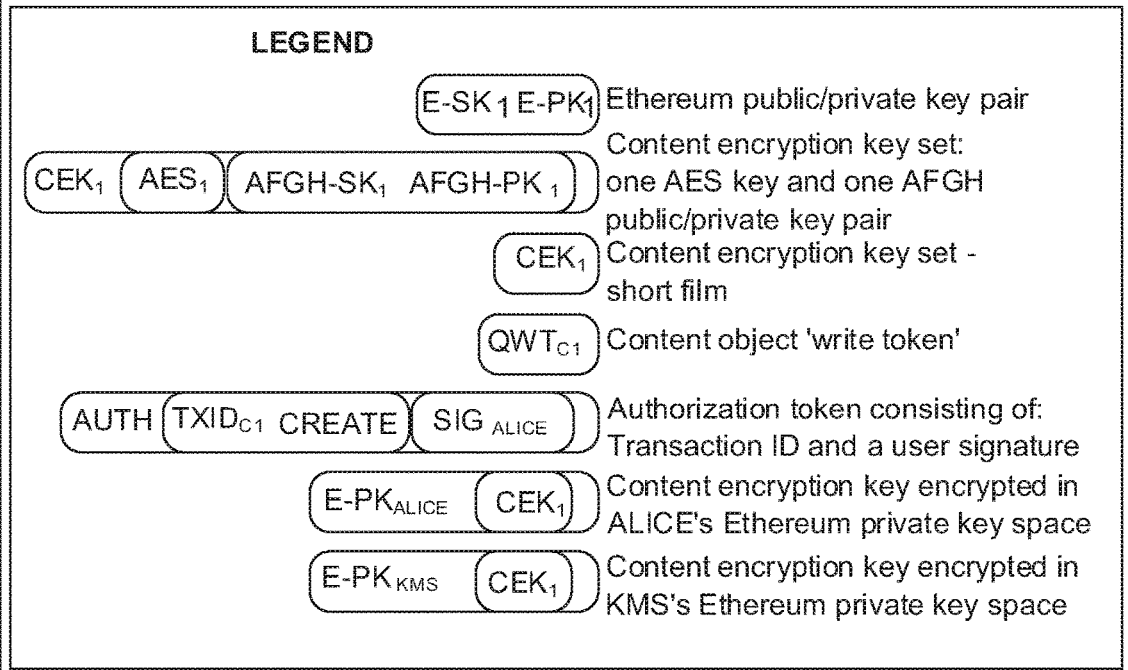

FIG. 26 shows an example of a method for implementing secure content creation in the content fabric. In some implementations, the creation of a new content object for ingestion into the content fabric and updating of existing content objects involves carrying out one or more of the following operations, illustrated in FIG. 26, in which a client, "ALICE" 2504 interacts with a blockchain 2508 and a fabric node 2512. At 2516, preparation begins by calling a method on the library contract to look up possible content types and their security groups offered by the library. At 2520, a method createcontent( ) is called on the corresponding library contract, passing the content type and the chosen security groups. This returns a transaction ID and a new content ID. At 2524, createcontent( ) is called on the content fabric passing in an authorization token containing the transaction ID obtained above and the content ID, signed by the content creator. This returns from the content fabric a valid write token. At 2528, a content encryption key set is generated: an AES symmetric key and a proxy re-encryption public, private key pair (AFGH) for each security group. Also at 2528, the content encryption key set is encrypted for three parties: the owner, the content fabric's key management service, and any owner delegates, using their respective public keys. Also at 2528, a method setsecuritymetadata( ) is called to store this data mapped to these three entities.

In FIG. 26, at 2540, content object parts are uploaded to the content fabric, encrypting each content object part with the AES content key first, and then using the AFGH key. At 2544, a method commit( ) is called on the library contract passing in the 'content hash', which is a new version of the content, uniquely identified by this hash. Note that each content update API invocation returns the potential 'content hash' if a version of the content were to be finalized without further modifications. At 2548, a finalize( ) method is called on the content fabric passing an authorization token including the transaction ID obtained above and signed by the owner (the creator). At 2552, fabric node 2512 supporting the operation calls a confirm( ) method on the library contract passing in the final content hash, and signing the transaction with the fabric node's key to prove that this fabric node supported the operation.

In some implementations, updating content in the content fabric skips operations 2516-2540 above and instead includes a call of writeaccessrequest( ) on the content contract to authorize the update, and then OpenWrite on the content fabric using the obtained transaction ID in the authorization ID.

Figure 27:
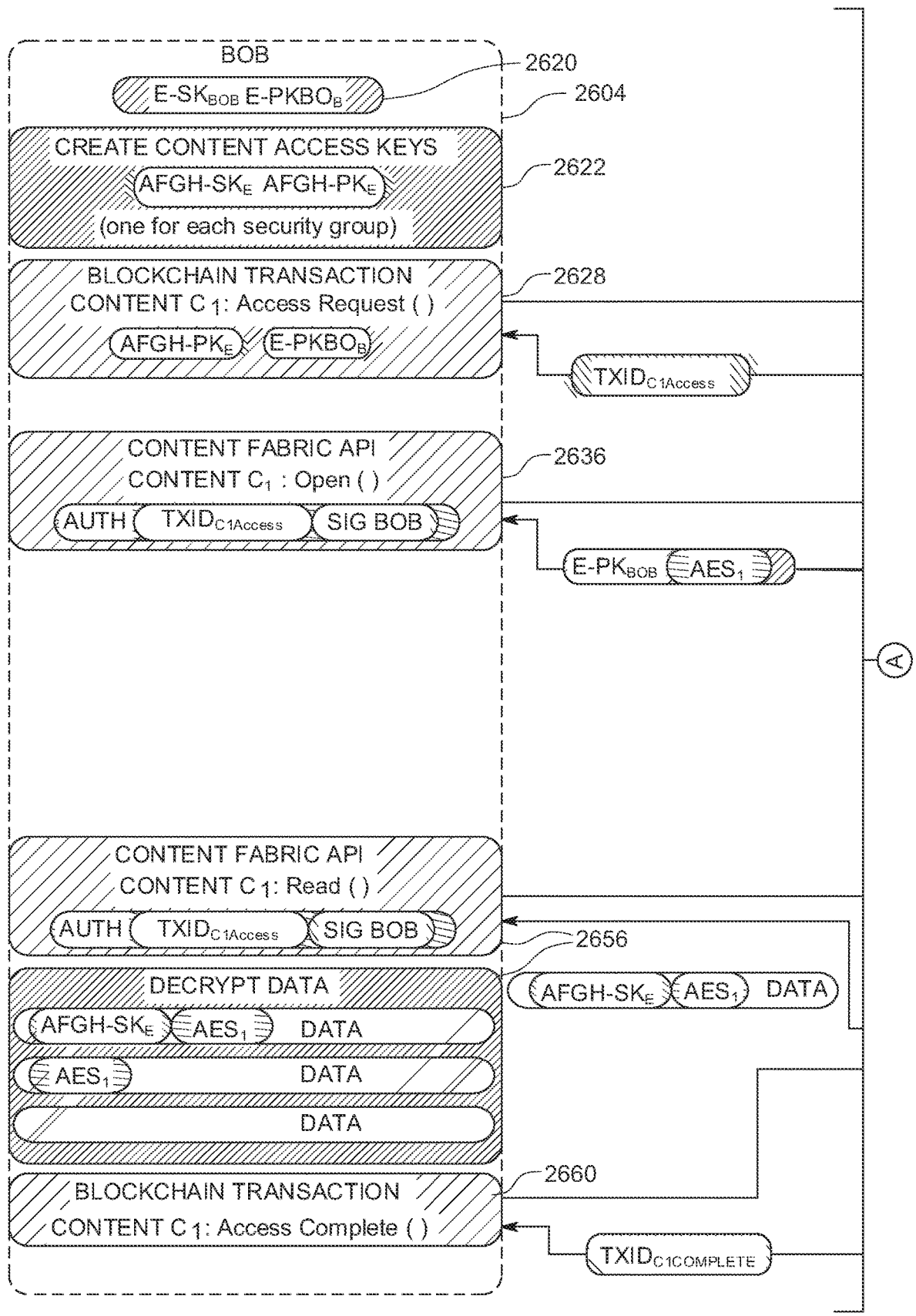
FIG. 27 shows an example of a method for implementing secure content access in the content fabric.
Figure 27:
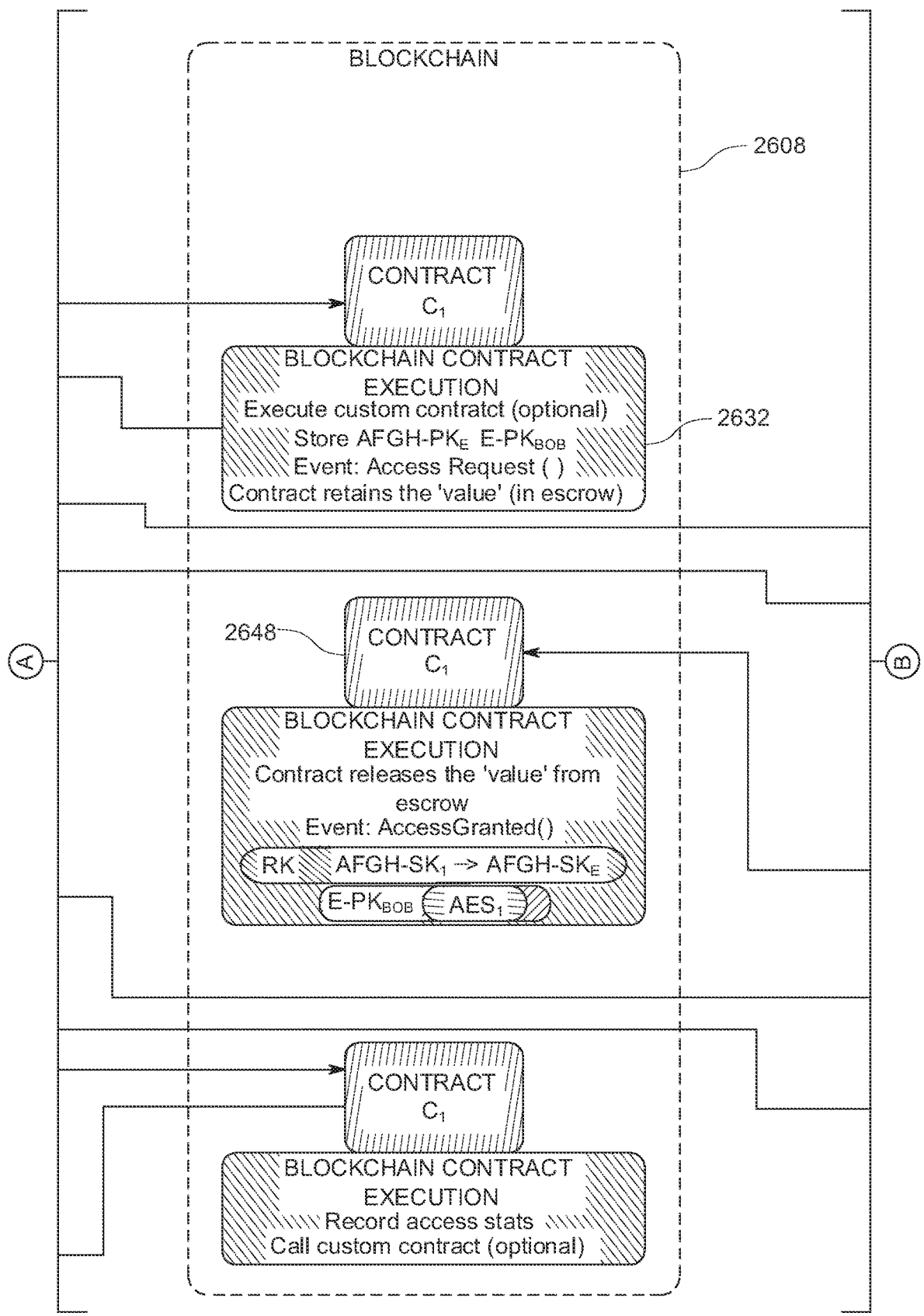
Figure 27:
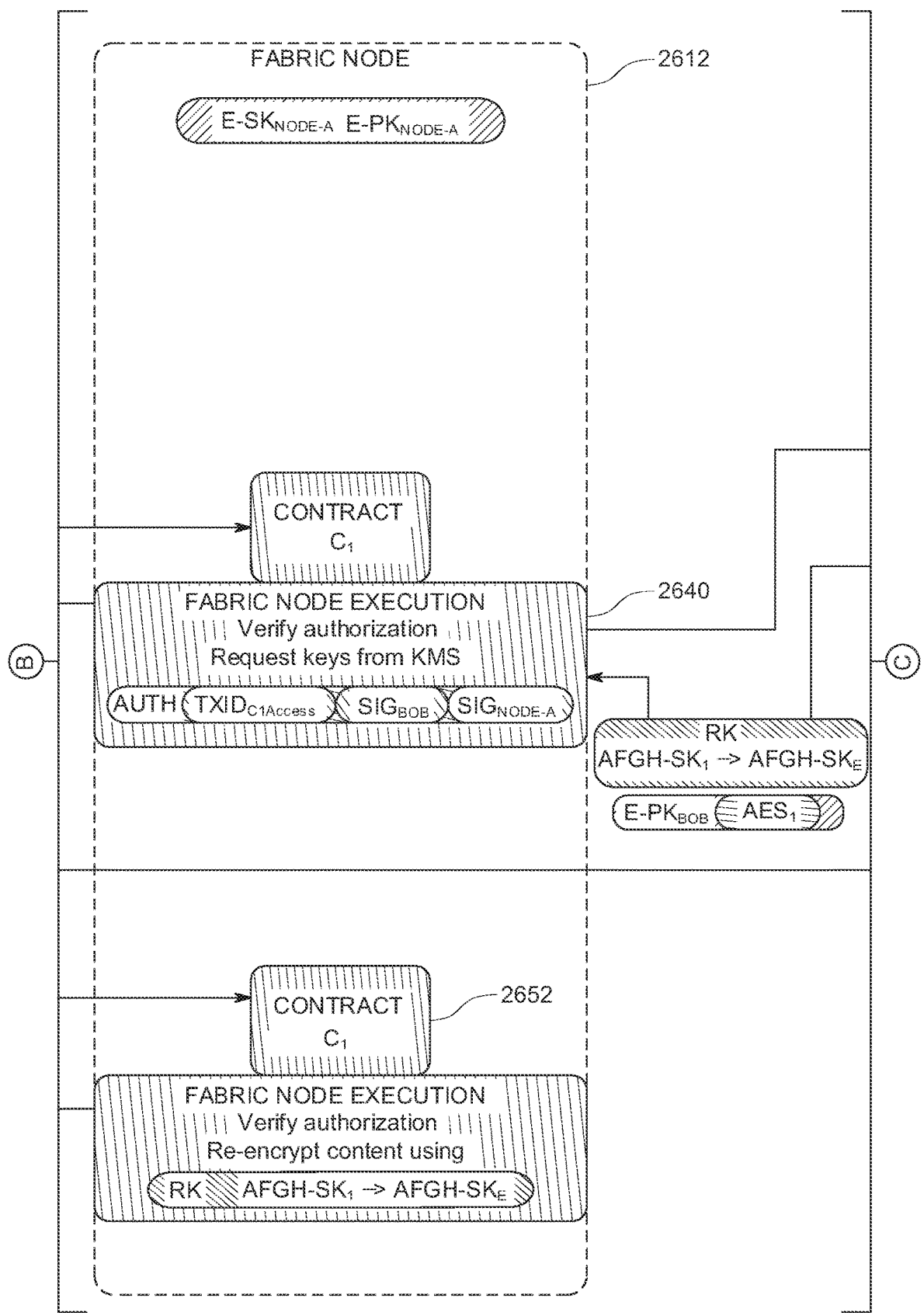
Figure 27:
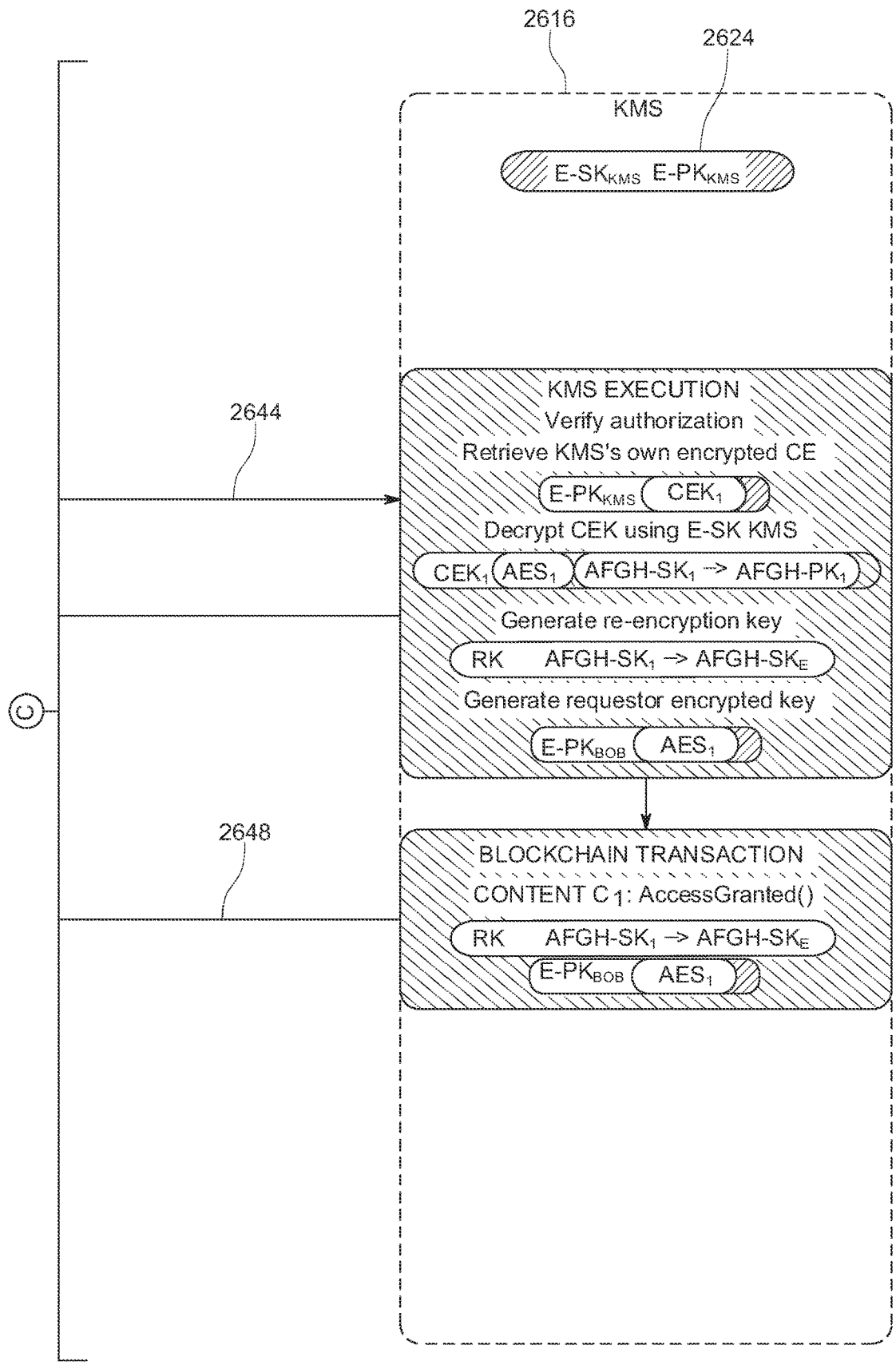

FIG. 27 shows an example of a method for implementing secure content access in the content fabric. In some implementations, the consumption of content as an output, e.g., consumable media, from the content fabric by a client involves carrying out one or more of the following operations. Entities participating in the method of FIG. 27 include a client, "BOB" 2604, a blockchain 2608, a fabric node 2612, and a key management service (KMS) 2616. At 2620, an ephemeral key set is created. At 2622, a proxy re-encryption public/private key (AFGH) is encrypted with the public key of the consumer. At 2624, the ephemeral key set is encrypted for the content fabric's key management service using its public key. At 2628, a method accessrequest( ) is called on the content object's blockchain contract passing in the encrypted ephemeral key set. At 2632, the contract records the ephemeral key set in the contract's state using a unique key, escrows any value required by the AccessRequest from the consumer's credit, and returns the transaction ID. At 2636, BOB 2604 calls a contentopen( ) method on the content fabric passing in an authorization token containing the transaction ID obtained above, signed by the consumer. At 2640, fabric node 2612 calls KMS 2616 (the delegate) passing in the authorization token above, including the transaction ID and signed by the consumer for the authorized accessrequest( ). At 2644, KMS 2616 verifies the request by verifying the transaction ID (consumer's signature and success status) and then generates: the proxy re-encryption key using the AFGH key in the ephemeral key set, and returns the re-encryption key to the fabric node; and an encrypted version of the content AES key, encrypted with the consumer's public key.

In FIG. 27, at 2648, KMS 2616 calls accessgranted( ) on the content contract recording the re-encryption key and the content key encrypted for the consumer, obtained above. The contract releases the "value" from escrow to the content owner. At 2652, fabric node 2612 uses the re-encryption key to re-encrypt the content from the original AFGH key space into the consumer's ephemeral AFGH key space. At 2656, BOB 2604 reads the re-encryption content delivered by the fabric node and the encrypted key blob recorded by an accessgranted( ) contract method. BOB 2604 is now able to decrypt the content as follows: extract the AES content decryption key from the encrypted key blob using its private key; first decrypt using its ephemeral AFGH secret key; and then decrypt the result using the AES content decryption key obtained above. Optionally, at 2660, BOB 2604 calls the content contract's accesscomplete( ) method.

In some implementations, the re-encryption of content published by the owner for an authorized consumer occurs without the software stack or host computing device it runs on having access to the plain text content or to the AES content encryption key, allowing for a "trustless" re-encryption of the content. This capability utilizes proxy re-encryption, based on public/private key cryptography, allowing data encrypted with one user's public key to be transformed such that it can be decrypted with another user's private key. The re-encryption transformation is 'permissioned' in the sense that it is possible when the original, encrypting user generates a re-encryption key that is based on the encrypting user's private key and the public key of the target user. The re-encryption key itself is protected and does not expose useful information about the original encrypted data. Further, this re-encryption key is used by a third party—a proxy—to re-encrypt the data without it becoming unencrypted.

In some implementations, proxy re-encryption provides a useful and powerful service for a secure (trustless) content management system to prevent unintentional or intentional unauthorized access to content; specifically, proxy re-encryption can allow for secure, encrypted data to be easily shared with other users without exposing valuable private keys with any intermediary technology or allowing a malicious end-user to trivially share keys that could be used to decrypt (and steal) other content in the system.

Unlike conventional content management systems, the disclosed content fabric can be implemented to run in a distributed, trustless environment. Security assumptions are different in a trustless environment; in particular, it is not valid to entirely delegate content security to the content nodes themselves.

In some implementations, secure data is encrypted with a set of keys generated and stored by the content publisher. Two distinct sets of keys are generated for each content object part by default: a symmetric key and a public/private key pair for proxy re-encryption. For instance, the symmetric key and method can be AES-256. The content fabric's proxy re-encryption is implemented with pairing-based cryptography so a pairing-friendly elliptic curve can be used. In some implementations, the content fabric uses the curve, BLS12-381.

In some implementations, while each form of cryptography independently provides strong security guarantees, the two distinct key sets are used to implement the trustless model. The symmetric content keys are managed securely in the content fabric. The keys for proxy re-encryption are managed by a separate, independent online system, e.g., a key management service. When a user is granted access to a content object, the symmetric key is transmitted directly to the authorized user. This key by itself can be insufficient to decrypt the data. To perform the proxy re-encryption, the authorized user's computing device generates its own set of BLS12-381 keys. The system creates a re-encryption key based on the original content owner's key and the content-specific key of the end user. This key is then transmitted to one or more fabric nodes in the content fabric. These fabric nodes then proxy the encrypted data, using the provided re-encryption key to transform the data in real-time into the target key of the end user. The end user then decrypts first with their private key and then the symmetric key. This form of two-tier encryption can ensure that the keys the end user controls cannot be used to directly decrypt the original source data that is stored in the content fabric.

In some implementations, key generation, storage and management are performed automatically and transparently on behalf of both the content owner and content consumers. Encryption and decryption can be performed in near real-time while data is stored and retrieved from the content fabric. A scalable library can be used for server-side processing, and the same library is cross-compiled into Web Assembly (WASM) to execute in client software, including modern browsers.

In some implementations, the content fabric's unique architecture and security model allow for creating a blockchain-verifiable (tamper resistant) content versioning system that can both provide integrity verification of content and a traceable history of content version changes. Some implementations use fast proofs of content version integrity and the recording of content version history into the blockchain for traceability.

In some implementations, the content fabric security model provides for authenticity of the parties and privacy of the content. With respect to integrity of the content, the managing of content in the content fabric takes into account that: 1) content can be created and updated by many users, 2) content can live in the content fabric for an extended time, and 3) content can be accessed by many users.

In some implementations, the content fabric uses a fast proof method, a Chunk Merkle Proof, that allows a client reading a content object to verify the hashes of the object's constituent parts in a short time and therefore allows a client to verify the integrity of a content object which the client has read.

An example of the fast proof method is as follows:

Each content object part is broken down in smaller segments—for instance, 1, 2 or 10-20 MB in size Each segment is 'hashed' using, by default, SHA-256 (configurable to include future standards such as SHA-3)

Segment hashes are organized in a tree, such as a Merkle tree or a Patricia tree This tree has the following properties:

The root of the Merkle is a hash that reflects each change in the content, so a given Merkle tree root fully identifies a particular version of the content For any given segment, some implementations can calculate what is called the Merkle proof that allows a user in possession of the segment to ascertain that the segment is correct and it resolves to the known root of the Merkle tree. This proof can be a list of hashes of adjacent branches of the tree up to but not including the root hash.

Content object parts are listed in a special metadata store in a format, such as a CBOR format. The user can retrieve the data blob and verify that (a) the root of the Merkle tree for the desired part is present and (b) the hash of the data blob is further resolved correctly toward the content version hash as described below.

Metadata stores are similarly stored in a data blob and can be verified the same as #2 above.

The content object "reference store" can be a data blob containing the hash of the content object parts data blob #2 and metadata #3.

Using this structure, a user in possession of any part of a content object (e.g., data or metadata) can verify that this data is correct and resolves to the known hash of the content object version.

In some implementations, the 'content object version' is recorded in the blockchain upon creation of the content object and update of the content object. The content object version can be recorded in the Commit transaction following a write to content. This transaction encodes the address of the account that performed the write operation and, in combination with the object proof, can prove unambiguously the blockchain account, and therefore the actor, responsible for a content operation. Applying this capability across the functioning of the content fabric allows for a transparent, provable chain of record for content as shown in FIG. 28. FIGS. 29 and 30 show examples of content object verification trees.

Another example of a content verification tree in JSON format is as follows:

```
{
  "hash": "hq_—QmemnsVGtimQkKVCJRot79DAW5wazrWhYdB7x35Lxdx9Pq",
  "qref": {
    "valid": true,
    "hash": "hqp_QmemnsVGtimQkKVCJRot79DAW5wazrWhYdB7x35Lxdx9Pq"
  },
  "qmd": {
    "valid": true,
    "hash": "hqp_QmdQXKXRLE4gzmphrbin6F51cESTKd6U5XLtwg7hi8UXsq",
    "check": {
      "valid": true,
      "invalidValues": [ ]
    }
  },
  "qstruct": {
    "valid": true,
    "hash": "hqp_QmdwfHGH9mX73ccw8NCQFvGh4i2oU1ChAVzdoiaw7BuojH",
    "parts": [
      {
        "hash": "hqp_QmUv75ETf9x22cjNNbTncVPMuKZpXLPHF7tVz2D9ACthqD",
        "proofs": {
          "rootHash": "acda1564dfc542064b7becdbc2d107c84fe1f942337bfe3c06f2b4eec5e806b8",
          "chunkSize": 49,
          "chunkNum": 49,
          "chunkLen": 50,
          "finalized": 116
        },
        "size": 2634
      },
      {
        "hash": "hqp_QmUDs9mNqWLBuZcTEA7SUAJZb6SEqwoj18ETvKjwjXnePW",
        "proofs": {
          "rootHash": "901d2cef310ba329a3fbfcadaaa776de13c1cab9cf342d88a7afb268ca5ec379",
          "chunkSize": 49,
          "chunkNum": 49,
          "chunkLen": 51,
          "finalized": 116
        },
        "size": 3270
      },
      {
        "hash": "hqp_QmTy4yE4ti5xWjrMwhEvK29QYQ12ysoVdtSEp4L2qhmWaF",
        "proofs": {
          "rootHash": "83a5f2b6b5ca0d4112862264dec3b778c1973fd442df1aaad5558b0415242289",
          "chunkSize": 49,
          "chunkNum": 49,
          "chunkLen": 52,
          "finalized": 116
        },
        "size": 4740
      },
      {
        "hash": "hqp_QmduUaq5891hFH7sBytrjXvwmw4EpGkRfpUZ8rdY61Fhum",
        "proofs": {
          "rootHash": "9c50884174f78a6b13006f2fe0eb642b29cfd0813924e8da7c8bdd0abf735d6d",
          "chunkSize": 49,
          "chunkNum": 49,
          "chunkLen": 52,
          "finalized": 116
        },
        "size": 4008
      },
      {
        "hash": "hqp_QmSZhnv1qkQd3LdjEvHLWjP1dJbcBT45cdhiNfiv92UYPA",
        "proofs": {
          "rootHash": "2baedb36c987a03c6d3afc4989de96aeb4303cc3b1ae750ca0e1ae1e80fa8c26",
          "chunkSize": 49,
          "chunkNum": 49,
          "chunkLen": 51,
          "finalized": 116
        },
        "size": 3638
      },
      {
        "hash": "hqp_QmcQC7wk72X3NmPSuoTm1Pi7anPZzrLaeXRrSouhY2onmV",
        "proofs": {
          "rootHash": "ec776feaff71865a5bfcc512926a1ece766fd78339d2b5e69008dd8c31d2f99f",
          "chunkSize": 49,
          "chunkNum": 49,
          "chunkLen": 51,
          "finalized": 116
        },
        "size": 3119
      },
      {
        "hash": "hqp_QmV2pZmWfuqPtCCEjwPQPRAFQhJoP1DNEGHvP7Jft9xMma",
        "proofs": {
          "rootHash": "c9a5b4e77c8a314bb31035aafd02c6a2c5adb19e1b673e64706ed7185200086c",
          "chunkSize": 49,
          "chunkNum": 49,
          "chunkLen": 51,
          "finalized": 116
        },
        "size": 3725
      },
      {
        "hash": "hqp_QmczFwuf1PmyZHbX1Tq4yQkUkohvPu2tQifgEMzE9TVCkp",
        "proofs": {
          "rootHash": "9f336d22faec24919675fe38904e9bc317134dc913cda839d9e476f49ceb0a00",
          "chunkSize": 49,
          "chunkNum": 49,
          "chunkLen": 52,
          "finalized": 116
        },
        "size": 4139
      },
      {
        "hash": "hqp_QmQQSHdKE3u4PeNJ1idgoG3QRDEBEowZNTaXmkwitQPVUv",
        "proofs": {
          "rootHash": "f5a8225bc3df71e1b650ffa9b792ef712c1dde552cd984e5dc330201a65e8f3f",
          "chunkSize": 49,
          "chunkNum": 49,
          "chunkLen": 51,
          "finalized": 116
        },
        "size": 3512
      },
      {
        "hash": "hqp_QmXMd9EYhjkD8q3beCEpgCDbL4MnMXzHirhCiQwStEshQt",
        "proofs": {
          "rootHash":
```

```
"29e49c187271b344ba58154fd4ce6db181cdbfedfb87c6ab4ce548edcb
942f76",
            "chunkSize": 49,
            "chunkNum": 49,
            "chunkLen": 51,
            "finalized": 116
        },
        "size": 3406
    },
    {
        "hash":
"hqp_QmafFJSxwCf9HWNuc1iyzRfH8guNSLN4RUHsid8QXuHc4z",
        "proofs": {
            "rootHash":
"1fcae272731987195bf91c877733c5b80d276e56f091baef8b06af73e030d51
b",
            "chunkSize": 49,
            "chunkNum": 49,
            "chunkLen": 55,
            "finalized": 116
        },
        "size": 7407291
    },
    {
        "hash":
"hqp_QmaeAzsWkufMhbm5v8mSxwMJXJ3PmVynYbgYndTkPSdi6x",
        "proofs": {
            "rootHash":
"6bfc296a266462eb34c1fbad68d40a7f9805f0d4d6c2b75b0a5664fd5e84
4da2",
            "chunkSize": 49,
            "chunkNum": 52,
            "chunkLen": 51,
            "finalized": 116
        },
        "size": 38057642
    },
    {
        "hash":
"hqp_QmYNZvVwaSWAVKpRhst5quPRdBA1QnQks3EDx3H7B7
PxEV",
        "proofs": {
            "rootHash":
"71ac3a124d0e17c38f269373c63321c53c0b4e19eda4863a6a2aebcc2
eed06c1",
            "chunkSize": 49,
            "chunkNum": 49,
            "chunkLen": 54,
            "finalized": 116
        },
        "size": 6726419
    },
    {
        "hash":
"hqp_QmbZtVndHd85atZL1y3PXp1idXa7RZJeQEeCT8NsqBYiKA",
        "proofs": {
            "rootHash":
"2d8d5f097e9aadf17219dd7f86e1ca8944aa5ef7b19710c7969a75bbd
51965f3",
            "chunkSize": 49,
            "chunkNum": 50,
            "chunkLen": 49,
            "finalized": 116
        },
        "size": 15757990
    },
    {
        "hash":
"hqp_QmQXx83NoJnyuKp2SP8mTQh7LA9dsNNFS8q5bfSsC7PHeT",
        "proofs": {
            "rootHash":
"c85ea23550d2eb306ef5904f7480b6711e69fc47be07fd245b425472a447
c74b",
            "chunkSize": 49,
            "chunkNum": 50,
            "chunkLen": 49,
            "finalized": 116
        },
        "size": 13814854
    },
    {
        "hash":
"hqp_QmRkG7AXbSc54KxzP13oW7226hEupTagggrN1w3sEjgSpE",
        "proofs": {
            "rootHash":
"665f3b9b11fd9ef2b334fc8ec28f9170708457a13cc693039fcd2c4b618b03
c5",
            "chunkSize": 49,
            "chunkNum": 49,
            "chunkLen": 57,
            "finalized": 116
        },
        "size": 90509
    }
    ],
    "valid": true
}
```

For instance, given a content object part with the root hash, "6bfc296a266462eb34c1fbad68d40a7f9805f0d4d6c2b75b0a5664fd5e844da2" and a segment size of 10 MB, the following proof is constructed such that if a user is in possession of any of the 10 MB segments, the hash tree can be calculated up to the 'root hash'.

```
{
    "root_hash":
"6bfc296a266462eb34c1fbad68d40a7f9805f0d4d6c2b75b0a5664fd5e844d
a2",
    "proofs": [
        {
            "byte_beg": 0,
            "byte_end": 10485759,
            "proof": [
"6bfc296a266462eb34c1fbad68d40a7f9805f0d4d6c2b75b0a5664fd5e844d
a2",
"33355cb42bb31bae5cbb1881afaa4b612b050654ec173b7a627489f844dc8d
26"
            ]
        },
        {
            "byte_beg": 10485760,
            "byte_end": 20971519,
            "proof": [
"6bfc296a266462eb34c1fbad68d40a7f9805f0d4d6c2b75b0a5664fd5e844d
a2",
"2bdff03703f7c71dd27e58ac52dc675a183b9df336ace85c928cb239b5fe09
5c"
            ]
        },
        {
            "byte_beg": 20971520,
            "byte_end": 31457279,
            "proof": [
"6bfc296a266462eb34c1fbad68d40a7f9805f0d4d6c2b75b0a5664fd5e844d
a2",
"b0409db2ba129ba4279378e22bfebcc492e196544b9a09c9056aa9de4927f0
7a"
            ]
        },
        {
            "byte_beg": 31457280,
            "byte_end": 38057641,
            "proof": [
"6bfc296a266462eb34c1fbad68d40a7f9805f0d4d6c2b75b0a5664fd5e844d
a2",
"0fd7816bd9f06f3cf976aa24034e5de704cae01eae1f1efa4e2013538f3e02
ea"
            ]
        }
    ],
    "proof_data": {
```

-continued

```
"0fd7816bd9f06f3cf976aa24034e5de704cae01eae1f1efa4e2013538f3e02
ea":
"+FugPFTGTXwdYttZq5dn0MN7mxhQ326xWs46OfS9OQp0Jym40A
MAAAAAAAAAAADgAQAAAACptkQCAAAAALxUxk18HWLbWau
XZ9DDe5sYUN9usVrOOjn0vTkKdCcp", "2bdff03703f7c71dd27e58ac52dc675a183b9df336ace85c928cb239b5fe09
5c":
"+FugPedu9h8GXkgK0RrW0OD3SMiFqcLCElw7SYmLEEyOa1S4OAEA
AAAAAAAAAACgAAAAAAD//z8BAAAAAG3nbvYfBl5ICtEa1tDg90j
IhanCwhJcO0mJixBMjmtU", "33355cb42bb31bae5cbb1881afaa4b612b050654ec173b7a627489f844dc8d
26":
"+FugOgJLxu2N9IQYm7cXjVahA3nG+i5WKgjclAbdoPB4iw+4OAAAA
AAAAAAAAAAAAAAAAAD//58AAAAADoCS8btjfSEGJu3F41Wo
QN5xvouVioI3JQG3aDweIsP", "6bfc296a266462eb34c1fbad68d40a7f9805f0d4d6c2b75b0a5664fd5e844d
a2":
"+JGAgICgMzVctCuzG65cuxiBr6pLYSsFBlTsFzt6YnSJ+ETcjSaAgKAr3/
A3A/fHHdJ+WKxS3GdaGDud8zas6FySjLI51f4JXICAgICgD9eBa9nwbzz
5dqokA05d5wTK4B6uHx76TiATU48+AuqAgKCwQJ2yuhKbpCeTeOIr/
rzEkuGWVEuaCckFaqneSSfweoCA",
"b0409db2ba129ba4279378e22bfebcc492e196544b9a09c9056aa9de4927f0
7a":
"+FugNuieiyxh4owFusQG1Xj7t2Ogj4gGoC4NiRXqQLbjRuy4OAIAAAA
AAAAAAABAAQAAAAD//98BAAAAAObonossYeKMBbrEBtV4+
7djoI+
IBqAuDYkV6kC240bs"
}
}
```

In some implementations, the content fabric provides for scaling and monetizing the management and distribution of media with personalization, intelligence, and high efficiency. The following describes several areas of applications. Other use cases are possible.

In some implementations, the content fabric's JIT distribution capability allows consumer streaming variants differing in packaging format (DASH, HLS), bitrate, scaling and platform (smart TV, mobile, desktop, cable/over the air set top) to be generated from single master, i.e., mezzanine level sources without pre-generation (transcoding, packaging) and storage of the variants, saving time to market, complexity costs, and eliminating significant use of storage and distribution bandwidth.

In some implementations, failed content segments—bad or missing tracks, failed compliance, or other mistakes in quality control—can be corrected by replacing only the repaired portion of the master source, avoiding re-packaging and re-distributing new versions.

In some implementations, because the access to specific output variants is authorized via the fabric smart contracts, specific territorial variants and in theater versus home/retail release window policies ("avails terms") can be encoded into smart contract policies, allowing a single source to serve global, and time-varying availability contracts and reduce the huge multi-department upstream work to control and implement date and time-specific availability terms.

In some implementations, flexibility and scalability of the smart contract-controlled content access in the content fabric and the programmable content transformation via bitcode allows for powerful new monetization opportunities directly between content owners, content licensees, content consumers and third party sponsors/advertisers. The following highlight a few categories:

In some implementations, users can earn credit via use of the custom pre- and post-hooks in content AccessRequest methods, allowing the content fabric to credit a user for viewing an ad, and the credit can be applied toward the subscription fee for accessing paid for content. Similarly users can choose to watch content with no ads. In some implementations, the content fabric can provide that:

the advertiser can be assured that an entire ad was streamed and be provided with details of the user that has watched the ad (optionally reported through data passed into the smart contract method);

the user can precisely control and consent to the data that he or she is contributing for collection, because the data collected can be verified through a blockchain transaction, and sponsor recipients can be traced;

ad coupling to content can be as "smart" as desired, based on matching ad content to user preferences or content tags (see next point) and can be placed with the content via any dynamic insertion, overlay or even in-content (scene based) product placement, using bitcode;

users may choose to watch content with NO ads, while the marketplace dynamics of the smart contracts allow the content owner to charge a market-bearing price for the content subscription.

In some implementations, with tagging and in particular the automated video classification and tagging of video via ML in the content fabric, and the flexibility of bitcode to "use" these tags as data to drive bitcode pipelines that generate the output content, advertising can be made specific to the end user and, as described above, fitted with the content in highly integrated ways.

In some implementations, combining this programmability with smart contracts, the content fabric can support giant-scale content marketplaces—where sponsors can bid on the content tags, owners can connect with sponsors universally (without bespoke/pre-existing advertising relationships), and users can even select content and advertising of their specific interest through their indicated preferences. User access to advertising content can be precisely known due to the contract transactions around content delivery, and this proof and settlement between content owners and advertisers can be handled quickly via smart contracts. In some implementations, the content fabric connects smart contracts to external digital payments services, so payment can continue to be done in flat currency avoiding any requirement relying on or influenced by cryptocurrency.

In some implementations, bitcode can be used to allow users to view, select ("clip") and download preferred content, such as in online archives of news and sports, and the supporting smart contracts can feed back any metadata about the selected content, such as tags, or consented user data. Additionally, the price of content or even parts of the content can be intelligently updated by updating the content access charge in the smart contracts, allowing content owners to have smart, dynamic control to maximize the performance of their online content platforms.

Similarly, contributors of the content such as affiliate stations, partners, or content licensees can be directly paid based on the specific content performance by crediting their accounts through a smart contract transaction, avoiding delays, intermediate accounting and creating an efficient incentive for performance.

In some implementations, the content fabric can increase the possibility of direct performance-based payment through the following features: content licensees can accept contract terms quickly and digitally implementing a state recorded in a smart contract, and upload content according to a template that is dynamically rendered from the content type, and automatically request approval from the content owner. The approval can automatically update the state of the content object's smart contract and in turn credit the account of the licensee. Similarly, audience performance data recorded into the content object's contract can be used to compute and credit additional royalty payments. Both content owners and licensees benefit from the efficiency, scale, and performance incentives.

In some implementations, end users can be incentivized to review and report quality problems in content with credit via the backing smart contracts supplementing top-down content quality control with efficient crowd-sourced efforts.

In some implementations, as described with respect to ML for video classification, the content fabric's scalable metadata storage with content allows for creating giant scale search engines in which users can search for content matching preferences or even matching existing content samples. The "like this" content to be matched will itself be tagged and content with "similar tags" located and scored.

In some implementations, the content fabric can be used to build new media networks, platforms and channels that are based on traceable, provable content. In some implementations, the content fabric makes it possible to prevent this exploitation from the ground up by certifying the version and origin of any content it serves, and opens the possibility for a new class of provable media platforms.

It should be noted that, despite references to particular computing paradigms and software tools herein, computing device program instructions on which various implementations are based may correspond to any of a wide variety of programming languages, software tools and data formats, and be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols herein are merely by way of example. Suitable alternatives known to those of skill in the art may be employed.

Any of the computing devices described herein have components including one or more processors, memory devices, input/output systems, etc. electrically coupled to each other, either directly or indirectly, and in communication with each other, either directly or indirectly, for operative couplings. Such computing devices include clients as well as servers. For instance, computer code can be run using a processor in the form of a central processing unit such as an Intel processor or the like. Data and code can be stored locally on the computing device on computer-readable media, examples of which are described in greater detail herein. In some alternatives, portions of data and code can be stored on other computing devices in a network. A computing device can be implemented to have a processor system with a combination of processors. An input system of the computing device may be any combination of input devices, such as one or more keyboards, mice, trackballs, scanners, cameras, and/or interfaces to networks. An output system of the computing device may be any combination of output devices, such as one or more monitors, printers, and/or interfaces to networks.

Any of the modules, models, engines and operations described herein may be implemented at least in part as software code to be executed by a processor using any suitable computer language such as but not limited to C, Go, Java, and C++, by way of example only. The software code may be stored as a series of instructions or commands on a computer-readable medium for storage and/or transmission. Suitable computer-readable media include random access memory (RAM), read only memory (ROM), a magnetic medium such as a hard-drive or a floppy disk, an optical medium such as a compact disk (CD) or DVD (digital versatile disk), flash memory, and the like. The computer-readable medium may be any combination of such storage or transmission devices. Computer-readable media encoded with the software/program code may be packaged with a compatible computing device such as a client or a server as described above or provided separately from other devices. Any such computer-readable medium may reside on or within a single computing device or an entire computer system, and may be among other computer-readable media within a system or network. A computing device such as the clients described above may include a monitor, printer, or other suitable display for providing any of the results mentioned herein to a user.

While the subject matter of this application has been particularly shown and described with reference to specific implementations thereof, it will be understood by those skilled in the art that changes in the form and details of the disclosed implementations may be made without departing from the spirit or scope of this disclosure. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope should not be limited by reference to such advantages. Rather, the scope should be determined with reference to the appended claims.

What is claimed is:

1. A decentralized system comprising:
   a memory device; and
   one or more processors in communication with the memory device, the one or more processors associated with a network configured to manage a plurality of content object parts representing digital content, the network comprising at least:
      a digital contract associated with the content object parts, and
      a ledger configured to record one or more transactions and facilitate one or more of:
         controlling client access to read and write digital content,
         recording access operations on digital content,
         providing a trusted reference for different versions of a content object part, or
         enforcing one or more terms in contract execution between or among entities identifiable through the ledger;
   the one or more processors configured to:
      provide digital output by at least processing the digital contract in relation to data of the content object parts; and
      provide the digital output to a client.

2. The system of claim 1, wherein the digital contract provides one or more terms of access for at least a portion of digital content, the one or more processors further configured to:
   record, in the ledger, a transaction associated with a client account;
   invoke, in association with the recorded transaction, the digital contract; and provide the controlled client access to at least the portion of digital content governed by at least the one or more terms of access.

3. The system of claim 1, the one or more processors further configured to:
record a verification hash uniquely identifying at least a portion of digital content as a transaction in the ledger by at least executing a method on the digital contract in response to an update to any portion of digital content.

4. The system of claim 1, wherein the digital contract is configured to record operations on the content object parts as respective transactions.

5. The system of claim 1, wherein the digital contract is stored with associated identifiers of different versions of a content object part in the ledger.

6. The system of claim 1, wherein the digital contract is identified by a contract address associated with an ID of the digital content.

7. The system of claim 1, wherein the digital contract is implemented as a blockchain smart contract.

8. The system of claim 1, wherein the ledger is configured to maintain an ordered list of transactions, each transaction associated with one or more of: a state change in an account, a state change in a contract, a transfer of value, or a blockchain event.

9. The system of claim 1, wherein the ledger is implemented in a blockchain.

10. The system of claim 1, wherein a transaction is configured to store a proof of updated content for verification.

11. The system of claim 1, the one or more processors further configured to:
generate a version proof for a content object part using a hash tree;
verify the version proof; and
store the version proof in association with the digital contract in the ledger.

12. The system of claim 1, wherein the digital contract is configured to record just-in-time (JIT) processing used to generate the digital output.

13. The system of claim 1, wherein a transaction identifies one or more of: an address of an entity requesting an operation, an identifier of a content object part, or transaction data.

14. A non-transitory computer-readable medium storing program code to be executed by one or more processors associated with a network configured to manage a plurality of content object parts representing digital content, the network comprising at least:
a digital contract associated with the content object parts, and
a ledger configured to record one or more transactions and facilitate one or more of:
controlling client access to read and write digital content,
recording access operations on digital content,
providing a trusted reference for different versions of a content object part, or
enforcing one or more terms in contract execution between or among entities identifiable through the ledger;
the program code comprising instructions configured to cause:
providing digital output by at least processing the digital contract in relation to data of the content object parts; and
providing the digital output to a client.

15. The non-transitory computer-readable medium of claim 14, wherein the digital contract provides one or more terms of access for at least a portion of digital content, the instructions further configured to cause:
recording, in the ledger, a transaction associated with a client account;
invoking, in association with the recorded transaction, the digital contract; and
providing the controlled client access to at least the portion of digital content governed by at least the one or more terms of access.

16. The non-transitory computer-readable medium of claim 14, the instructions further configured to cause:
recording a verification hash uniquely identifying at least a portion of digital content as a transaction in the ledger by at least executing a method on the digital contract in response to an update to any portion of digital content.

17. The non-transitory computer-readable medium of claim 14, wherein the digital contract is configured to record operations on the content object parts as respective transactions.

18. The non-transitory computer-readable medium of claim 14, wherein the digital contract is stored with associated identifiers of different versions of a content object part in the ledger.

19. The non-transitory computer-readable medium of claim 14, wherein the digital contract is identified by a contract address associated with an ID of the digital content.

20. The non-transitory computer-readable medium of claim 14, wherein the digital contract is implemented as a blockchain smart contract.

21. The non-transitory computer-readable medium of claim 14, wherein the ledger is configured to maintain an ordered list of transactions, each transaction associated with one or more of: a state change in an account, a state change in a contract, a transfer of value, or a blockchain event.

22. The non-transitory computer-readable medium of claim 14, wherein the ledger is implemented in a blockchain.

23. The non-transitory computer-readable medium of claim 14, wherein a transaction is configured to store a proof of updated content for verification.

24. The non-transitory computer-readable medium of claim 14, the instructions further configured to cause:
generating a version proof for a content object part using a hash tree;
verifying the version proof; and
storing the version proof in association with the digital contract in the ledger.

25. The non-transitory computer-readable medium of claim 14, wherein the digital contract is configured to record just-in-time (JIT) processing used to generate the digital output.

26. The non-transitory computer-readable medium of claim 14, wherein a transaction identifies one or more of: an address of an entity requesting an operation, an identifier of a content object part, or transaction data.

27. A method associated with a network configured to manage a plurality of content object parts representing digital content, the network comprising at least:
a digital contract associated with the content object parts, and
a ledger configured to record one or more transactions and facilitate one or more of:
controlling client access to read and write digital content,
recording access operations on digital content, providing a trusted reference for different versions of a content object part, or enforcing one or more terms in contract execution between or among entities identifiable through the ledger;

the method comprising:

providing digital output by at least processing the digital contract in relation to data of the content object parts; and providing the digital output to a client.

28. The method of claim 27, wherein the digital contract provides one or more terms of access for at least a portion of digital content, the method further comprising:

recording, in the ledger, a transaction associated with a client account;

invoking, in association with the recorded transaction, the digital contract; and providing the controlled client access to at least the portion of digital content governed by at least the one or more terms of access.

29. The method of claim 27, the method further comprising:

recording a verification hash uniquely identifying at least a portion of digital content as a transaction in the ledger by at least executing a method on the digital contract in response to an update to any portion of digital content.

30. The method of claim 27, wherein the digital contract is configured to record operations on the content object parts as respective transactions.

31. The method of claim 27, wherein the digital contract is stored with associated identifiers of different versions of a content object part in the ledger.

32. The method of claim 27, wherein the digital contract is identified by a contract address associated with an ID of the digital content.

33. The method of claim 27, wherein the digital contract is implemented as a blockchain smart contract.

34. The method of claim 27, wherein the ledger is configured to maintain an ordered list of transactions, each transaction associated with one or more of: a state change in an account, a state change in a contract, a transfer of value, or a blockchain event.

35. The method of claim 27, wherein the ledger is implemented in a blockchain.

36. The method of claim 27, wherein a transaction is configured to store a proof of updated content for verification.

37. The method of claim 27, further comprising:

generating a version proof for a content object part using a hash tree;

verifying the version proof; and storing the version proof in association with the digital contract in the ledger.

38. The method of claim 27, wherein the digital contract is configured to record just-in-time (JIT) processing used to generate the digital output.

39. The method of claim 27, wherein a transaction identifies one or more of: an address of an entity requesting an operation, an identifier of a content object part, or transaction data.

* * * * *